(12) United States Patent
West et al.

(10) Patent No.: US 7,858,238 B2
(45) Date of Patent: Dec. 28, 2010

(54) HIGH VOLTAGE AND HIGH SPECIFIC CAPACITY DUAL INTERCALATING ELECTRODE LI-ION BATTERIES

(75) Inventors: William C. West, South Pasadena, CA (US); Mario Blanco, Temple City, CA (US)

(73) Assignee: California Insitute of Technology, Pasadena, CA (US)

( * ) Notice: Subject to any disclaimer, the term of this patent is extended or adjusted under 35 U.S.C. 154(b) by 1228 days.

(21) Appl. No.: 11/420,653

(22) Filed: May 26, 2006

(65) Prior Publication Data

US 2006/0269834 A1 Nov. 30, 2006

Related U.S. Application Data

(60) Provisional application No. 60/684,929, filed on May 26, 2005.

(51) Int. Cl.
  *H01M 8/20* (2006.01)
  *H01M 4/58* (2006.01)
  *H01M 10/40* (2006.01)

(52) U.S. Cl. .................. 429/231.8; 429/105; 429/199; 429/338; 29/623.1

(58) Field of Classification Search .................. None
See application file for complete search history.

(56) References Cited

U.S. PATENT DOCUMENTS

| | | | |
|---|---|---|---|
| 4,005,183 A | 1/1977 | Singer | |
| 4,052,539 A | 10/1977 | Shropshire et al. | |
| 4,119,655 A | 10/1978 | Hulme | |
| 4,830,938 A | 5/1989 | McCullough et al. | |
| 4,865,931 A | 9/1989 | McCullough, Jr. et al. | |
| 5,532,083 A | 7/1996 | McCullough | |
| 5,705,689 A | 1/1998 | Lee et al. | |
| 6,022,643 A * | 2/2000 | Lee et al. | 429/324 |
| 6,120,941 A | 9/2000 | Lee et al. | |
| 6,306,540 B1 | 10/2001 | Hiroi et al. | |
| 6,352,798 B1 | 3/2002 | Lee et al. | |
| 6,358,649 B1 | 3/2002 | Yazami et al. | |
| 6,489,055 B1 | 12/2002 | Ichihashi et al. | |

(Continued)

FOREIGN PATENT DOCUMENTS

WO   WO 2006/128174   11/2006

OTHER PUBLICATIONS

Supplementary European Search Report, Corresponding to European Application No. EP 06 77 1589, Completed Sep. 30, 2009.

(Continued)

*Primary Examiner*—Dah-Wei Yuan
*Assistant Examiner*—Angela J. Martin
(74) *Attorney, Agent, or Firm*—Greenlee Sullivan P.C.

(57) ABSTRACT

The present invention provides high capacity and high voltage Li-ion batteries that have a carbonaceous cathode and a nonaqueous electrolyte solution comprising LiF salt and an anion receptor that binds the fluoride ion. The batteries can comprise dual intercalating electrode Li ion batteries. Methods of the present invention use a cathode and electrode pair, wherein each of the electrodes reversibly intercalate ions provided by a LiF salt to make a high voltage and high specific capacity dual intercalating electrode Li-ion battery. The present methods and systems provide high-capacity batteries particularly useful in powering devices where minimizing battery mass is important.

28 Claims, 36 Drawing Sheets

U.S. PATENT DOCUMENTS

| | | |
|---|---|---|
| 6,852,446 B2 | 2/2005 | Barbarich |
| 2003/0108800 A1 | 6/2003 | Barbarich |
| 2005/0227146 A1 | 10/2005 | Ghantous et al. |
| 2007/0218364 A1 | 9/2007 | Whitacre et al. |

OTHER PUBLICATIONS di Vittorio et al. (1991) "Magnetic-Field Dependence of the Hole-Hole Interaction in Fluorine-Intercalated Graphit Fibers," *Phys. Rev. B* 43(2):1313-1321.

di Viittoria et al. (1991) "Magnetotransport at the Metal-Insulator Transition in Fluorine-Intercalated Graphite Fibers," *Phys. Rev. B.* 43(15):12304-12315.

di Vittorio et al. (1993) "A Model for Disorder in Fluorine-Intercalated Graphite," *J. Mater. Res.* 8(7):1578.

Dresselhaus et al. (1995) "Physical Properties of Fluorine- and Fluoride-Graphite Intercalation Compounds," In; *Fluorine-Carbon and Fluoride-Carbon Materials*, Nakajima, T. ed., Marcel Dekker, New York, Ch. 4, pp. 95-186.

Lee et al. (1998) "The Synthesis of a New Family of Boron-Based Anion Receptors and the Study of Their Effect on Ion Pair Dissociation and Conductivity of Lithium Salts in Nonaqueous Solutions," *J. Electrochem. Soc.* 145:2813-2818.

Linden et al. (2002) *Handbook of Batteries*, 3$^{rd}$ ed., Linden, D. ed., McGraw-Hill, New York, pp. 1.13-1.18.

McBreen et al. (2000) "New Approaches to the Design of Polymer and Liquid Electrolytes for Lithium Batteries," *J. Power Sources* 89:163-167.

Oshida et al. (1993) "Image Analysis of TEM Pictures of Fluorine-Intercalated Graphite Fibers," *J. Mater. Res.* 8(3):512-522.

Panich et al. (1997) "$^{19}$F NMR Study of C—F Bonding and Localization Effects in Fluorine-Intercalated Graphite," *Chem. Phys. Lett.* 271:381-384.

Piraux et al. (1990) "Electrical and Thermal Properties of Fluorine-Intercalated Graphite Fibers," *Phys. Rev. B.* 41(8):4961-4969.

Rao et al. (1992) "Raman-Scattering and Transmission-Electron-Microscopy Studies of Fluoring-Intercalated Graphite Fibers $C_xF$ ($7.8 \geq x \geq 2.9$)," *Phys. Rev. B* 45(12):6883-6892.

Root et al. (2001) "The Effect of Carbon Starting Material on Carbon Fluoride Synthesized at Room Temperature," *J. Elctrochem. Soc.* 148:A339-A345.

Seel et al. (2000) "Electrochemical Intercalation of $PF_6$ into Graphite," *J. Electrochem. Soc.* 147(3):892-898.

Sun et al. (2002) "A New Additive for Lithium Battery Electrolytes Based on an Alkyl Borate Compound," *J. Electrochem. Soc.* 149:A355-A359.

Xu et al. (2002) "Sulfone-Based Electrolytes for Lithium-Ion Batteries," *J. Electrochem. Soc.* 149(7)A920-A926.

\* cited by examiner

J.

G.

H.

I.

HIGH VOLTAGE AND HIGH SPECIFIC CAPACITY DUAL INTERCALATING ELECTRODE LI-ION BATTERIES

CROSS-REFERENCE TO RELATED APPLICATIONS

This application claims the benefit of U.S. Provisional Application No. 60/684,929, filed May 26, 2005.

STATEMENT REGARDING FEDERALLY SPONSORED RESEARCH OR DEVELOPMENT

This invention was made with government support under NAS7-03001 awarded by NASA. The government has certain rights in the invention. The invention described herein was made in the performance of work under a NASA contract, and is subject to the provisions of Public Law 96-517 (35 USC 202) in which the Contractor has elected to retain title

FIELD OF THE INVENTION

This invention relates to batteries. More particularly, this invention relates to rechargeable batteries having a high specific energy and high operating voltage that comprise an anion-intercalating cathode and optionally an ion-intercalating anode, a LiF-containing electrolyte, and an anion receptor for increasing the ionic disassociation of LiF.

BACKGROUND OF THE INVENTION

There is a need for high specific energy batteries that deliver more power per unit battery mass in order to power devices that are increasingly sophisticated that require correspondingly higher power requirement. The higher the specific energy, the less battery mass required to power a given device. To meet the demand for high specific energy batteries, we disclose a novel high voltage, high specific capacity Li-ion battery based on dual intercalation of a Li salt into graphite electrodes. In particular, these batteries, in principle, can reach a factor of 3.8 greater specific energy over state-of-the-art Li-ion batteries based on higher cell voltage and higher specific capacity.

State-of-the-art lithium electrochemical cells (e.g., U.S. Pat. Nos. 6,852,446, 6,306,540, 6,489,055) generally employ a graphitic carbon anode (e.g. mesocarbon microbead carbon), a lithiated transition metal oxide cathode (e.g., $LiCoO_2$), and a highly conductive electrolyte solution to provide mobility to Li ions, which are transported from the anode to the cathode during discharge, and vice versa during charge. The salt used in the electrolyte affects cell performance and should be highly conductive, have high thermal stability, be electrochemically stable above the potential of the fully charged cell, and be nontoxic.

Electrolyte fluids in current state of the art lithium ion batteries generally consist of a solvent for ionizable salt, wherein the ionizable salt is, for example, $LiClO_4$, $LiBF_4$, $LiAsF_6$, $LiSbF_6$, and $LiPF_6$. The most common salt in use is $LiPF_6$, which is added to organic carbonate solvent mixtures to form the electrolyte solution. The size the anion in each of these salts is relatively large, and can be larger (e.g., about 0.45 nm for $PF_6^-$) than the spacing between the graphene planes in a graphite electrode (0.35 nm). Accordingly, insertion (and deinsertion) of these relatively large anions in a graphite electrode impart stresses to the graphite. Because rechargeable batteries charge and discharge in multiple cycles, these repeated insertion and deinsertion stresses can quickly degrade the graphite leading to graphite exfoliation and loss of electrode function.

There has been some investigation of batteries having a pair of carbonaceous electrodes (U.S. Pat. Nos. 4,865,931, 4,830,938). However, cells having a pair of intercalating electrodes and an anion provided by the electrolyte suffer from significant capacity loss after several cycles, and cannot be (dis)charged at high rates. Capacity fade and low rate capability for other dual intercalating cell designs are not surprising because of the stresses imparted by insertion and deinsertion of the relatively large diameter polyatomic anions (e.g., $PF_6^-$ having diameter of 0.45 nm) into the graphite host (unstressed graphene planes separated by 0.35 nm). These stresses are associated with "destructive intercalation" (U.S. Pat. No. 5,532,083) and result in exfoliation of the graphite and attendant degradation of the electrode. Accordingly, there is a need in the art for electrochemical cells and batteries capable of utilizing smaller anions that do not stress intercalating electrodes.

The choice of a suitable anion, however, is constrained by a number of criteria: (i) It must be electrochemically stable over a wide voltage window; (ii) It must be small enough to insert (intercalate) and deinsert (deintercalate) into the graphene sheets; (iii) It must be soluble in non-aqueous organic solvents; (iv) It must yield solutions with acceptable conductivities. Although such systems have been studied (U.S. Pat. No. 6,022,643), no characterization of Li-ion cells with carbonaceous cathodes and small diameter anions have been reported.

LiF meets the first two criteria, with the anion being stable over a wide voltage window and being small. However, LiF is insoluble in virtually all organic solvents, which seemingly prevents its use for the dual intercalating cell design. In addition, the high potential of the Li—F redox couple negates the use of standard Li-ion battery solvents that can decompose above roughly 4.3V versus $Li^+/Li$. Therefore, to avoid suboptimal battery performance, the nonaqueous solvent must be carefully chosen.

Recently, synthesis of fluorinated boron-based anion receptors ("AR") for nonaqueous solutions has been reported. U.S. Pat. Nos. 6,022,643, 6,120,941, 6,352,798. These AR enhance the ionic disassociation of a variety of lithium salts in low dielectric solvents, by incorporating non-hydrogen bonded electrophilic groups that are stable over a wide electrochemical stability window of approximately 5V. AR, when dissolved in conventional Li-ion battery electrolyte solvents such as ethers and aliphatic carbonates, enhance the dissolution of lithium salts, including lithium halides, resulting in solubility increases by upwards of six orders of magnitude. The conductivity of these electrolyte solutions is similar to conventional Li-ion electrolyte solutions (e.g., $3.58 \times 10^{-3}$ S/cm for 1 M LiF in 1:2 EC-DMC for 1 M borate AR at 25° C.). It is important to note that the studies examining AR restrict AR use to electrolyte conductivity measurements, and have not examined their use for dual ion intercalating batteries. Whether these AR can be used in a cathode-intercalating battery system is unclear for a number of reasons. For example, the AR may hinder anion intercalation at the cathode. In addition, there will be a potential drop at the cathode associated with de-complexing the anion from the AR, manifesting as a polarization loss, which will lower the operating voltage during operation.

Another challenge to overcome is salt starvation as the cell is charged. During charge, the electrolyte is deprived of salt which decreases electrolyte conductivity. LiF is a useful salt because it is of low molecular weight so that supersaturating the electrolyte with LiF will not dramatically impact the overall cell gravimetric energy density. In addition, use of the AR further minimizes any adverse impact of high concentration LiF.

The rechargeable devices of the present invention that use LiF dissolved in nonaqueous, high voltage stability organic solvents with an anion receptor additive, are attractive for a number of reasons besides providing higher specific energies. The systems are safer because discharged cathodes are graphite, and charged cathodes (fluorinated graphite) do not thermally decompose until 400° C. The systems are environmentally friendlier in that graphite cathodes are not toxic and/or carcinogenic compared to the lithiated transition metal oxide cathodes used in state-of-the-art Li-ion batteries. The batteries of the present invention are also generally lower in cost with respect to cathode composition as graphite cathodes are inexpensive compared to lithiated transition metal cathodes.

SUMMARY OF THE INVENTION

The present invention provides high voltage and high specific energy Li-ion batteries. Improved voltage and specific energies are made by utilizing a LiF salt dissolved in a non-aqueous solvent that reversibly intercalates with a cathode having a carbonaceous portion. To facilitate LiF dissolution, an anion receptor is added to the LiF and solvent. Using dual intercalating carbonaceous electrodes is particularly useful for rechargeable batteries where during charge cations and anions are intercalated into the anode and cathode respectively. During discharge this process is reversed. The improved battery properties are due to LiF having the highest electrochemical difference of any known redox couple, and the F$^-$ ion having the smallest ionic radius of all halogens to facilitate reversible intercalation into graphitic electrodes. Use of LiF also ensures the graphitic cathode maintains function over large number of charge/discharge cycles. The batteries disclosed and claimed are capable of a greater than 3-fold increase in specific energy, thereby permitting the mass of battery-powered systems to be cut by a factor of at least three.

In one embodiment, the present invention exploits F being the most electronegative element and Li being the most electropositive element to provide higher cell voltage and higher specific capacity compared to state-of-the-art Li-ion cells. Although the cells and batteries of the present invention encompass nonaqueous electrolytes comprising Li-halides generally, a preferred nonaqueous electrolyte comprises LiF. Because LiF is relatively insoluble, the electrolytes of the invention further comprise an anion receptor for increasing the ionization of LiF by binding the F– anion, thereby increasing the conductivity of the electrolyte solution. Without the anion receptor, electrolyte conductivity is minimal. The anion receptors of the present invention encompass receptors that increase conductivity of a LiF in a solvent, at 25° C., to above 0.0001 S/cm, including above 0.001 S/cm, and including to above 0.005 S/cm. In an embodiment, anion receptors of the present invention increase the solubility of LiF in a solvent from low values (e.g., on the order of micromolar) to upwards of 5 M. In an embodiment, LiF solubility is increased (at a temperature of about 25° C.) to greater than about 0.2 M, including between about 0.2 M to 5 M, and between about 1 M to 2 M. The cathode of the present invention comprises a carbonaceous material. In an embodiment, the anode of the present invention comprises a carbonaceous material.

Carbonaceous is used broadly to refer to graphite materials and non-graphite materials including, but not limited to, graphite, coke, carbon polymonofluoride or "fluorinated graphite" $(CF_x)_n$, wherein x is between about 0.01 to 1, and other materials that are rich in carbon and that are electrically conductive. A material is said to be "rich in carbon" when it contains about greater than 50% by weight carbon. The electrodes can contain an interior portion that is not rich in carbon but that is electrically conductive, and a second portion rich in carbon that overlays the interior portion, such that the two portions are in electrical contact. In an embodiment, the carbonaceous material is a layer on a metal foil, wherein the foil is a current collector. In an embodiment, the foil is coated with the carbonaceous material. The thickness of the layer or coat can range between about 1 µm and 500 µm. For example, the cathode can comprise graphite on an aluminum foil and the anode can comprise graphite on a copper foil. In an embodiment, the cathode is a compound of carbon with fluorine and a Lewis acid as a cathode-active material. The molar ratio of F:C can be as high as or higher than 1:1. In an embodiment, the molar ratio of F:C is between 0.1 and 1. One aspect of the invention is a cathode, or both a cathode and an anode that comprises graphite.

The general design of a cell or battery is known in the art. For example, the anode and cathode electrode pair is opposed such that ions in the electrolyte are drawn to the appropriate electrode during charge and discharge, but are constructed and placed in a manner such that electrical shorting does not occur. To ensure there is no electrical shorting, a porous non-conducting separator can be sandwiched between the opposed electrodes.

The electrolyte of the present invention comprises an anion receptor for facilitating dissolution of normally insoluble salts such as LiF in a non-aqueous solvent. In one aspect, the anion receptor is an aza-ether based compounds, a fluorinated boron-based compounds, or a phenyl boron based compounds. Anion receptors ("AR") of this invention include those of formula AR1 ("boron-based anion receptors"):

Formula AR1 wherein $R_1$, $R_2$ and $R_3$ are independently selected from the group consisting of alkyl, aromatic, ether, thioether, heterocyclic, aryl or heteroaryl groups which are optionally substituted with one or more halogens, including F, alkyl, alkoxide, thiol, thioalkoxide, aromatic, ether or thioether. In an embodiment $R_1$, $R_2$ and $R_3$ are identical. In an embodiment, each of $R_1$, $R_2$ and $R_3$ are F-bearing moieties.

In a specific embodiment, AR is:

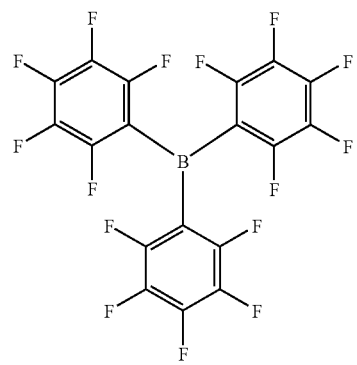

Anion receptors of this invention include those of formula AR2 ("borate-based anion receptors"):

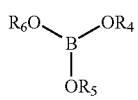

Formula AR2 wherein $R_4$, $R_5$ and $R_6$ are selected from the group consisting of alkyl, aromatic, heterocyclic, aryl or heteroaryl groups which are optionally substituted with one or more halogens, including F, alkyl, alkoxide, thiol, thioalkoxide, aromatic, ether or thioether. In an embodiment $R_4$, $R_5$ and $R_6$ are identical. In an embodiment, each of $R_4$, $R_5$ and $R_6$ are F-bearing moieties. The anion receptor can have chemical structure:

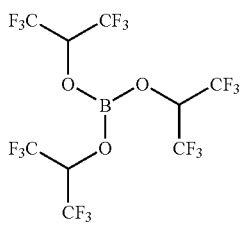

In an embodiment, the anion receptor is:

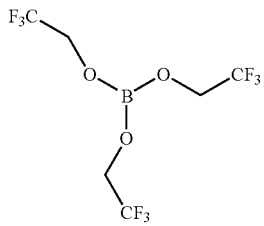

Anion receptors of the present invention include those having the formula selected from the group consisting of: $(CH_3O)_3B$, $(CF_3CH_2O)_3B$, $(C_3F_7CH_2O)_3B$, $[(CF_3)_2CHO]_3B$, $[(CF_3)_2C(C_6H_5)O]_3B$, $((CF_3)CO)_3B$, $(C_6H_5O)_3B$, $(FC_6H_4O)_3B$, $(F_2C_6H_3O)_3B$, $(F_4C_6HO)_3B$, $(C_6F_5O)_3B$, $(CF_3C_6H_4O)_3B$, $[(CF_3)_2C_6H_3O]_3B$ and $(C_6F_5)_3B$.

The anion receptor of the invention can have chemical formula AR3 (phenyl boron based compounds):

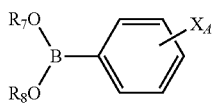

Formula AR3

Wherein $R_7$ and $R_8$ are selected from the group consisting of alkyl, aromatic, heterocyclic, aryl or heteroaryl groups which are optionally substituted with one or more halogens, including F, alkyl, alkoxide, thiol, thioalkoxide, aromatic, ether or thioether. In an embodiment $R_7$ and $R_8$ are identical. In an embodiment, each of $R_7$ and $R_8$ are F-bearing moieties. In an embodiment, $R_7$ and $R_8$ together from an aromatic, including a phenyl that is optionally substituted, including substituents that are F and substituents that are themselves F-bearing moieties, as shown by chemical formula AR4:

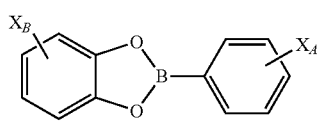

Formula AR4

$X_A$ and $X_B$ represent one or more hydrogens or non-hydrogen ring substituents independently selected from the group consisting of halogens, including F, alkyl, alkoxide, thiol, thioalkoxide, ether, thioether. In an embodiment, at least one of the substituents is a F-bearing moiety.

In an embodiment, the nonaqueous electrolyte comprises a solvent selected from the group consisting of organic ethers, mixtures of organic ethers, propylene carbonate, dimethylsulfide and dimethylsulfoxide. In an embodiment, the nonaqueous electrolyte solvent is selected from the group consisting of tetrahydrofuran, 2-methyl furan, 4-methyldioxolane, 1,3-dioxolane, 1,2-dimethoxyethane, dimethoxymethane, ethylene carbonate, propylene carbonate, γ-butyrolactone, methyl formate, sulfolane, acetonitrile and 3-methyl-2-oxazolidinone, dimethyl carbonate, dimethyl ether, 1-methyl-2-pyrrolidinone, poly(ethylene oxide), and mixtures thereof. Any of the cells or batteries disclosed herein can have a propylene carbonate solvent.

Other useful solvents include solvents that are an electrolyte gel, for example, selected from the group consisting of poly(acrylo nitrile) and poly(vinylidene flouride-hexafluoro propylene) copolymer.

The electrochemical cells of the present invention have improved operating cell voltage over state-of-the-art Li-ion batteries. In an embodiment, the electrochemical cells of the present invention have an operating cell voltage of greater than 4.8V, including greater than about 5V, and greater than about 5.2V.

The electrochemical cells of the present invention are capable of a cathode specific capacity greater than the cathode specific capacity of state-of-the-art Li-ion batteries. In an embodiment, the electrochemical cells of the present invention have a cathode specific capacity of greater than 300 Whr/kg, including greater than about 350 Whr/kg, and greater than or equal to about 400 Whr/kg.

An aspect of the present invention is a dual intercalating electrode Li-ion battery with an opposed anode and cathode pair wherein each of the anode and cathode comprise a carbonaceous material, including a cathode and anode having a graphitic layer in ionic contact with the electrolyte. The graphitic cathode layer can further comprise a carbon polymonofluoride $(CF_x)_n$, where x is between about 0.1 and 1 and n is large. The battery further comprises a nonaqueous electrolyte comprising a LiF salt and an anion receptor to facilitate dissolution of the salt. The nonaqueous electrolyte can further comprise a nonaqueous solvent.

In an aspect, the present invention provides a method for making a Li-ion dual intercalating electrode battery by providing a pair of opposed carbonaceous electrodes that are capable of reversibly intercalating ions without substantial degradation of the carbonaceous material. A nonaqueous electrolyte solution that comprises LiF and an anion receptor is positioned in ionic contact with the opposed electrodes such that ions from the electrolyte solution contact and intercalate with the electrode when an electric potential is established between the opposed electrodes.

BRIEF DESCRIPTION OF THE DRAWINGS

FIG. 2A shows a graphite anode and graphite cathode, each having graphene sheets, such that during charge the anion intercalates with the cathode and the cation intercalates with the anode. During discharge the process reverses, with anions deintercalating from the cathode and cations deintercalating from the cathode. FIG. 2B illustrates that the dual intercalating electrode Li ion batteries of the present invention (labeled "proposed") have about a four-fold increase in specific energy compared to state-of-the-art Ni—Cd, Ni—$H_2$, NiMH and Li-ion batteries.

FIG. 23A is a plot of modeled stage value as a function of cell potential and FIG. 23B is a plot of C-axis dimension as a function of cell potential.

FIGS. 24B and C are Bode plots of the imaginary and real components, respectively.

FIG. 35A is trihydroisopropylfluroborate and FIG. 35B is triphenylfluoroborate having predicted anion binding energies in solution of 1.77 eV and 1.45 eV, respectively, in agreement with the energy densities experimentally observed.

DETAILED DESCRIPTION OF THE INVENTION

Figure 1:
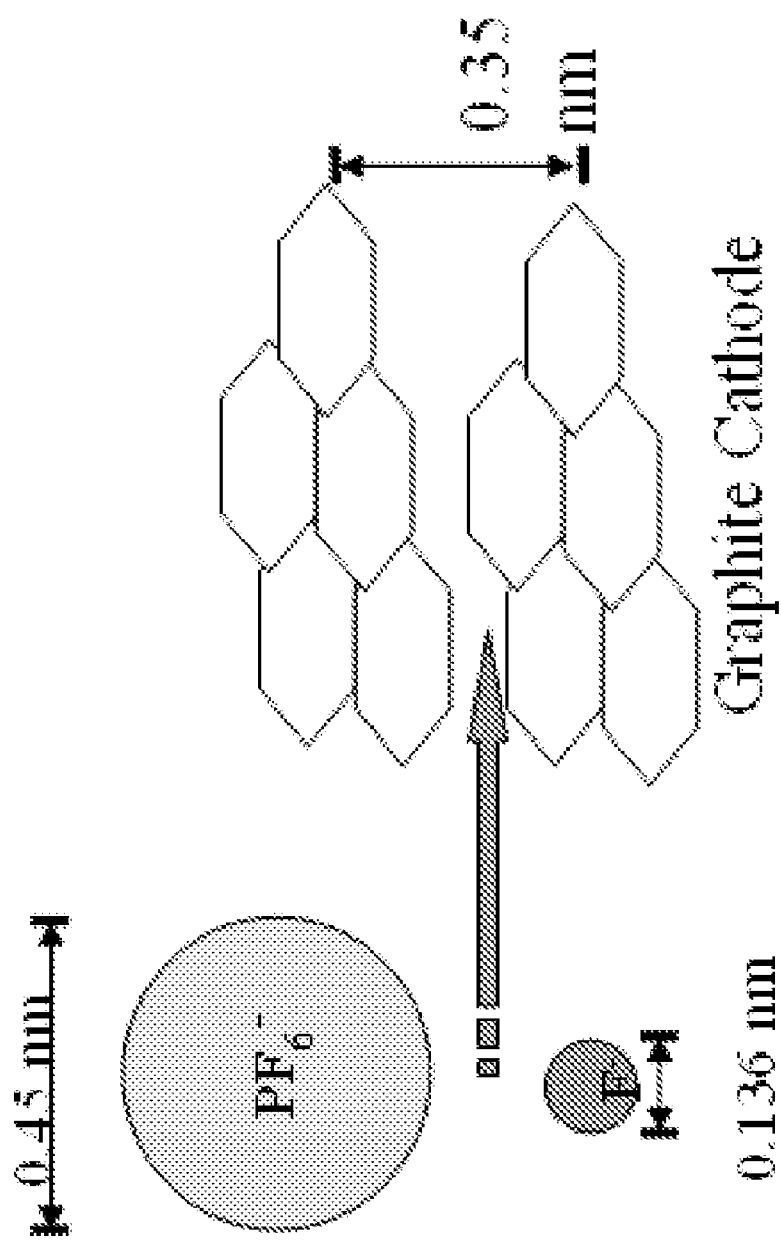
FIG. 1 schematically illustrates the difficulty with state-of-the-art Li-ion batteries that attempt to intercalate relatively large ions into a graphite cathode. Graphite comprises graphene planes typically separated by 0.35 nm. Typical anions used in Li-ion batteries can have a much large radius; $PF_6^-$ of diameter 0.45 nm as illustrated. These large ions generate stresses in the graphite as the anion intercalates and deintercalates, resulting in cathode degradation and loss of battery function. The present invention uses $F^-$ as the anion, which has a much smaller radius of 0.136 nm, thereby avoiding or minimizing cathode degradation.

A dual intercalating ion cell or battery having high voltage and high energy density capacity is disclosed. The high performance characteristic arise from use of LiF as the electrolyte salt, wherein $F^-$ reversibly intercalates with a carbonaceous, e.g., graphite, cathode without any intercalation-associated cathode degradation.

A "cell" refers to an "electrochemical cell" and is generally used interchangeably with the term "battery." These terms refer to systems capable of repeatable storage (charging) and supply (discharging) of energy. General cell and/or battery construction is known in the art, see e.g., U.S. Pat. Nos. 6,489,055, 4,052,539, 6,306,540, Seel and Dahn J. Electrochem. Soc. 147(3) 892-898 (2000).

"Intercalate" refers to the ability of an ion to insert into an electrode. An ion is said to "reversibly intercalate" if it can deintercalate (e.g., deinsert), without unduly stressing the electrode, so that electrode performance is maintained over repeated cycling. In an embodiment, the anode comprises a Li-containing material such that $Li^+$ reversibly incorporates into the anode by plating on the surface of the anode. In a preferred embodiment, both the anode and cathode are constructed such that ions reversibly intercalate.

A "carbonaceous material" refers to a material comprising carbon or graphite that is electrically conductive. An electrode that comprises a carbonaceous material refers to at least a portion of the electrode in electrical contact with the electrolyte being rich in carbon. A material is said to be "rich in carbon" if it comprises about 50% or more carbon, by weight. In an embodiment, the electrode may be fabricated entirely from the carbonaceous material. The electrode may be partially fabricated from the carbonaceous material or the carbonaceous material may be deposited over an underlying material. The underlying material may be a metal foil including, but not limited to, an aluminum foil. Carbonaceous materials having about 90 percent carbonization, are referred to as "partially carbonized." Carbonaceous materials having from 91 to 98 percent carbonization are referred to as a "carbonized" material, while materials having a carbonization of greater than 98 percent are referred to as "graphitized." The carbonized material can be doped with, for example, F ions to further improve battery performance.

Electrode materials include those that can reversibly intercalate anions (e.g., fluoride ions), and/or cations (e.g. lithium ions). In an embodiment, the electrode material preferably intercalates unbound anions released from the anion receptor at the electrode surface. In an embodiment, the carbonaceous material comprises carbon, graphite, coke, mesocarbon microbead carbon, carbon polymonofluoride $(CF_x)_n$, or a mixture thereof In an embodiment, the carbonaceous material is as disclosed in U.S. Pat. No. 4,052,539 (compound of carbon formed by reacting graphite and a Lewis acid fluoride with chlorine trifluoride and in the presence of HF) and prepared according to the method disclosed in U.S. Pat. No. 4,119,655. Examples of graphites used for an electrode include, but are not limited to, RPG (Reinforced Pyrolytic Graphite), R-1 nuclear reactor grade graphite, PGCP (Pyrolytic Graphite Carbon Paper), THORNEL® (mesophase pitch based graphite fibers made by Amoco), PANEX® PWB-6 fibers (stabilized acrylic based carbon fibers made by Stackpole) and GRAFOIL®. To minimize degradation and damage of the carbonaceous electrode during repeated charge/discharge cycling, carbonaceous material can be obtained as disclosed in U.S. Pat. No. 4,865,931, herein specifically incorporated by reference. Briefly, carbonaceous material can be obtained by heating a precursor material including, for example, pitch (petroleum or coal tar), polyacetylene, polyacrylonitrile, polyphenylene, SARAN®, acrylic and sub-acrylic polymer (U.S. Pat. No. 5,532,083) to a temperature above about 850° C. until electrically conductive sufficient to increase carbon content to greater than 85% by weight and up to 99% by weight. In an embodiment, the carbonaceous precursor starting material has some degree of geometrical orientation (e.g. assemblies of multi or monofilament strands or fibers). U.S. Pat. No. 4,005,183, specifically incorporated by reference, discloses a process for producing suitable monofilament fibers where the fibers are made into a yarn which is then woven into a cloth, with the cloth subjected to a high temperature (e.g. about 1000° C. and above) to carbonize the cloth to make the carbonaceous material electrically conductive. Such a cloth, used with an electron collector (e.g. a "metal foil" or a "current collector"), can be used as an electrode of the present invention.

Each electrode is optionally connected to a "current collector" or a "metal foil." The metal foil comprises any electroconductive metal, such as copper, silver, gold, platinum, nickel, cobalt, palladium, aluminum, and alloys thereof that are chosen to minimize corrosion under typical operating conditions. The electrode pair are constructed and placed in such a manner so as to prevent electrical shorting. In an embodiment, porous separators are used to separate the positive and negative electrodes from each other, including a polyolefin separator or a cellguard separator. Other suitable porous non-conducting separator materials include microporous polyethylene film and a porous glass membrane, for example.

Electrodes are manufactured as disclosed herein and as known in the art, including as disclosed in, for example, U.S. Pat. Nos. 4,052,539, 6,306,540, 6,852,446. Briefly, the electrode is typically fabricated by depositing a slurry of the electrode material, an electrically conductive inert material, the binder, and a liquid carrier on the electrode current collector, and then evaporating the carrier to leave a coherent mass in electrical contact with the current collector.

A "carbonaceous layer" refers to a carbonaceous material having a thickness that coats, or covers at least a portion, of another material, including a material that is a current collector, wherein at least a portion of the layer is in ionic contact with the electrolyte solution. In an embodiment, the layer has a thickness between about 1 μm and 500 μm.

"Ionic contact" refers to an ion within the electrolyte solution being capable of interacting with an electrode, including an anion that is complexed with an anion receptor or an ion that is not complexed. Ionic contact encompasses intercalation, deintercalation, as well plating on the surface of the electrode.

Anode materials that may be used in the present invention include lithium, lithium alloys, lithium carbon intercalated compounds, lithium graphite intercalation compounds, lithium metal oxide intercalation compounds, and mixtures thereof. Cathode materials comprise carbonaceous materials.

Electrolyte salts useful in the present invention are those that do not chemically react with the electrodes and which permit the migration of ions between the anode and cathode during charging and discharging. In general, the electrolyte salt is a nonaqueous solution of an alkali metal salt including LiF, LiBr, LiCl. LiF is a preferred salt because $F^-$ is a relatively small anion (the Pauli ionic radius of F– is 0.136 nm) and so can insert and de-insert into an electrode having graphene sheets (graphene sheets in graphite typically spaced 0.35 nm). In addition, the Li—F redox couple represents the highest theoretical electrochemical (and hence voltage) difference of any known redox couple. $F^-$ is also electrochemically stable to 6 V versus Li+/Li, and LiF is very inexpensive. As discussed, the salt used in the electrolyte strongly influences the overall performance of the cell and for the reasons outlined, LiF is a preferred electrolyte salt.

Because LiF is generally relatively insoluble, the electrolyte solution further comprises a material to increase ionization and solubility of LiF in the electrolyte solution to facilitate intercalation of the fluoride ion into the electrode. Accordingly, the invention provides an electrolyte solution further comprising an "anion receptor." An anion receptor is any material that increases the electrical conductivity of LiF in a nonaqueous solvent by binding $F^-$. Anion receptors are known, and include those disclosed in U.S. Pat. Nos. 5,705,689 and 6,120,941 (aza-ether based compounds); U.S. Pat. No. 6,022,643 (fluorinated boron-based compounds); U.S. Pat. No. 6,352,798 (phenyl boron based compounds), all specifically incorporated by reference for anion receptor structures.

The present invention also provides for generation of novel anion receptors and screening of a library of compounds to identify optimum anion receptors for a given electrochemical cell, as discussed in Example 4. Accordingly, the in silico methods disclosed can be used to construct and/or screen compounds, including those having a core structure shown in chemical formulas AR1-AR4. It is important to note that anion receptors can be tuned to a particular cell or battery system in order to optimize specific energy. For example, to minimize the anion receptor complex hindering anion intercalation at the cathode, the binding energy of the anion receptor complex can be tailored by manipulating the chemistry of the anion receptor; e.g., electron deficient N or B atoms or electrophilic groups can be substituted with lower binding energy atoms or groups.

In an embodiment, nonaqueous solvents for the electrolyte are present that are electrochemically stable to about 5.5V vs. $Li^+/Li$, preferably organic solvents including, but not limited to, organic ethers such as tetrahydrofuran and dimethoxymethane and mixtures thereof, propylene, carbonate, dimethylsulfide, dimethylsulfoxide as discussed in U.S. Pat. No. 4,052,539. Other solvents include asymmetric acyclic sulfones, ethyl-methyl sulfone, methyl-isopropyl sulfone, and methyl-tert-butyl sulfone. Preferably the solvent is propylene carbonate.

Depending on the composition of the cell or battery (e.g. electrode composition, solvent, anion receptor), the concentration of alkali metal salts can range from between about 0.25 M to about 5 M, including between 1 M and 5 M. To avoid salt starvation during charging, in one aspect of the invention LiF is added in an amount sufficient to saturate or to supersaturate the nonaqueous electrolyte solution. The presence of the anion receptor helps minimize the adverse impact of such high molarity of LiF on the battery properties.

For optimal battery performance, contaminants in the electrolyte, including water, should be minimized, preferably less than 100 ppm, including less than 50 ppm and less than 10 ppm. For contaminant contents of about 300 ppm and greater, 200 ppm and greater, 10 ppm and greater, a metal anode, including a lithium metal anode can be used to minimize contaminant effects.

In an embodiment, the system sustains deep electrical discharges of greater than 70% of its electrical charge capacity for at least 100 cycles of electrical charge and discharge, including greater than 80% for more than 500 electrical and discharge cycles.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Many of the molecules disclosed herein contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Example 1

High Specific Energy Batteries with Halide Anion Intercalating Cathodes

Although others have examined dual intercalating cells (nonaqueous, non-molten salt variant), the best results to date (high cell voltage (5V), poor cyclability (<100), good capacity (100 mAh/g to 1.0V) are constrained by: massive anion (see FIG. 1); high salt concentrations resulting in large viscosity/low conductivity electrolyte properties; poor solvent stability (at 5 to 6V versus Li); questionable salt stability; deep discharge.

The batteries of the present invention have high cell voltage, high theoretical specific capacity, and generally inexpensive components. Cell voltage depends on salt type and concentration:

$$-eV = \mu_{Li}^0 + \mu_{A^-}^0 - \mu_{Li^+}^0 - \mu_{A^-}^0 - 2kT \ln[Li^+]$$

In practice, kinetics (e.g. rate of charge and discharge) will dictate voltage and correspondingly different strategies are employed for specific cell optimization.

Figure 2:
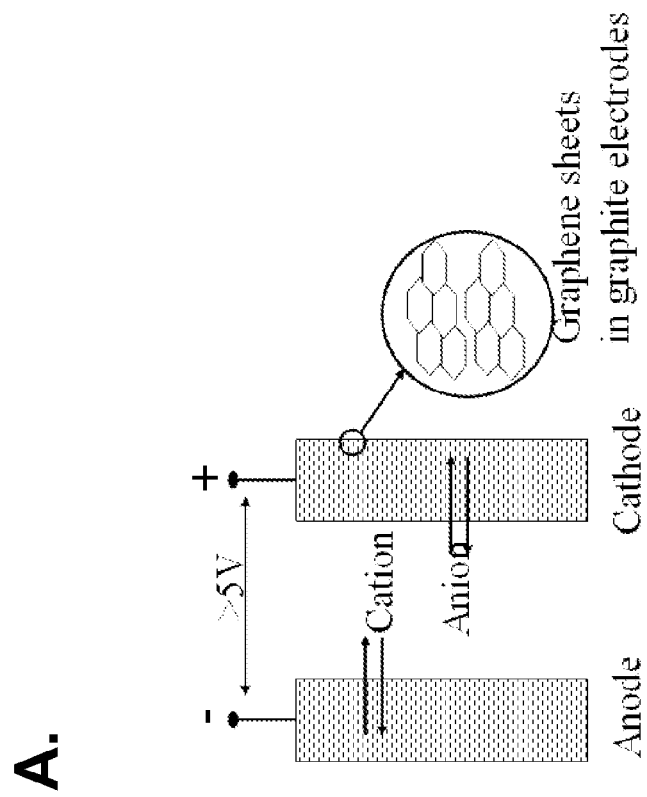
FIG. 2 illustrates the cell or battery of the present invention (A) and the improvement in specific energy compared to other batteries (B).
Figure 2:
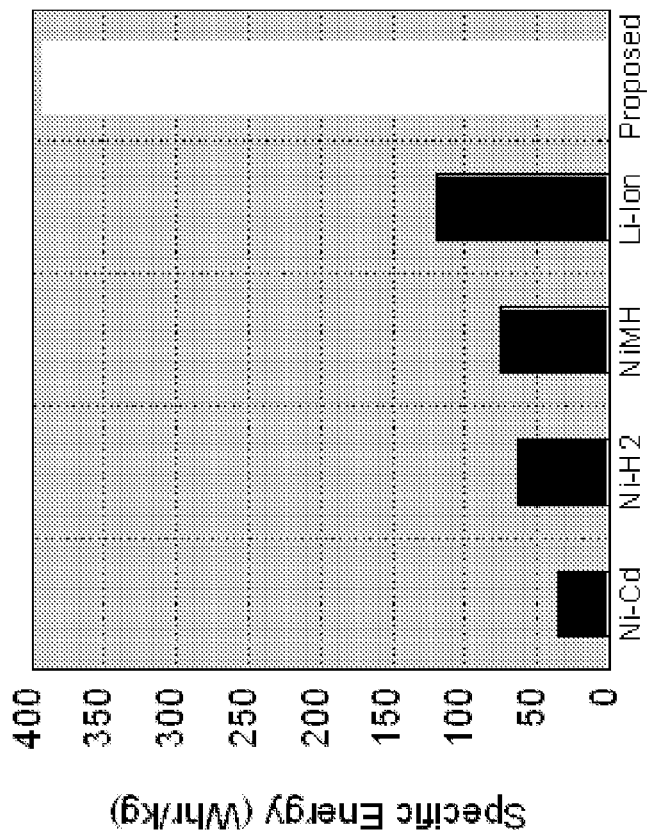

The batteries of this example are high voltage, high specific capacity anion intercalating cathode based batteries (FIG. 2A). These cells have about four times greater specific energy compared with state-of-art Li-ion cells (FIG. 2B), based on a higher cell voltage (>5V versus about 4.1V for state-of-art Li-ion cells), as well as a higher cathode specific capacity (about 891 mAh/g cathode versus about 180 mAh/g for state-of-art Li-ion cells (assuming C:F=2.5)).

In this example, we examine the cathode side only, thereby minimizing the number of variables in the system. We use F⁻ anions from LiF. To increase LiF solubility, we use anion receptors that complex F⁻. In the initial studies for this experiment, we use Tris(pentafluorophenyl) borane:

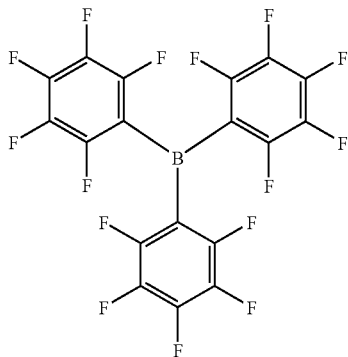

Particularly suitable anion receptors do not use H bonding for anion complexation, thereby providing better chemical stability. In this example, we use fluorinated boranes/boronates with electron withdrawing ligands that separate $F^-$ from LiF and that are stable from 0-5V versus $Li/Li^+$. In an embodiment, the anion receptor is tuned so that it is sufficiently strong to remove $F^-$ from LiF, but releases $F^-$ at the cathode so that the anion receptor does not intercalate into the graphite of the electrode. The anion receptor concentration dictates salt concentration, and is advantageous in that saturated solutions with low viscosity are used, thereby providing an added degree of freedom for cell design. In addition, the preferred high molarity and low viscosity electrolyte for dual intercalating electrode cells is satisfied by using appropriate anion receptor. The anion receptor bound anion also forms stable solid-electrolyte interphase ("SEI") against the carbonaceous surface, thereby forming a protective layer.

In an embodiment, the solvent is an asymmetric acyclic sulfone. Symmetric acyclic sulfones (DMSF) have outstanding chemical stability, high dielectric constant and high melting point. Asymmetry reduces melting point below 20° C. (EIS, MIS) and are stable from 0 to 5.5 V versus $Li/Li^+$. Acyclic sulfones include those disclosed in Xu and Angell, J. Electroch. Soc. 149(7) A920-A926 (2002): TetraMS, TriMS, EMS, EsBS, EiBS, EiPS, FPMS and others.

In an embodiment, graphite is the intercalation host. Graphite readily accepts a wide variety of cations, anions, inorganics, and organic molecules. Van der Waals bonding accommodates intercalant between graphene sheets. The intercalant can be from aqueous and non-aqueous solutions and from gas/vapor phase. Intercalation species include, but are not limited to, metal salts ($CuCl_2$, $NiCl_2$, $FeCl_3$), large anions ($PF_6^-$, $BF_4^-$, $ClO_4^-$, $N(SO_2CF_3)_2^-$, $B[OC(CF_3)_2C(CF_3)_2O]_2^-$), large cations (tetrabutyl ammonia ($TBA^+$), $K^+$, $Na^+$), halides ($Br_2$, ICl, IBr), and solvents (propylene carbonate (PC), dimethylsulfoxde (DMSO)). In some cases, intercalation is reversible. In other cases, intercalation results in exfoliation.

Figure 3:
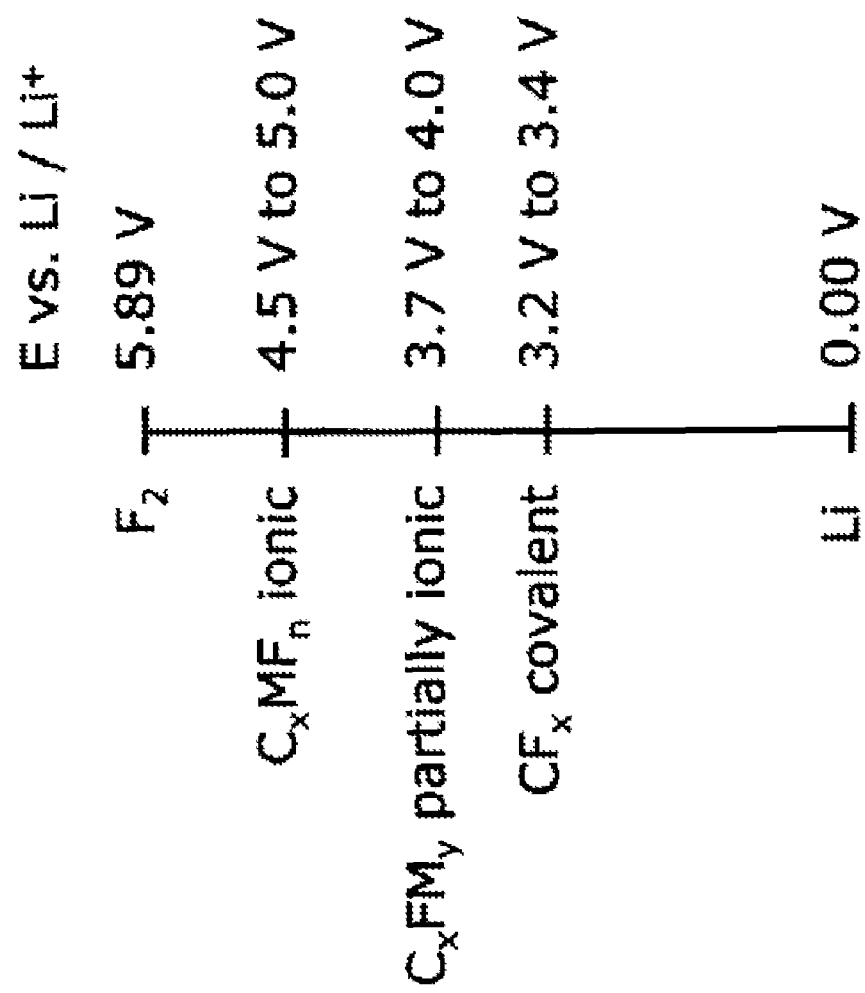
FIG. 3 illustrates electrochemical potentials for various carbon fluorine compounds versus Li/Li$^+$ (after Root et al., 2001).

Cathode materials can be made by reacting fluorine with carbon to generate a number of carbon fluorine compounds of varying electrochemical potential (E) vs. $Li/Li^+$ (FIG. 3 after Root et al. (2001)). Carbon polymonofluoride, $(CF_x)_n$, is synthesized via $F_2(g)+C(graphite)\rightarrow(CF_x)_n$, at high temperature. The C—F interaction is a covalent bond ($Sp^3$ hybridization of carbon) and higher ionicity results in higher electrochemical potential vs. $Li/Li^+$. To maintain reversible intercalation, F should be kept in its ionic state. To assess the state of F in a carbon electrode (e.g. covalent, partially ionic, ionic, gaseous), the electrochemical potential of the electrode is measured.

The invention disclosed herein addresses a number of concerns raised for dual intercalating graphite electrodes. First, there is a concern that for anion bound too tightly to the anion receptor there will be slow anion de-solvation. This is addressed by utilizing the large library of available anion receptors and tailoring anion receptor chemistry accordingly, as described hereinbelow. Second, if there is salt starvation, electrolyte solution resistance correspondingly increases. Salt starvation is minimized by using low mass (low molecular weight) salt reservoir with a recognition that dissolution rate may limit cell discharge rate. Third, there is a low practical intercalation capacity of $F^-$ in graphite. This is of small concern as the large margin the theoretically calculated capacity allows for significant improvement over state-of-art Li-ion cells even at performance at 10× lower than theoretical performance. Finally, to minimize poor solvent chemical stability to $F/F^-$, the charge voltage is kept below the uncoordinated $F^-$ oxidation potential (e.g. less than about 6V).

In an embodiment, the cathode is graphite on an aluminum current collector. For example, cathodes are fabricated by preparing a slurry comprising 10% (by weight) binder (PVDF, PS), 5% (by weight) carbon black, balance graphite in NMP, xylenes. The current collector is coated, e.g., aspirating slurry onto coin cell case or Al foil. To minimize contaminates (e.g. water), the cathode, salts, and anion receptors are vacuum dried. Electrolyte solution is prepared as approximately 1M anion receptor (TPFPB) and about 2M LiX (where X is F, Cl, or Br). In particular, we use saturated solution of electrolytes. A Cellguard separator is used against an electrode. These initial experiments, to simplify cell testing, used Li anodes. In a preferred embodiment, carbonaceous anodes including but not limited to graphite, are used along with a metal foil current collector such as copper, for example, are used.

Figure 4:
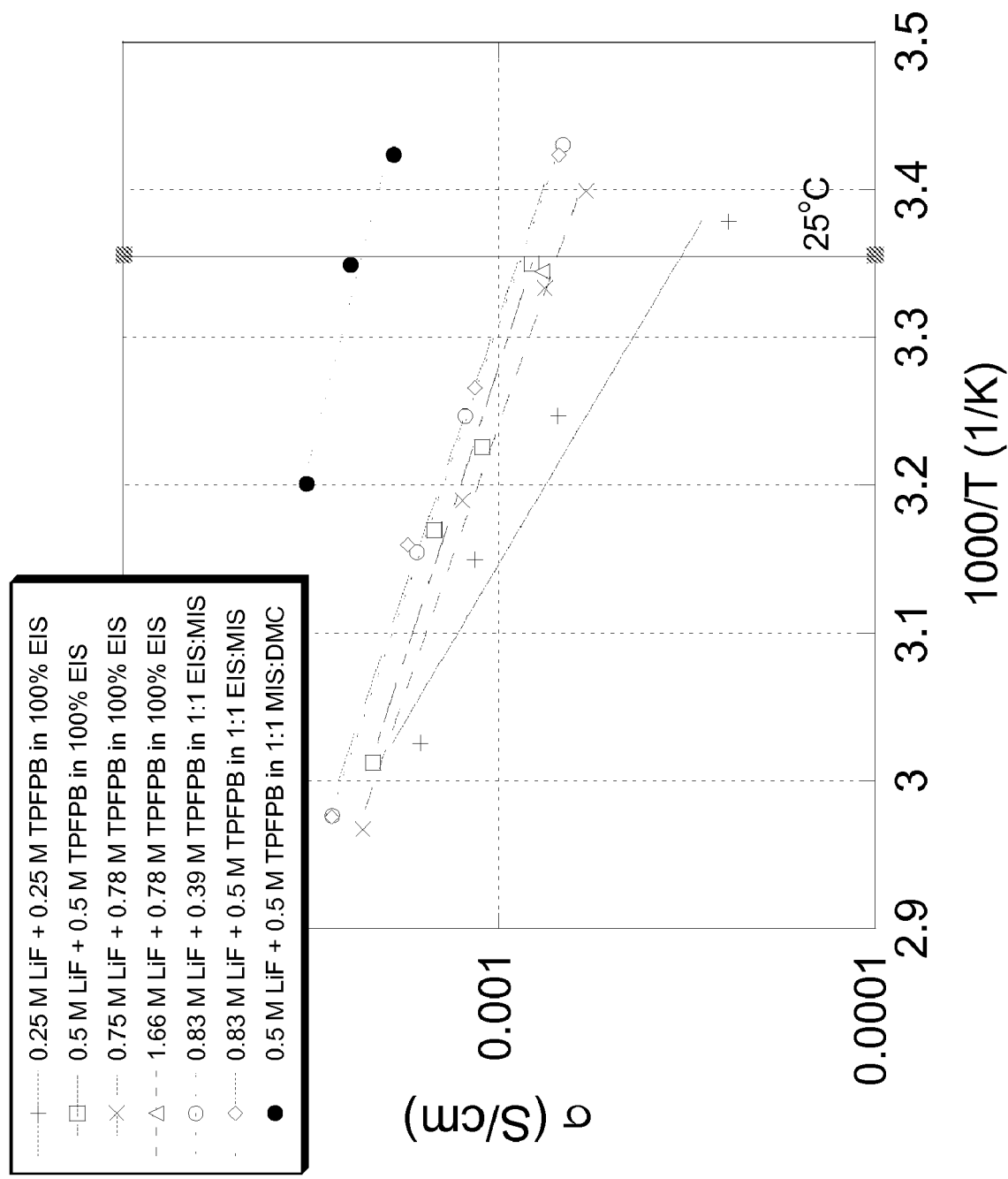
FIG. 4 is a graph of conductivity as a function of inverse temperature for a variety of nonaqueous electrolyte solutions, having different LiF, anion receptor (TPFPB) concentrations, and solvent concentrations and solvent compositions, as noted in the FIGURE legend. The vertical line is at a temperature of 25° C. The highest conductivity at 25° C. is for an electrolyte with [LiF]=0.5 M, [TPFPB] (Tris(pentafluorophenyl)borate)=0.5 M and nonaqueous solvent of 1:1 MIS: DMC.

Because electrolyte conductivity is a limit to practical current densities, we investigate the conductivity of various electrolytes. FIG. 4 is a plot of conductivity as a function of temperature for seven different electrolyte compositions. The [LiF] ranged from 0.25 M to 1.66 M; [TPFPB] from 0.25 M to 0.78 M and various solvents (100% EIS, 1:1 EIS:MIS, 1:1 EIS:MIS, 1:1 MIS:DMC). At room temperatures (see vertical line at T=25 C), the 0.5M LiF+0.5 MTPFPB in 1:1 MIS:DMC solvent has the best conductivity. Conductivity experiments, such as the one shown in FIG. 4, are useful for evaluating promising electrolyte solutions before conducting full-scale electrochemical cell studies. Those solutions that have electrolyte conductivity of better than about $10^{-3}$ S/cm at about 25° C. are candidates for use in the batteries of the present invention. Alternatively, the suitable electrolyte solutions can be evaluated based on the solubility of LiF in the solution. Solutions wherein the soluble concentration of LiF is greater than 0.2 M are suitable for use in the batteries of the present invention.

Table 1 provides a summary of the electrochemical cells investigated in this, and the following, examples.

Figure 5:
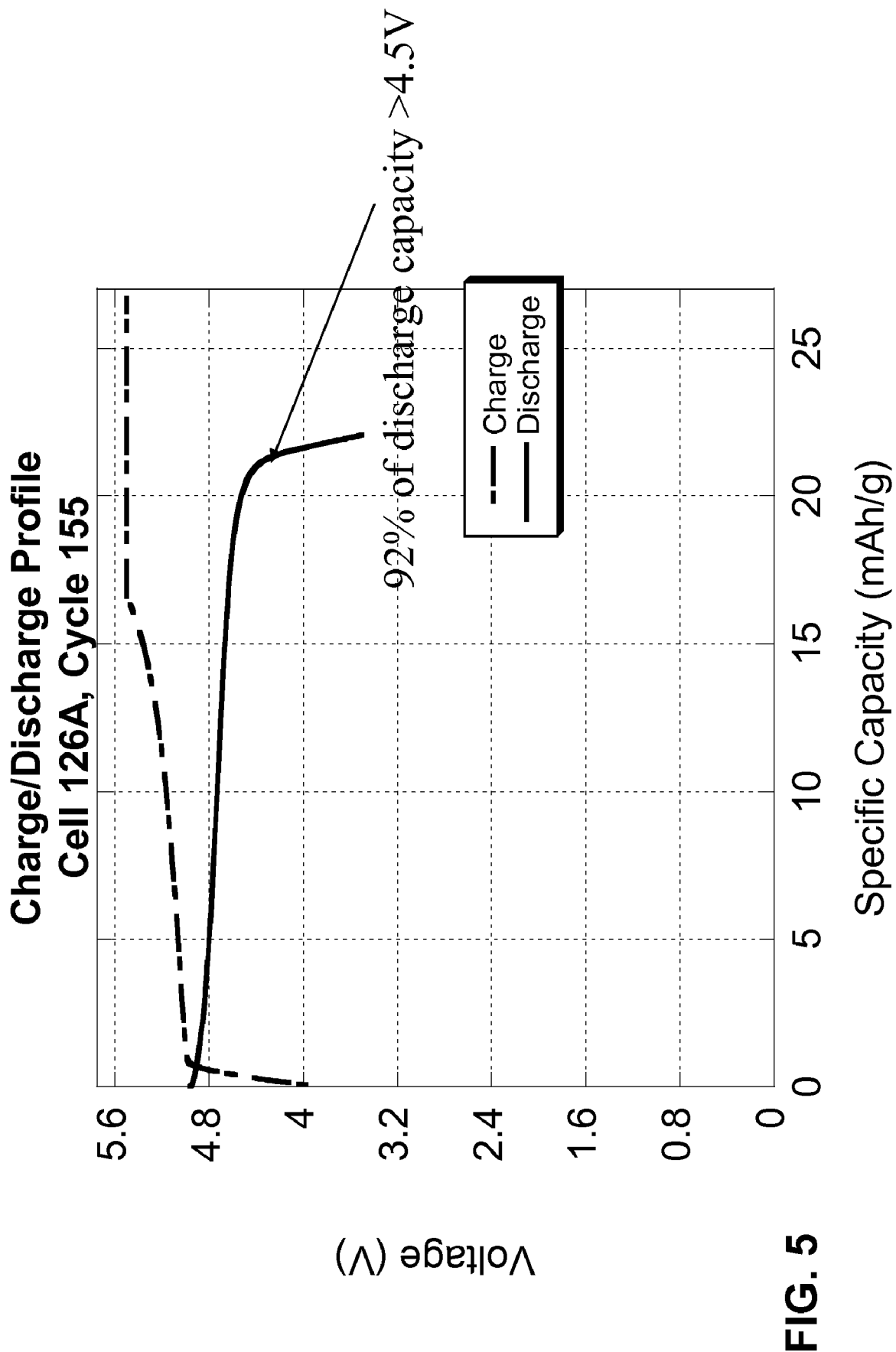
FIG. 5 is a charge/discharge profile after 155 cycles for a cell having a graphite coated aluminum foil cathode, Li anode, and excess LiF and 0.25 M TPFPB solution in EIS.
Figure 6:
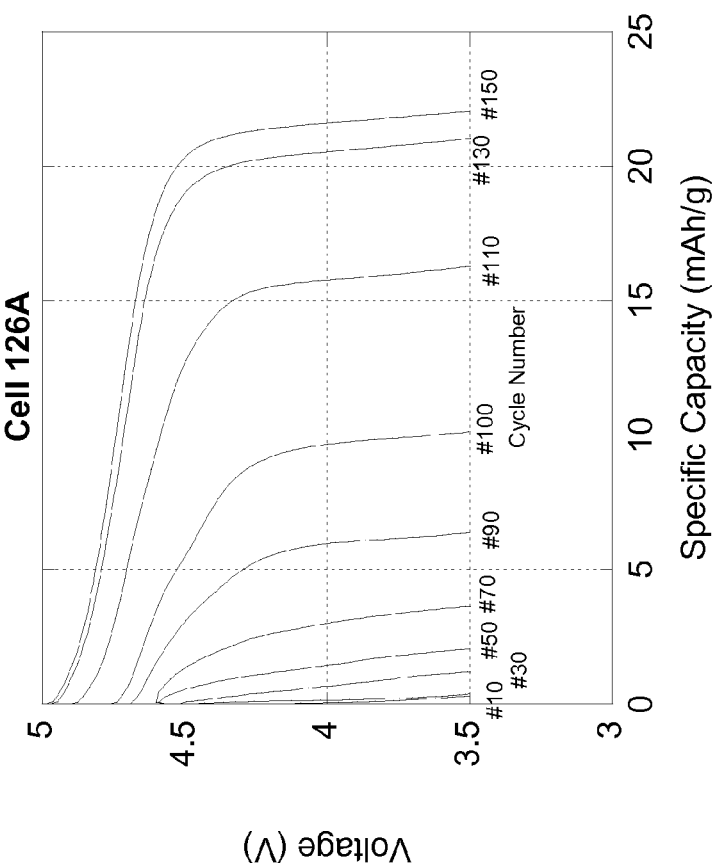
FIG. 6A is a plot of specific capacity as a function of cycle number for charge and discharge.
FIG. 6B is a discharge profile as a function of cycle number. The plot shows cycle numbers from between 10 and 150, as indicated.
Figure 6:
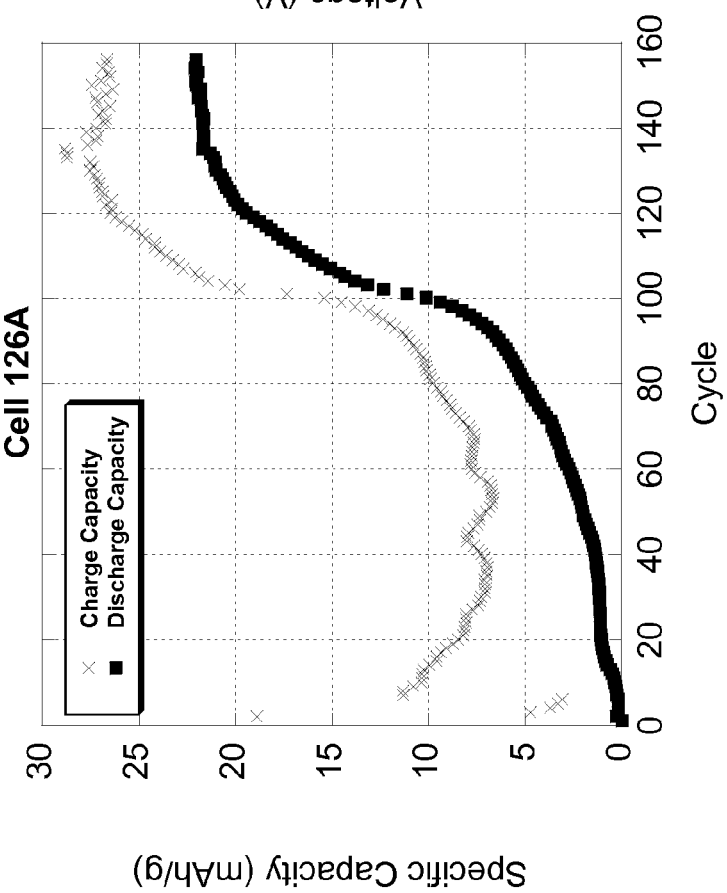

FIG. 5 is a charge/discharge profile for cell 126A for a cell having a graphite coated aluminum foil cathode, Li anode, and excess LiF and 0.25 M TPFPB solution in EIS that demonstrates a reversible, single plateau that shifts to higher voltage and larger capacity with cycling. FIG. 6 shows the trend in specific capacity (FIG. 6A) and voltage and specific capacity (FIG. 6B) as a function of cycle number. Without being bound to a specific theory, the improvement in cell performance with time is attributed to stable film formation on the cathode surface. The improved performance is evident in the improved discharge capacity and decrease in irreversible capacity with charge cycle. The cathode specific capacity for these still unoptimized cells is about 22 mAh/g, which is below state of art specific capacities $LiNi_{0.8}Co_{0.2}O_2$ cells (about 180 mAh/g). This experiment, however, demonstrates that LiF electrolyte-containing graphite cathodes exhibit promise for use in rechargeable Li-ion batteries.

Figure 7:
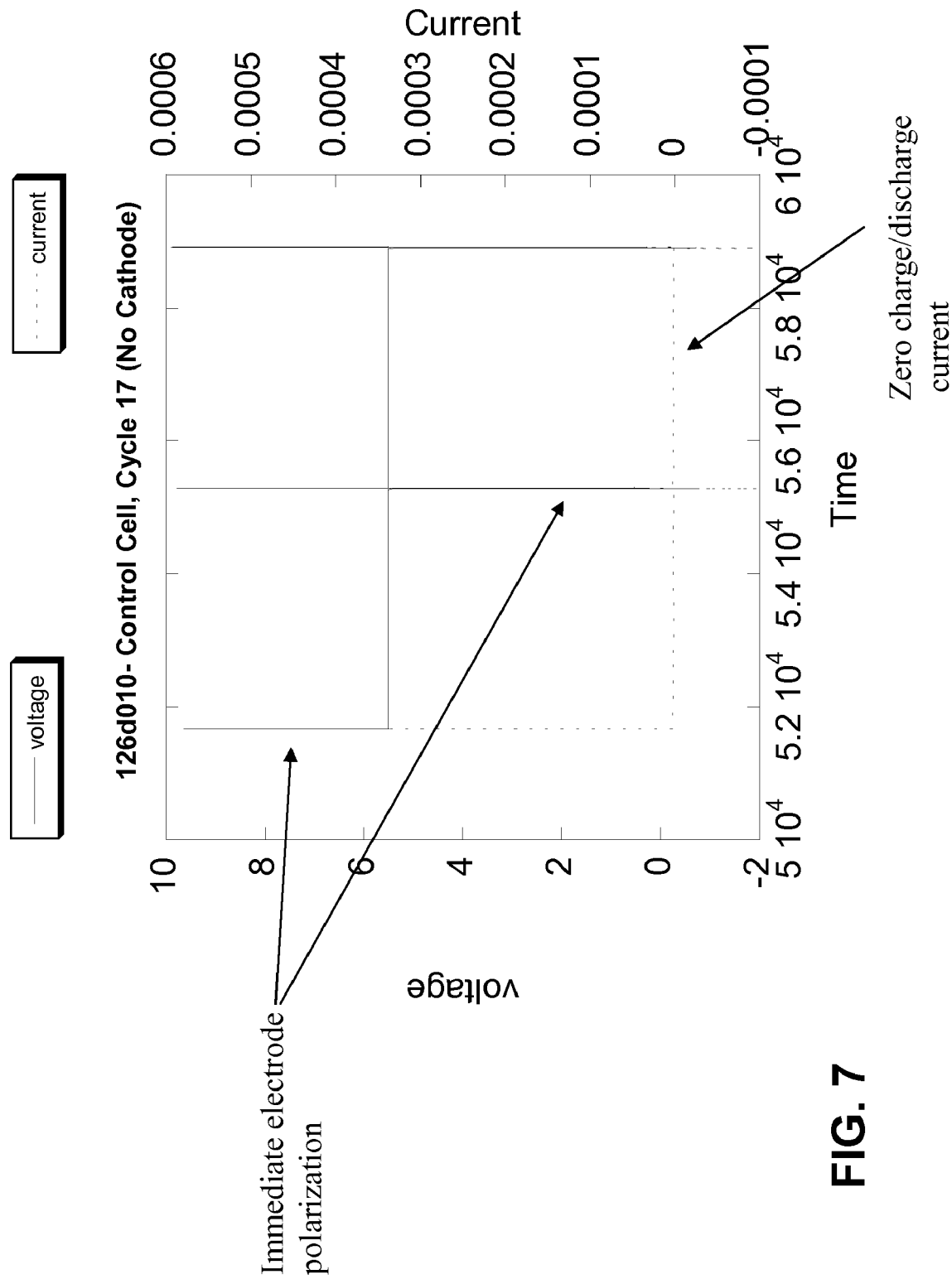
FIG. 7 is a plot of voltage (left axis) and current (right axis) on cycle 17 of a cell having no cathode as a function of time. As shown, electrode polarization does not result in any charge/discharge current suggesting that corrosion of the anode is not mimicking ion insertion/de-insertion.
Figure 8:
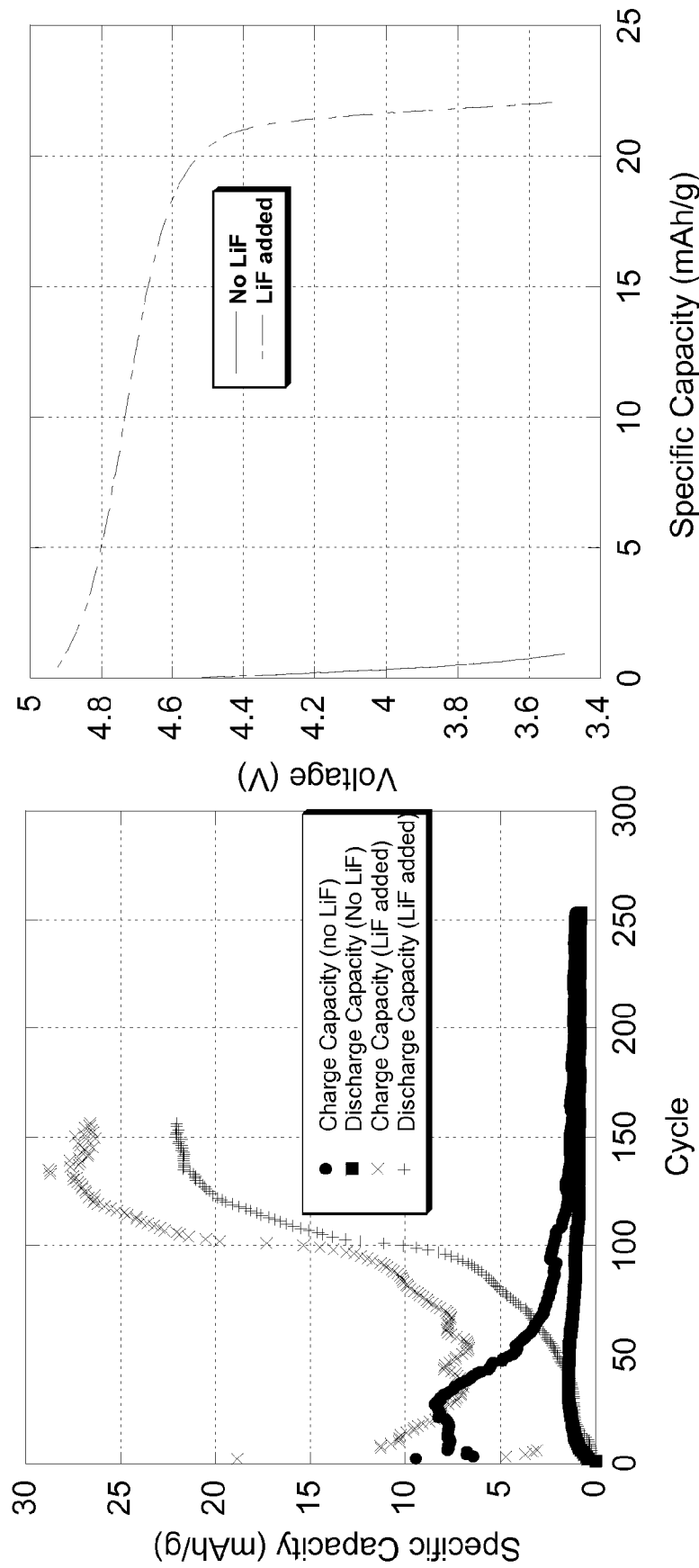
FIG. 8 compares (A) the specific capacity as a function cycle; and (B) discharge plot after 150 cycles for cells with LiF and cells without LiF, suggesting anion receptor intercalation/de-intercalation is not responsible for the cell's capacity.

Control experiments are conducted to verify that corrosion issues do not mimic ion insertion/de-insertion. FIG. 7 shows near zero charge/discharge capacity after 17 cycles for a "bare cell" that contains no graphite cathode. Evaluation of electrochemical cells without added LiF address whether capacity is simply due to anion receptor insertion/de-insertion. FIG. 8A is a plot of specific capacity as a function of cycle number for electrolytes with and without added LiF, showing that significant capacity requires added LiF. FIG. 8B is a discharge plot at cycle 155 for a cell with LiF and a cell without LiF added. FIG. 8 illustrates that salt-free cells have near-zero capacity and so capacity is not due to receptor insertion/de-insertion.

Figure 9:
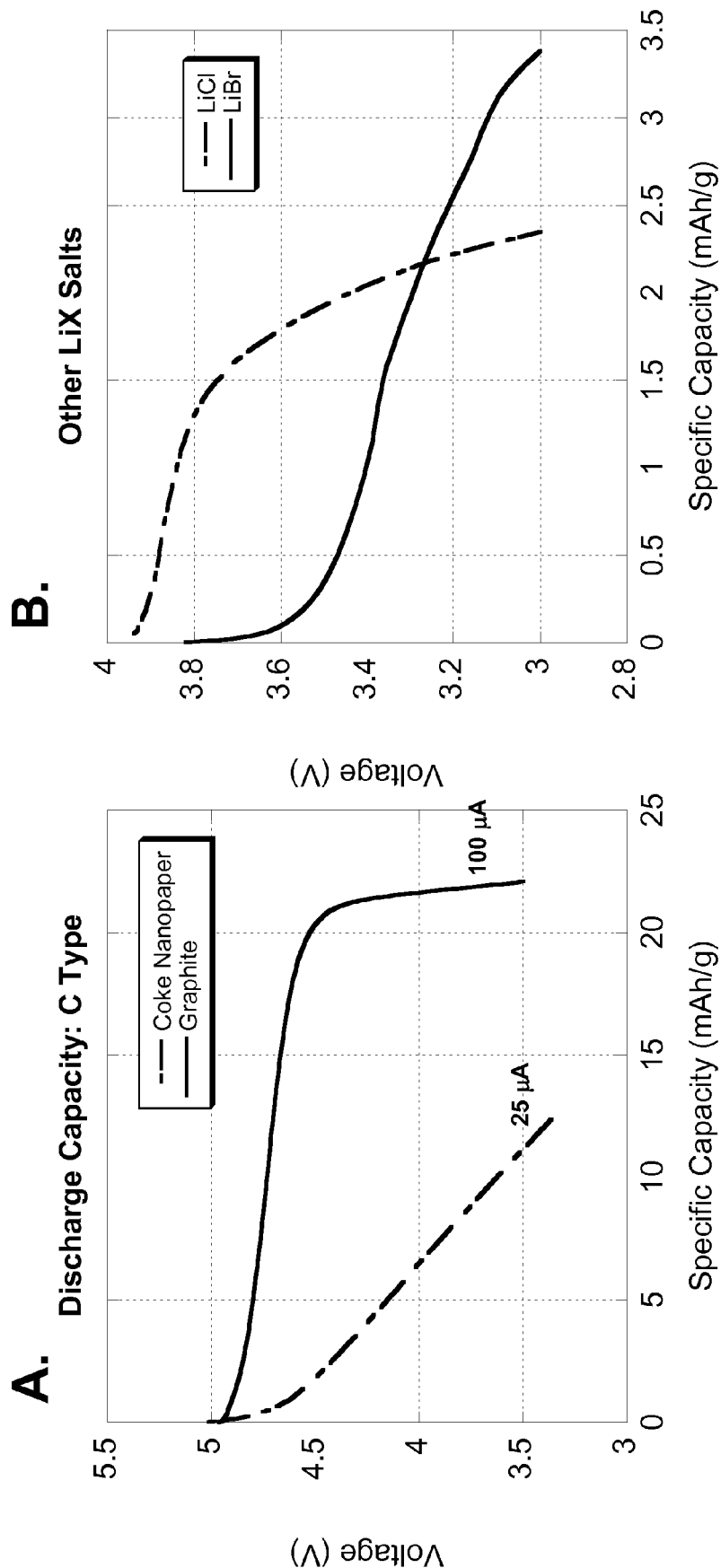
FIG. 9A is a comparison of the effect of carbonaceous material on discharge capacity. The dashed line is for a coke nanopaper cathode and the solid line is for a graphite cathode.
FIG. 9B evaluates the effect of choice of Li salt on discharge capacity. Both LiCl and LiBr have a significantly lower specific capacity than electrolytes comprising LiF salt (see FIG. 8B).

The effect of carbonaceous material and type of Li salt is examined in FIG. 9. A graphite coated cathode exhibits superior discharge capacity compared to a coke nanopaper coated cathode (FIG. 9A). FIG. 9B shows LiBr and LiCl-based cells have lower potentials than LiF-based cells. Because of the relatively large size $Br^-$ and $Cl^-$ anions relative to $F^-$ anions, LiBr and LiCl cells rapidly degrade with cycling, unlike LiF-based cells. Accordingly, preferred embodiments of the present invention utilize $F^-$ anions.

Figure 10:
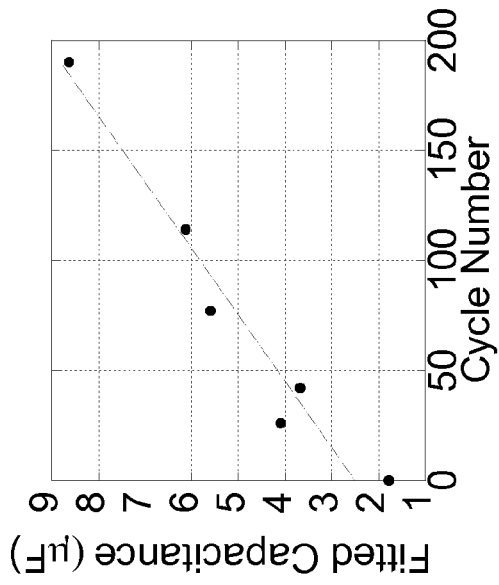
FIG. 10 is an impedance plot for a cell cycled 0, 26, 77 and 190 times. A indicates impedance generally decreases with cycling. B is a plot of fitted capacitance as a function of cycle number. C is an impedance plot for a cell charging and discharging.
Figure 10:
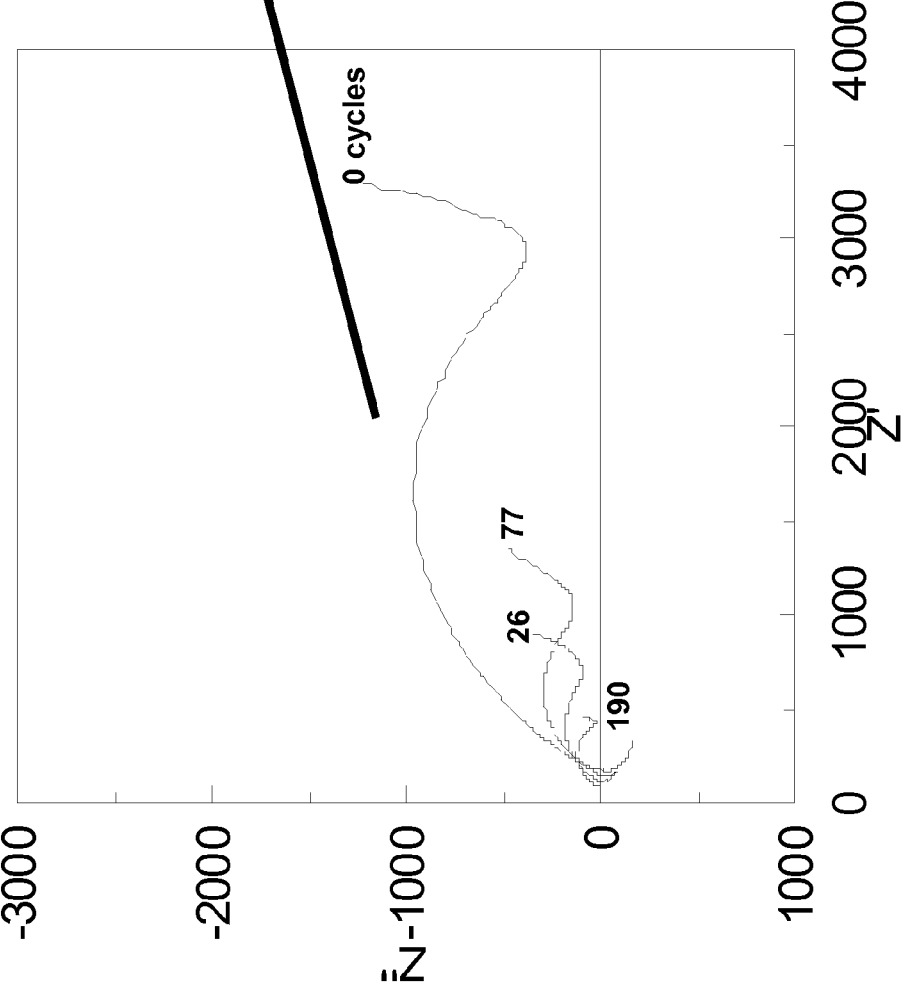

Impedance spectroscopy is a useful tool for evaluating electrochemical cells. FIG. 10A indicates cells decrease impedance with cycling, with an increase in lumped capacitance term. This impedance decrease with cycling could indicate an increase in surface area via exfoliation of the carbonaceous cathode. FIG. 10C shows an increase in resistance on charging, an indication of salt starvation.

Figure 11:
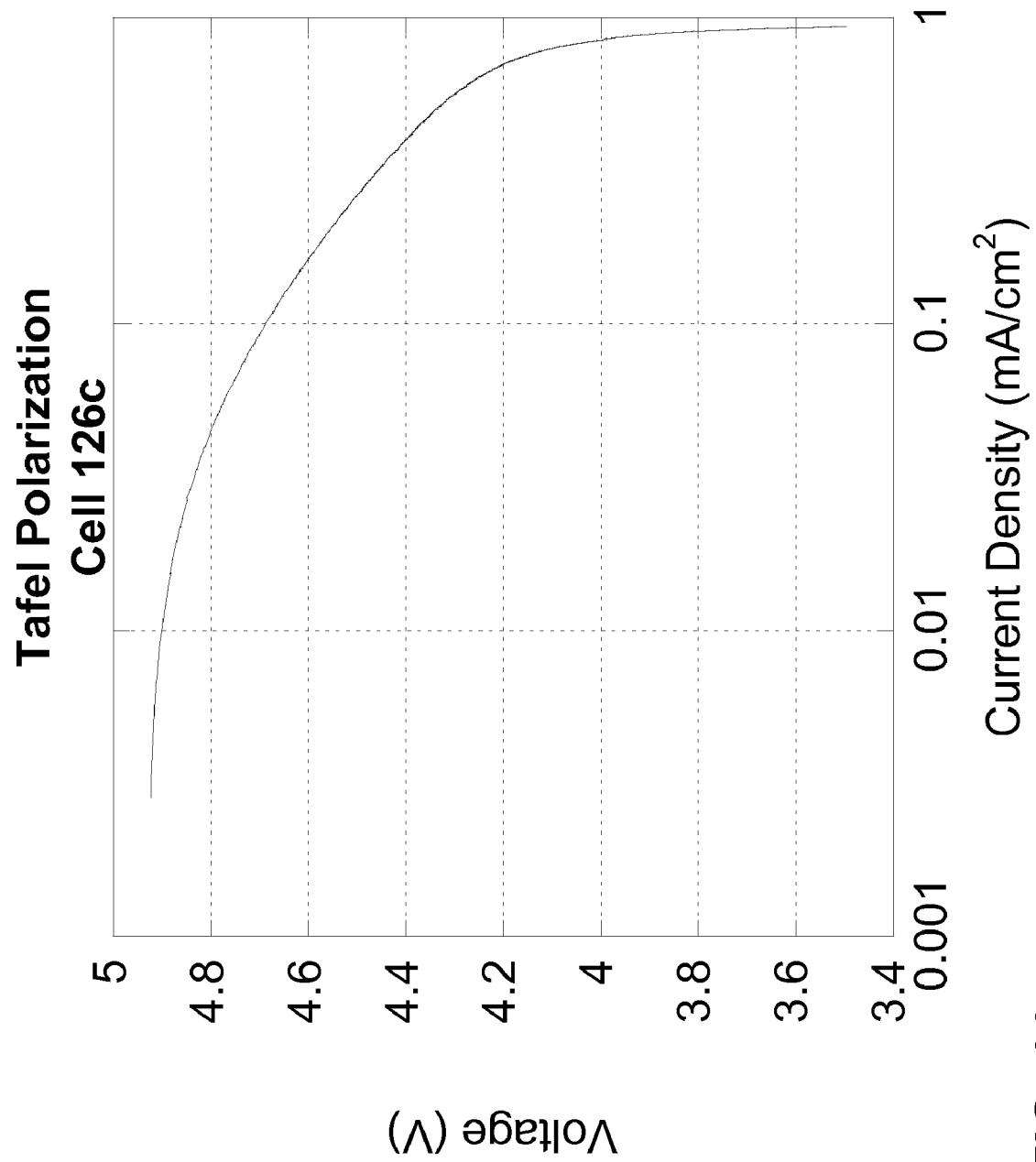
FIG. 11 is a plot of voltage as a function of current density for cell 126c. At 0.1 mA/cm$^2$ there is a 200 mV polarization suggesting moderately low electrode rate capability.

FIG. 11 is a Tafel Polarization that indicates that there is a 200 mV polarization at 0.1 $mA/cm^2$ suggesting moderately low rate capability.

Figure 12:
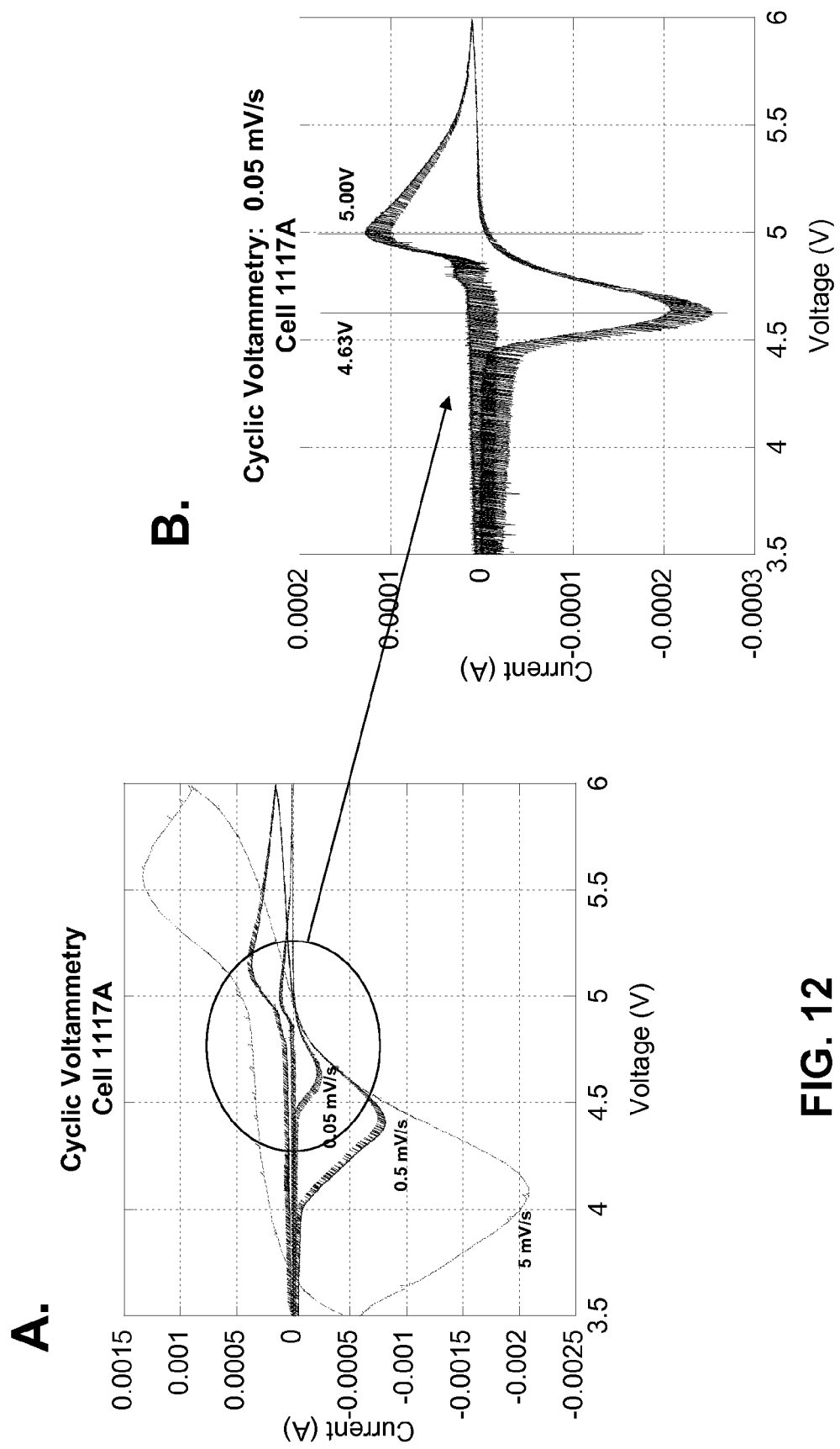
FIG. 12A is a cyclic voltammetry plot of cell 1117A for 5 mV/s, 0.5 mV/s and 0.05 mV/s.
FIG. 12B is an expanded view of the results for 0.05 mV/s.

FIG. 12 is a cyclic voltammetry plot indicating a single oxidation/reduction pair is observed from 3.5V to 6V.

Figure 13B:
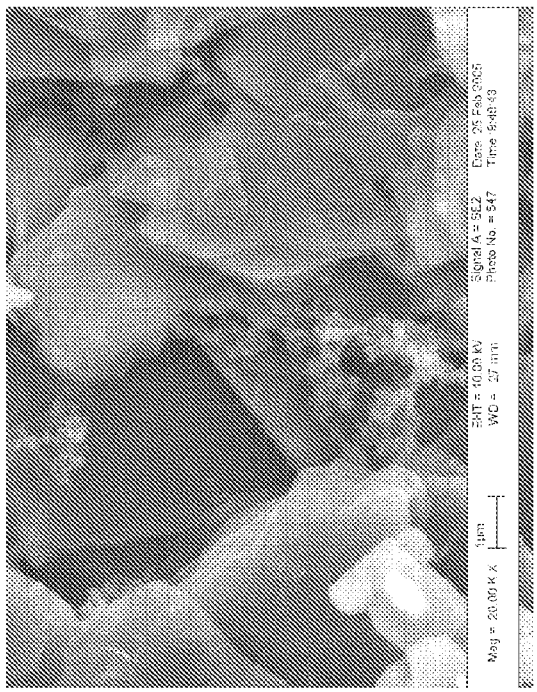
FIG. 13 are SEM micrographs indicating cycling does not induce graphite exfoliation. A. Alfa graphite cathode without cycling. B. Alfa graphite cathode having cycled 142 times. C. Graphite that has undergone exfoliation.
Figure 13A:
Figure 13C:
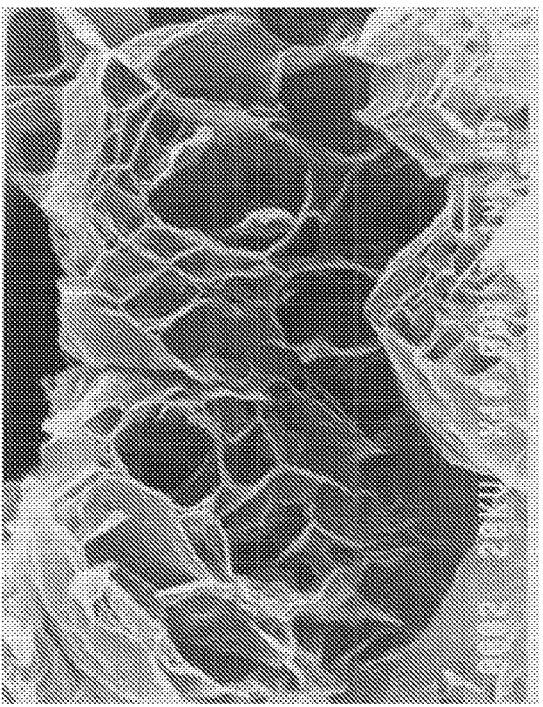

FIG. 13 are SEM micrographs of the graphite cathode. FIG. 13A is an SEM of alfa graphite cathode with no cycling. FIG. 13B is an SEM of alfa graphite cathode cycled 142 times. FIG. 13C is an SEM of exfoliated graphite produced when fluorinated graphite dust is impulse heated from room temperature to 7,500 degrees in less than 1 ms (from Thomas J. Manning: http://www.valdosta.edu/~tmanning/). These SEMs indicate that cycling does not induce graphite exfoliation.

Figure 14:
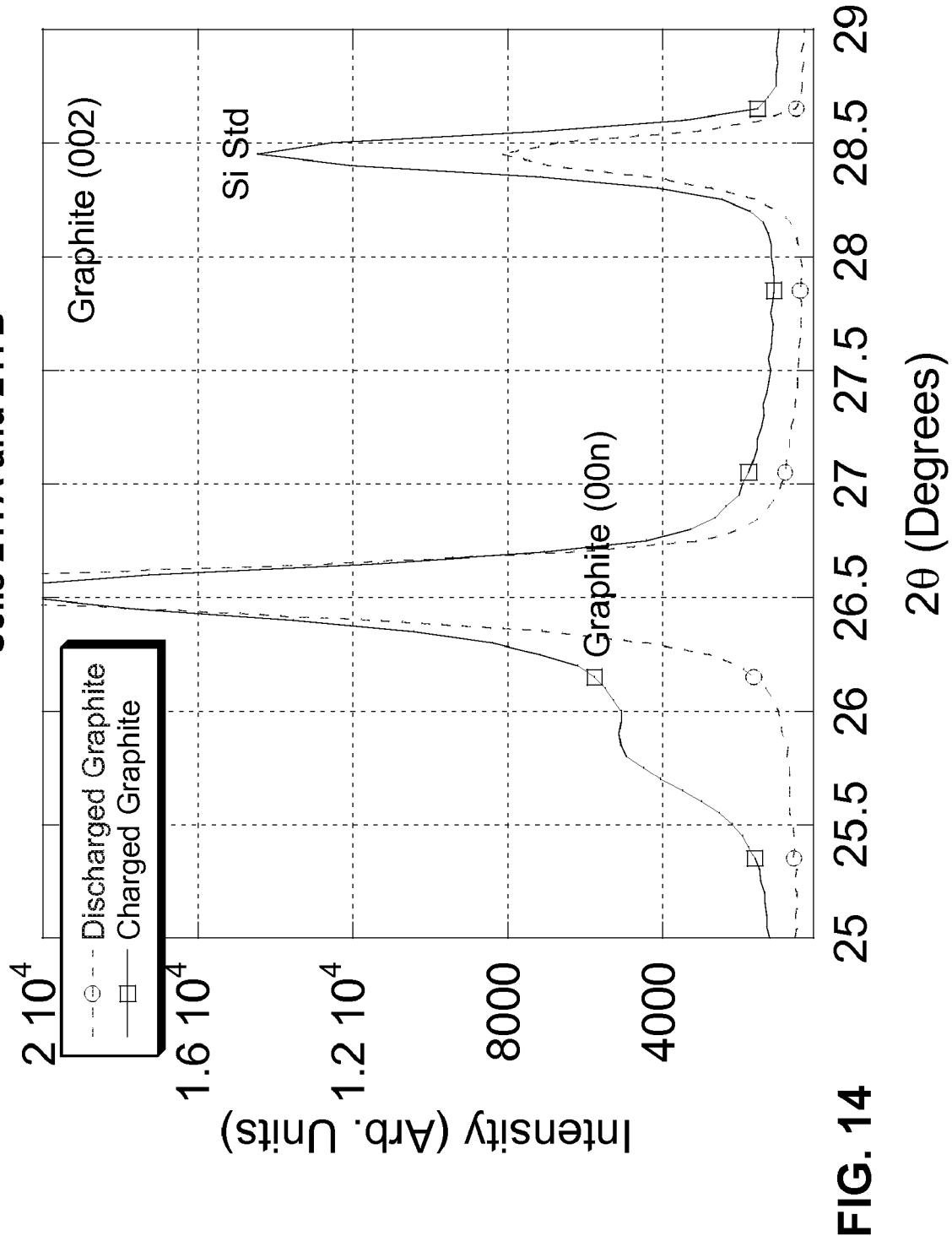
FIG. 14 is x-ray diffraction data of charged (solid line and squares) and discharged (dashed line and open circles) graphite (002) for cells 217A and 217B.
Figure 15:
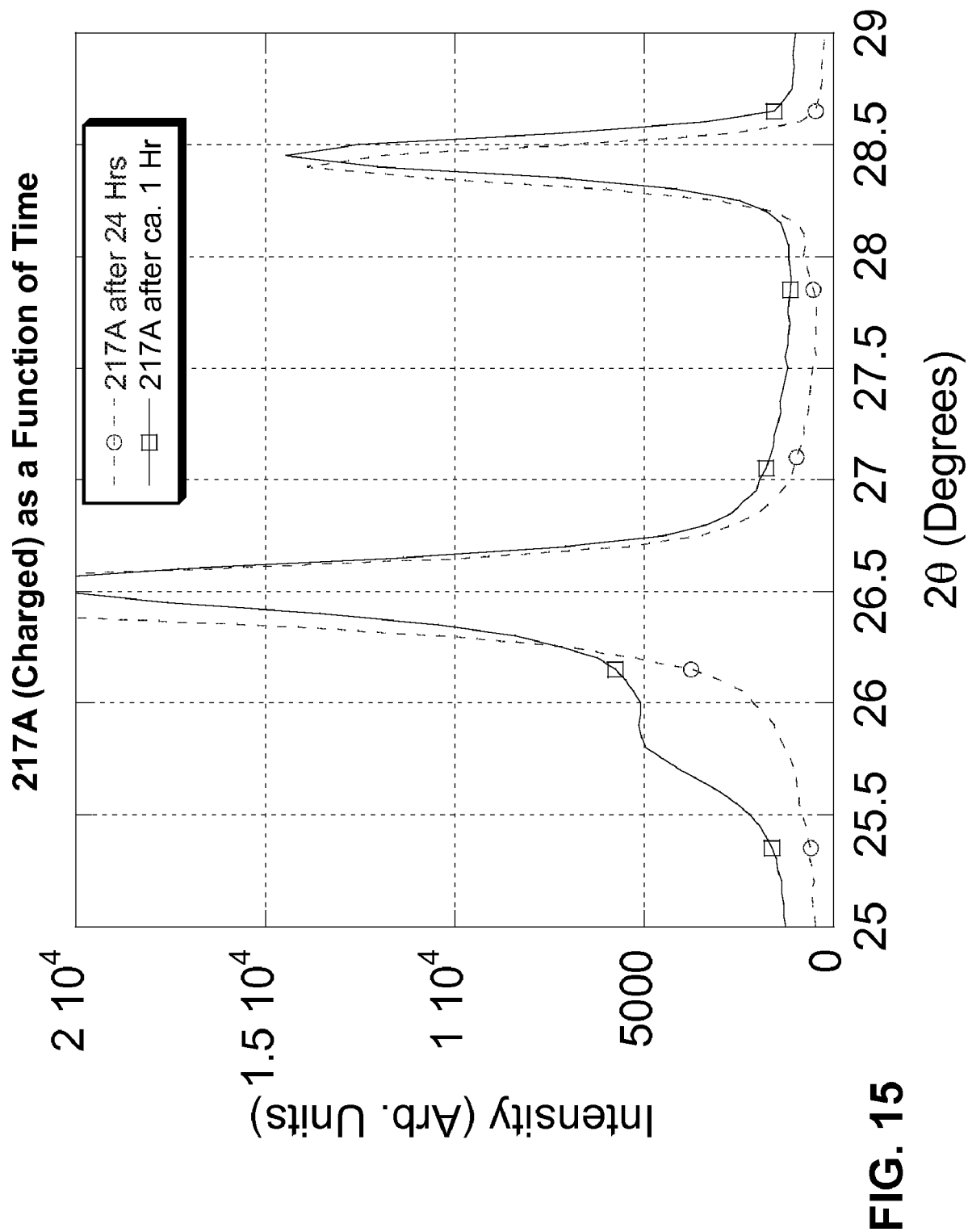
FIG. 15 is x-ray diffraction data for charged graphite exposed to air for 1 hour (squares and solid line) and for 24 hours (circle and dashed lines).

FIG. 14 are x-ray diffraction results showing that the graphite lattice relaxes after de-intercalation. In particular, discharged graphite is similar to pristine graphite in that there is no low angle shoulder. X-ray diffraction is also used to investigate whether charged graphite behaves similarly to other graphite intercalation compounds (GICs). FIG. 15 shows x-ray diffraction data for charged graphite exposed to air for 1 hour and for 24 hours. The disappearance of the low angle shoulder indicates that charged graphite is unstable in room air after 24 hours exposure.

Figure 16:
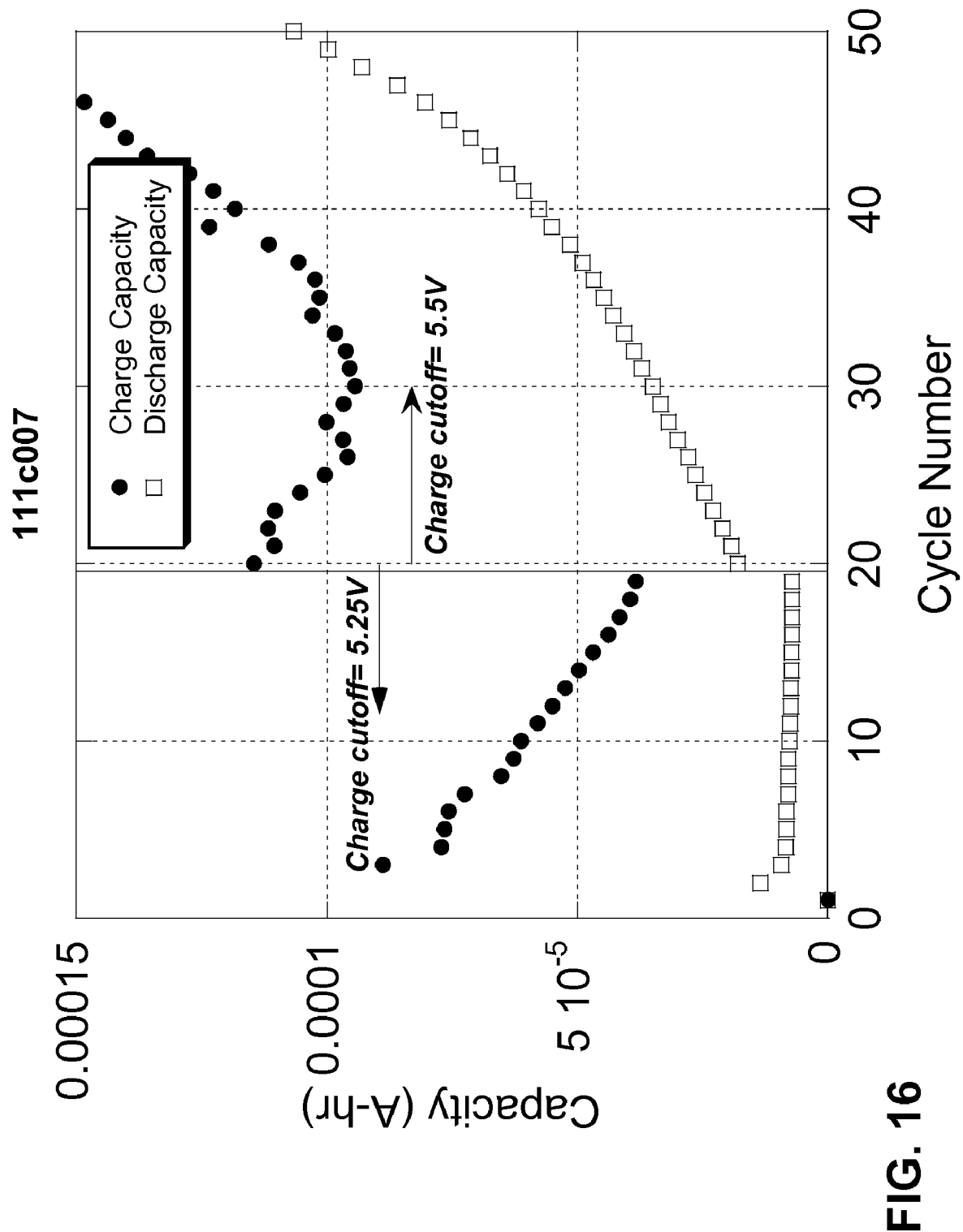
FIG. 16 shows the effect of cycling number and charge cutoff voltage on cell capacity.
Figure 17:
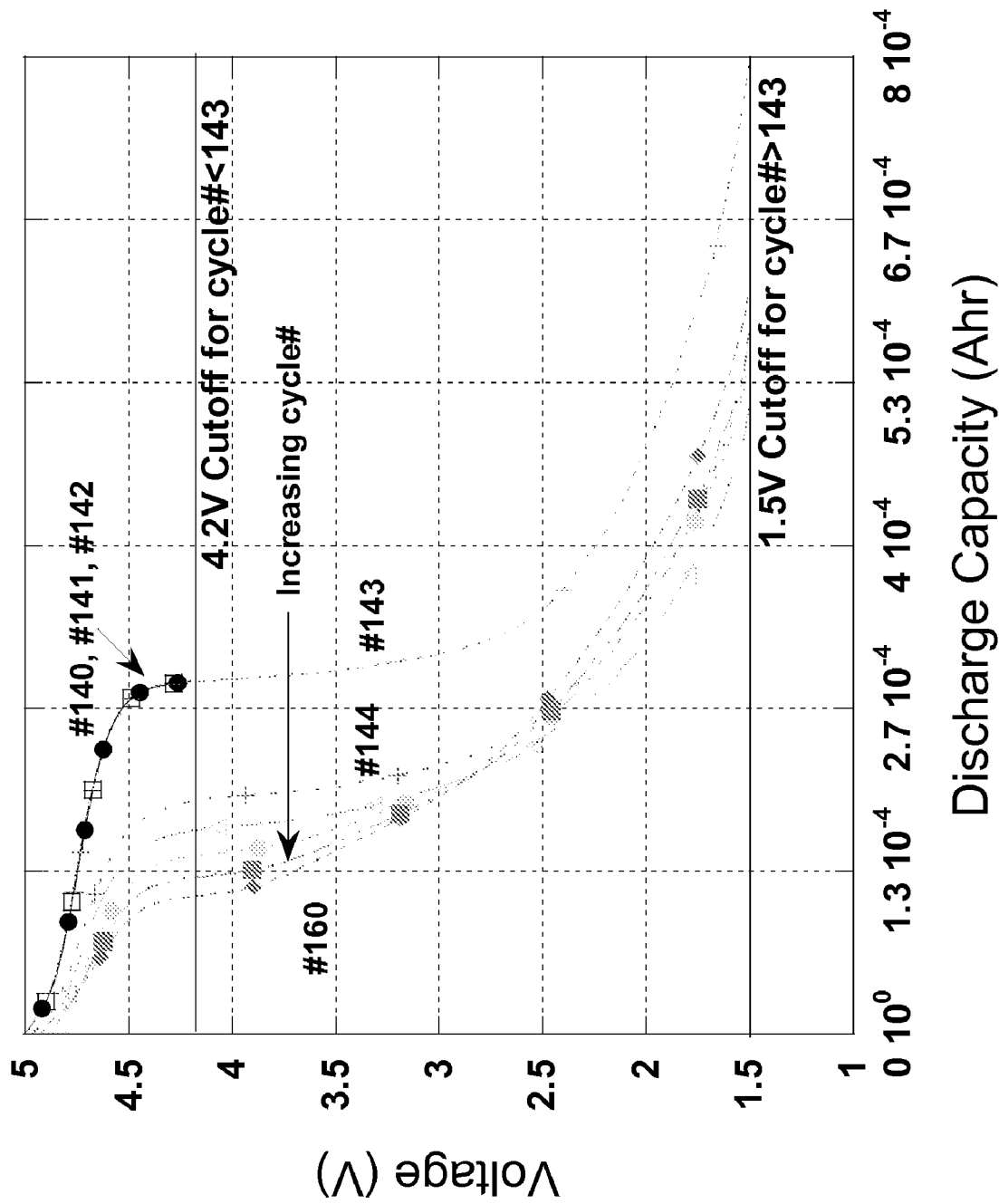
FIG. 17 is a plot of voltage versus discharge capacity for cutoff voltages of 4.2V for cycles less than 143 and cutoff voltages of 1.5V for cycles greater than 143.
Figure 18:
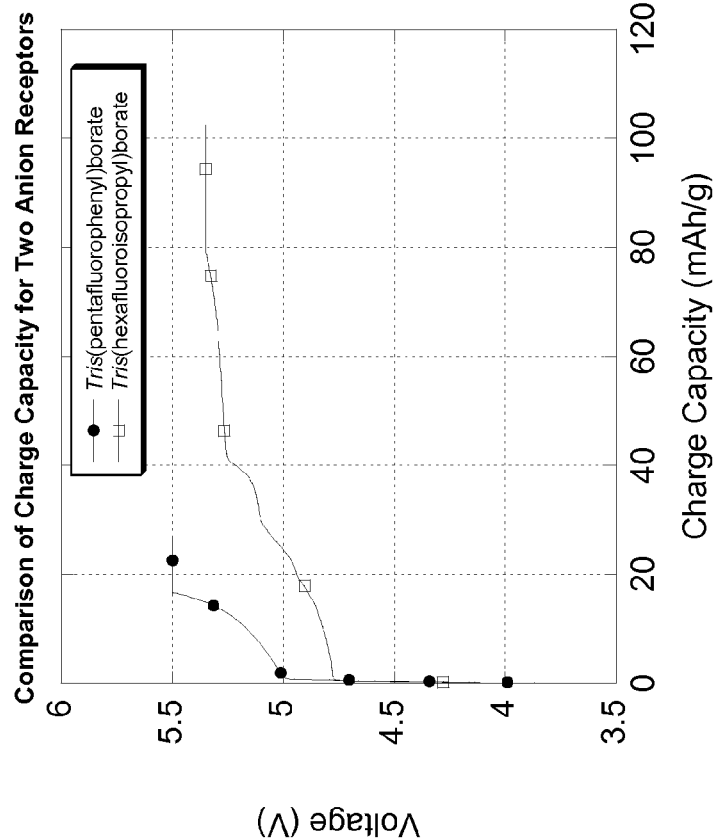
FIG. 18 compares the discharge (A) and charge (B) capacity for two anion receptors (Tris(pentafluorophenyl)borate (TPFPB) and Tris(hexafluoroisopropyl)borate (THFiPB)).
Figure 18:
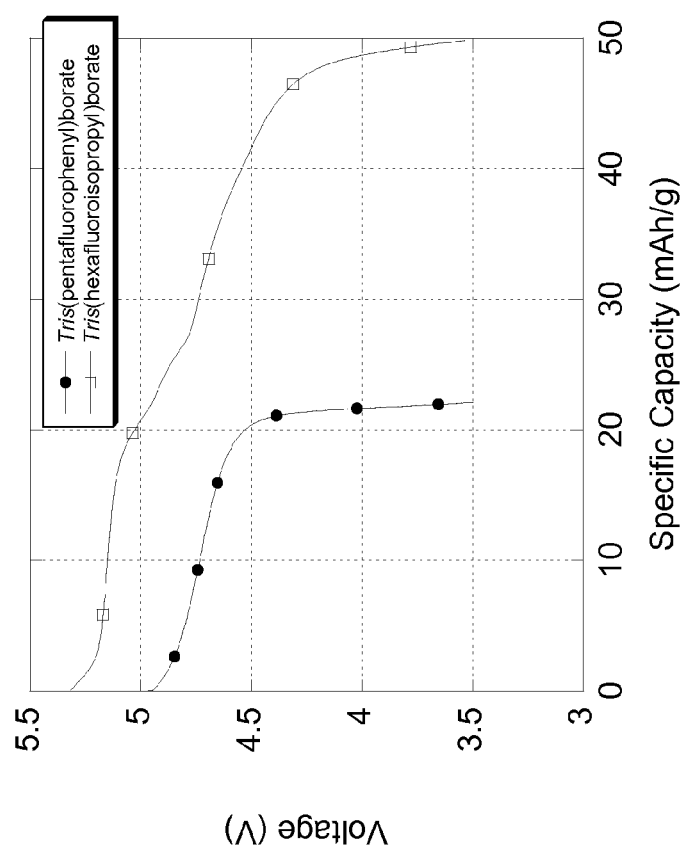

Interestingly, higher charge voltages (>5.5V) result in dramatic improvements in capacity without increases in irreversible capacity (FIG. 16). FIG. 17 summarizes the results for a 4.2 V cutoff (for cycles <143) and for a 1.5V cutoff (for cycles >143). Lower discharge voltages (e.g., 1.5V) result in high voltage capacity loss. It is important to note that solvent and/or anion receptor can affect and mitigate this high voltage capacity loss. For example, FIG. 18 shows the effect of anion receptor type on discharge capacity (FIG. 18A) and charge capacity (FIG. 18B). In this example, use of the anion receptor Tris(hexafluoroisopropyl)borate (THFiPB) results in significantly improved cathode specific capacity (50 mAh/g) compared to Tris(pentafluorophenyl)borate (TPFPB) (about 20 mAh/g). Accordingly, it is important that the anion receptor be appropriately matched or "tuned" to the cathode electrode. Methods for screening and selecting appropriate anion receptors are described hereinbelow.

Figure 19:
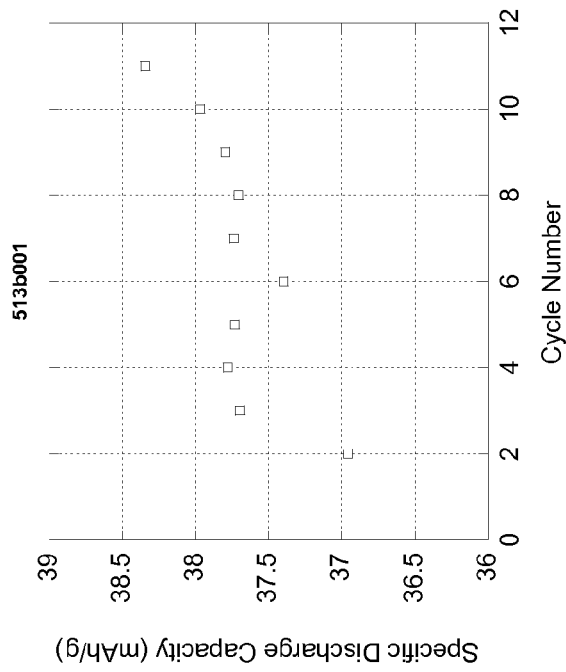
FIG. 19 summarizes the charge and discharge capacity as a function of cycle number (A and B) and discharge profile (C) for THFiPB anion receptor.
Figure 19:
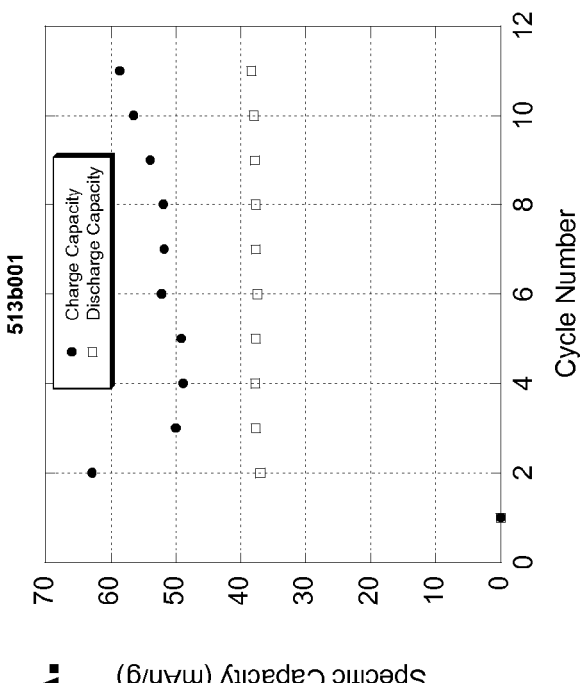
Figure 19:
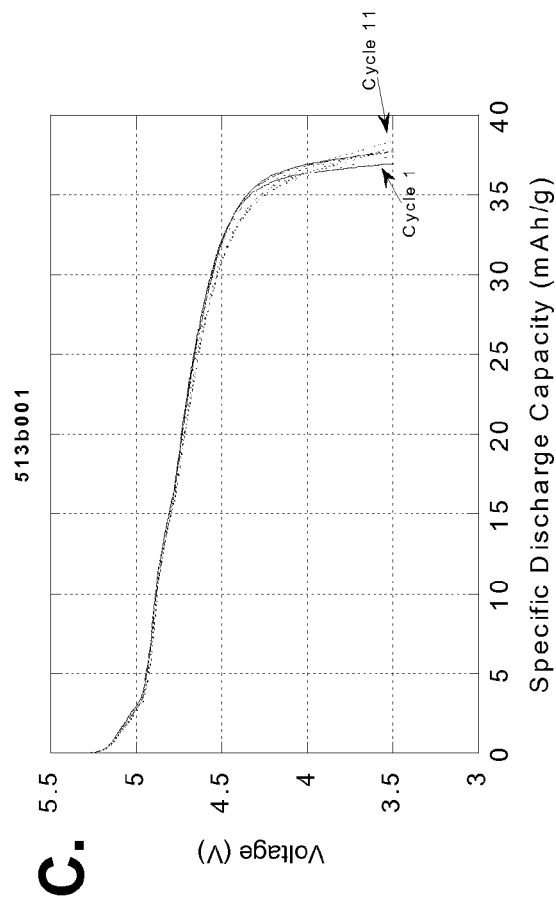

FIG. 19 summarizes the charge and discharge capacity (A and B) and discharge profile (C) as a function of cycle number for a THFiPB anion receptor. Compared to equivalent plots for TPFPB (FIG. 6), use of THFiPB as the anion receptor yields improved battery properties for this battery system.

Figure 20:
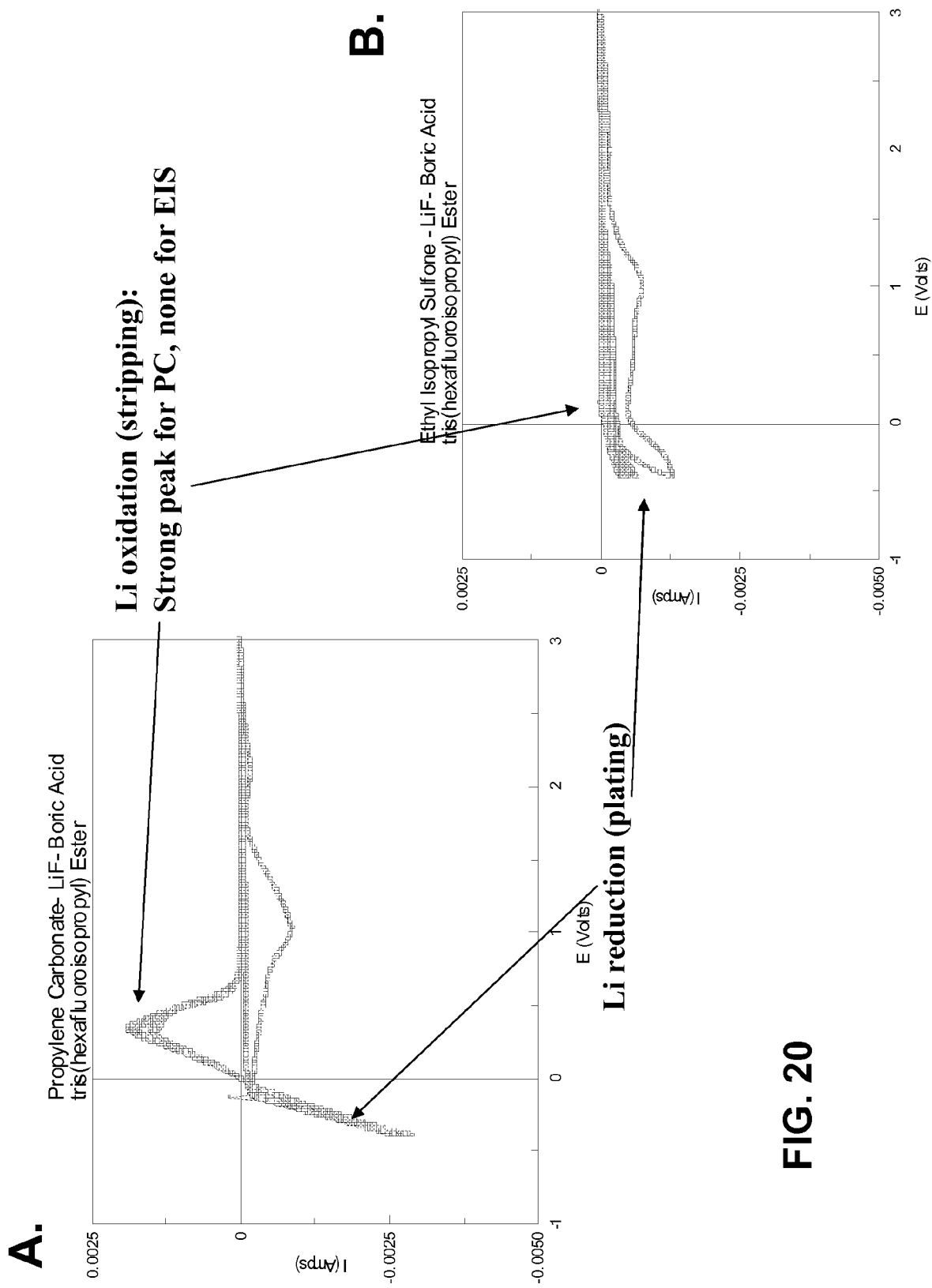
FIG. 20 is a cyclic voltammetry scan of anode half cell, demonstrating excellent reductive stability of the electrolyte against lithium plating and stripping for A. Propylene Carbonate-LiF-Boric Acid tris(hexafluoroisopropyl) Ester, but not for B. Ethyl Isopropyl Sulfone-LiF-Boric Acid tris (hexafluoroisopropyl) Ester.

FIG. 20 examines the effect of choice of solvent on Lithium cyclability. In this example, propylene carbonate (PC) is more stable at the anode relative to ethyl isopropyl sulfone. Accordingly, PC will cycle much better. This experiment suggests that because sulfone-based solvents continue to chemically react, solfone-based solvents are preferably avoided in these battery systems.

Figure 21:
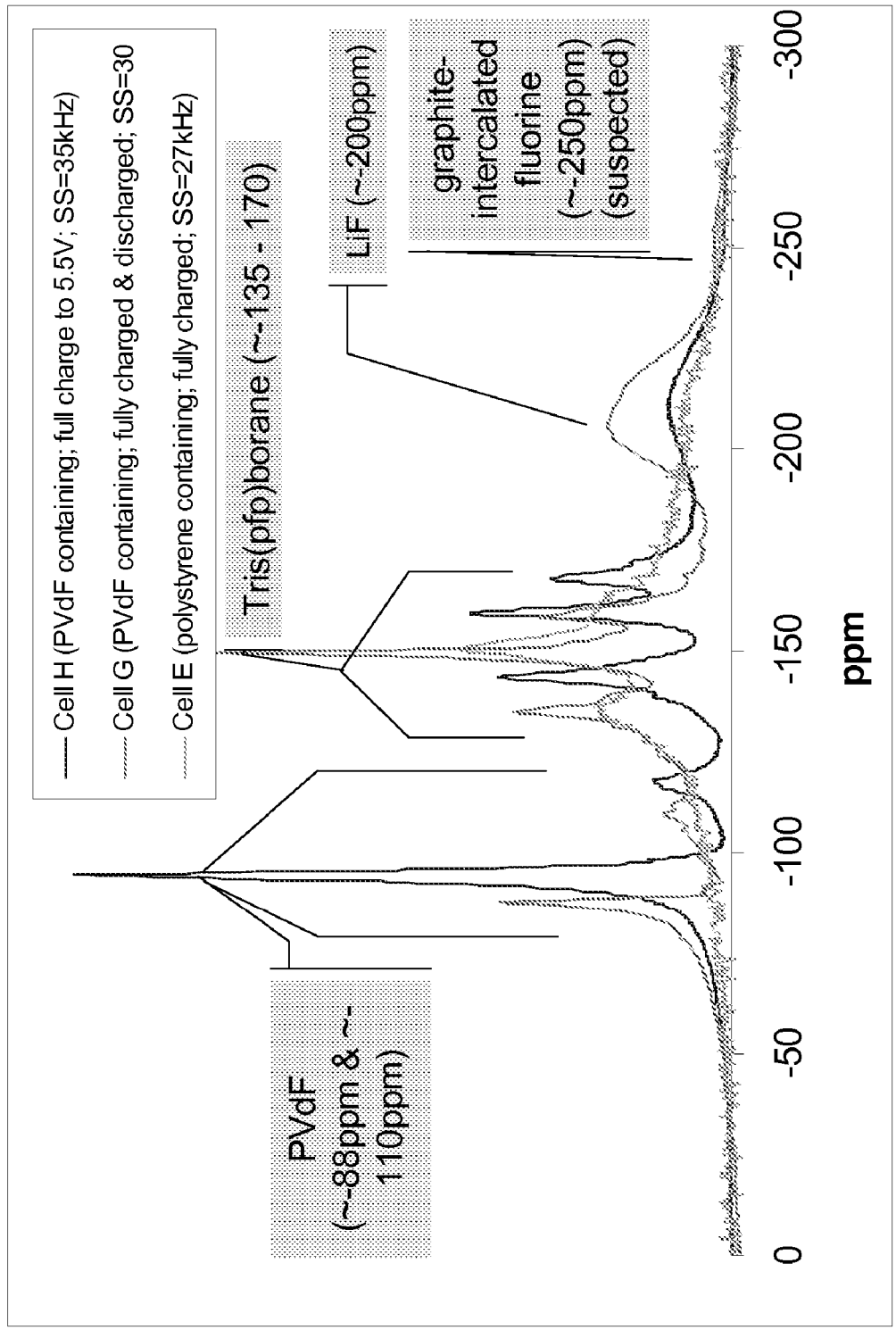
FIG. 21 is an $^{19}F$ Magic Angle Spinning (MAS) NMR spectra of chemically intercalated graphite anodes.

$^{19}F$ Magic Angle Spinning (MAS) NMR spectra of chemically intercalated graphite anodes that indicates $F^-$ is reversibly intercalating in the graphite cathode, as indicated by the peaks for each of Cell H, G and E in FIG. 21. The spectrum of Cell H has a Knight shift (shifted to the right) of approximately 6 ppm due to the increase in bulk conductivity. This increase is a result of fluorine intercalation, an effect which has been reported to be due to the change in C—F bonding from covalent to ionic. The different regions of fluorine-containing compounds are labeled. As cell H & E are fully charged, the peak around 250 ppm (indicating intercalated fluorine) is expected to be larger compared to cell G. However, this line is also reported to broaden with an increase in intercalated fluorine, therefore the total integrated peak size could be larger, it is just broadened and therefore difficult to compare directly.

Figure 22:
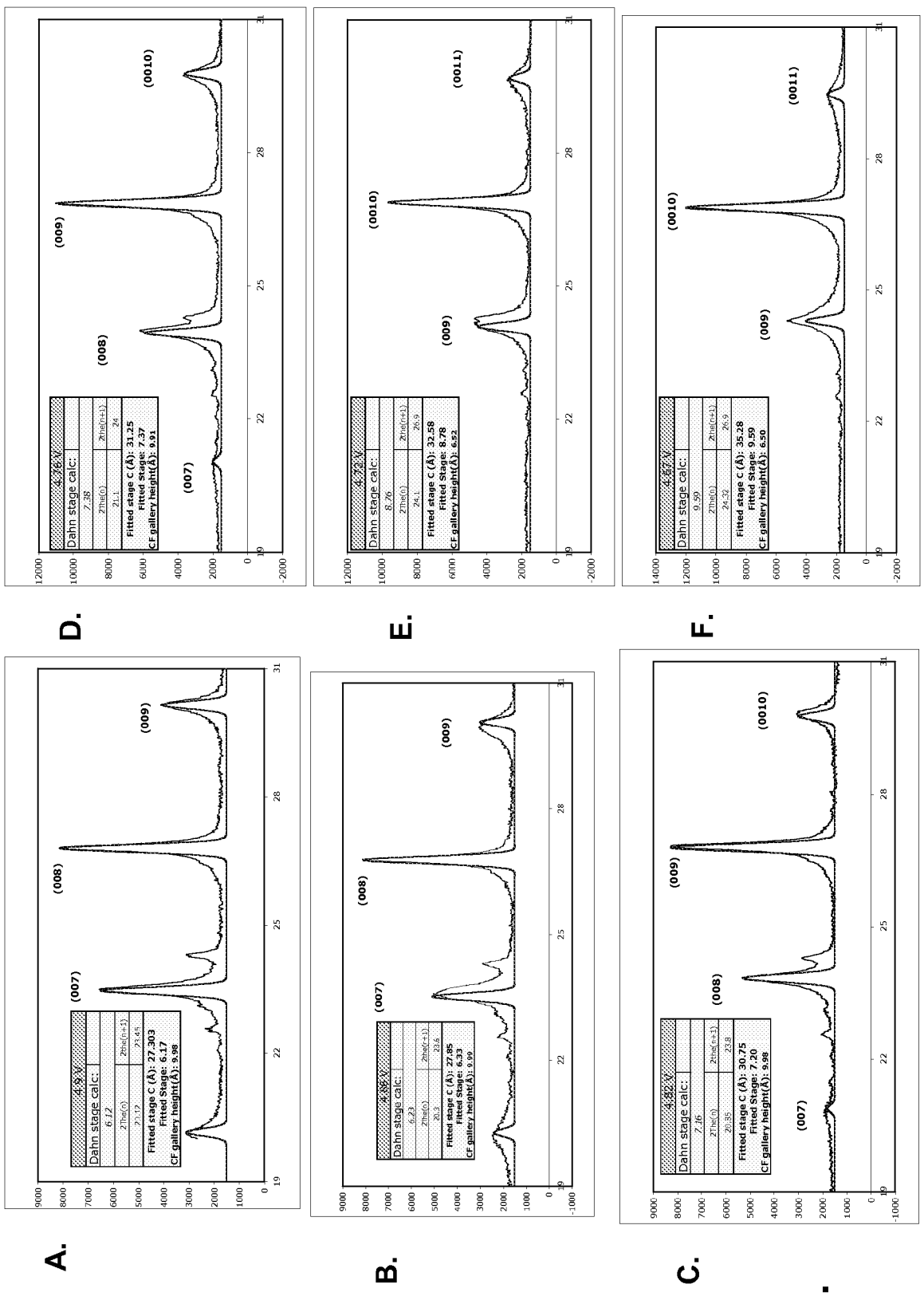
FIG. 22 are in-situ synchrotron X-ray diffraction data for a cell that is discharging: A. 4.9V; B. 4.86V; C. 4.82V; D. 4.76V; E. 4.72V; F. 4.67V; G. 4.63V; H. 4.54V; I. 4.45V; J. 3.54V.
Figure 22:
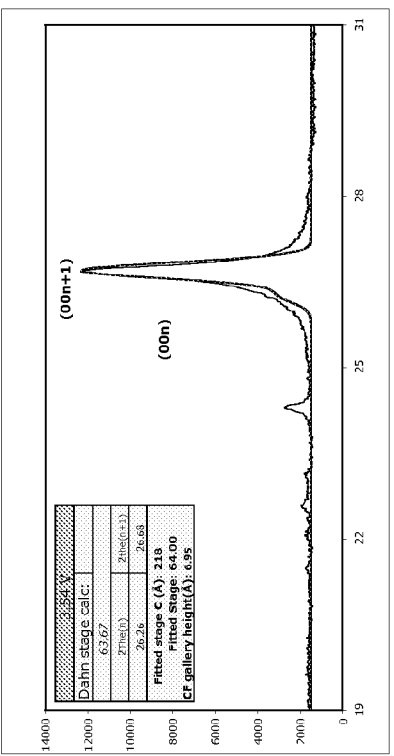
Figure 22:
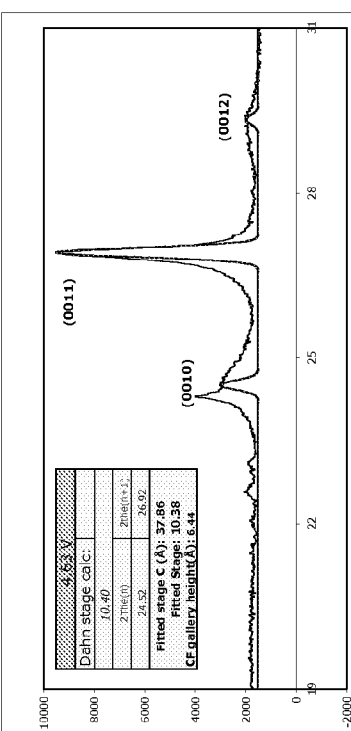
Figure 22:
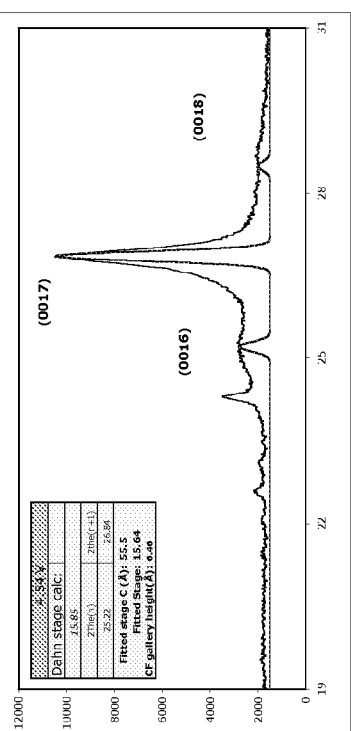
Figure 22:
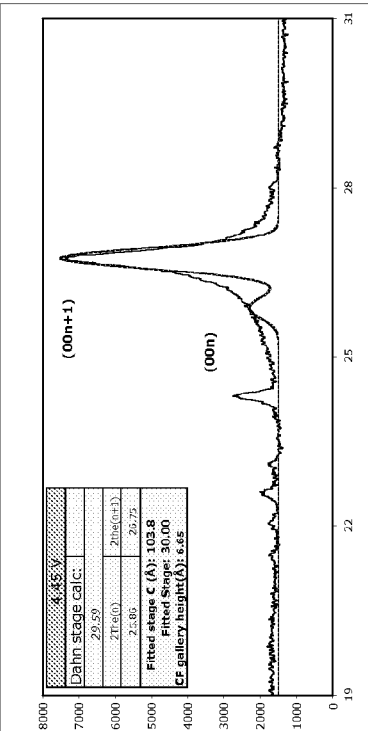

In-situ X-ray diffraction analysis of a cell that is undergoing discharge is shown in FIG. 22, as the cell discharges from a potential of 4.9V (FIG. 22A) to 3.54V (FIG. 22J). The change in peaks indicate reversible staging of $F^-$ in graphite, with $F^-$ intercalated with the graphite at higher voltages and de-intercalating as the cell discharges.

Figure 23:
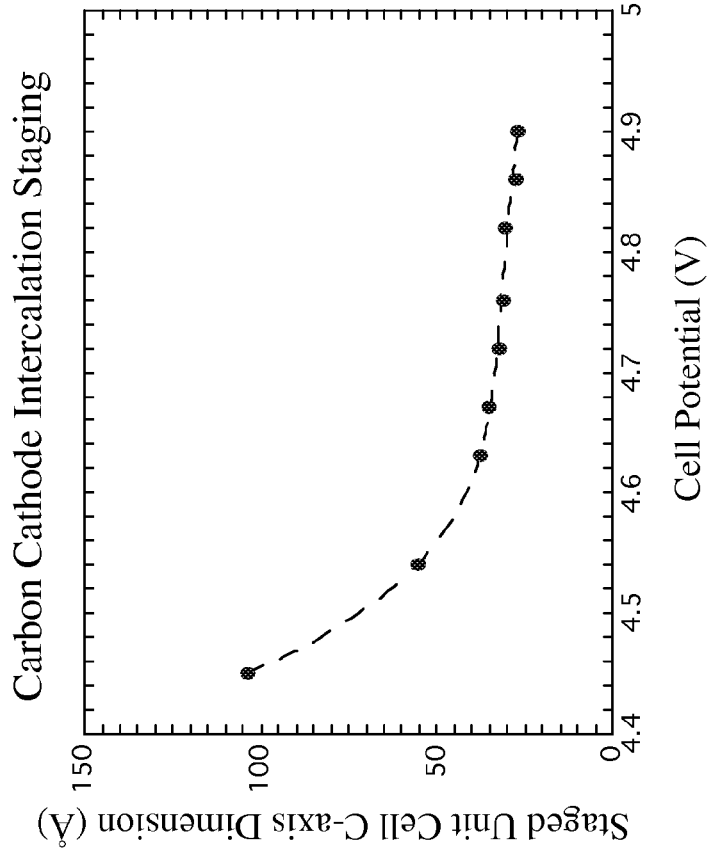
FIG. 23 summarizes carbon cathode intercalation staging obtained from in-situ x-ray diffraction experiments.
Figure 23:
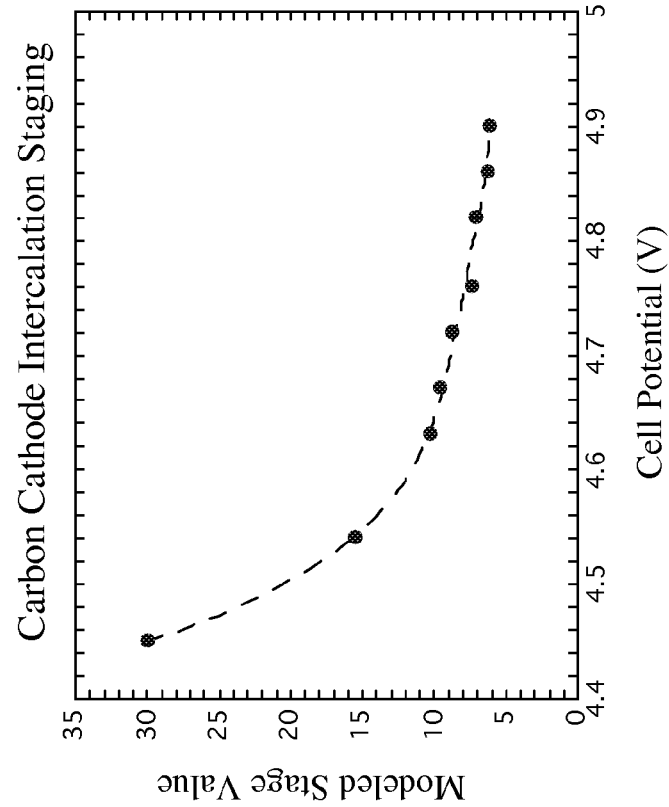

FIG. 23 summarizes carbon cathode intercalation staging obtained from in-situ x-ray diffraction experiments, demonstrating that the staging number decreases with increases in the charge voltage.

Figure 24:
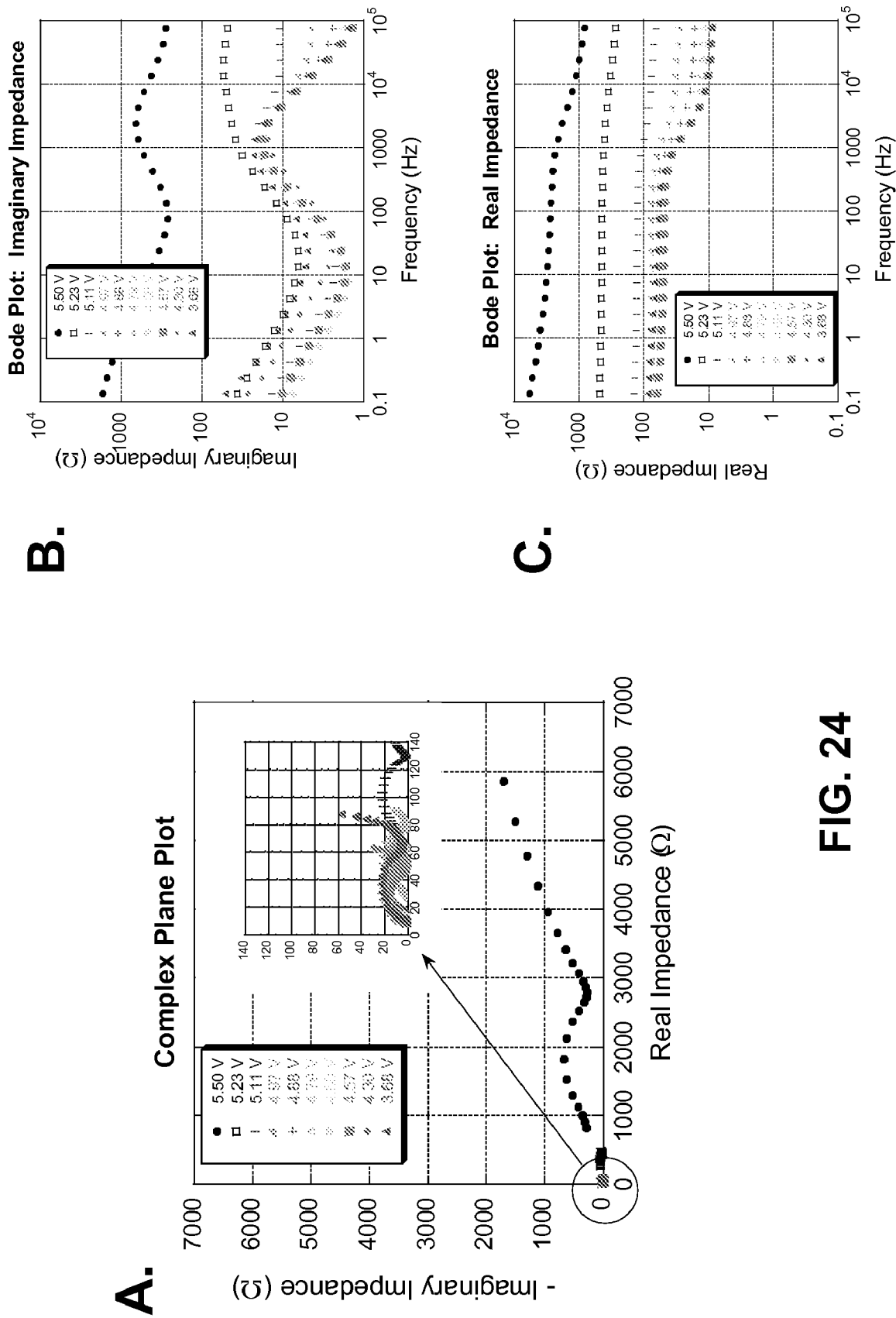
FIG. 24 plots impedance spectra as a function of operating voltage.
Figure 25:
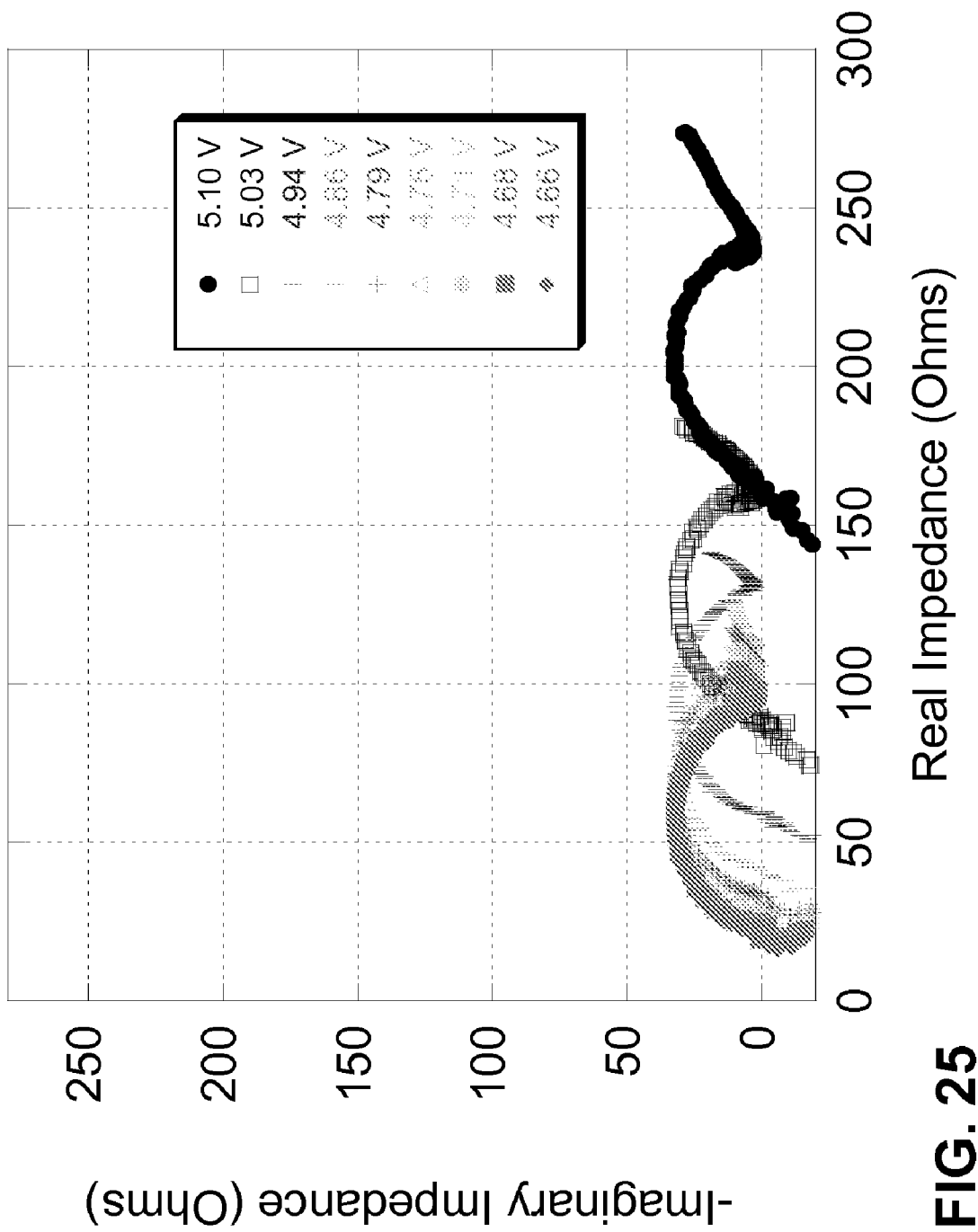
FIG. 25 are results from an impedance spectroscopy study of open circuit impedance of cell 1005d for a variety of voltages ranging between 5.10V and 4.66V, as indicated in the legend.

FIG. 24 plots impedance spectra as a function of operating voltage (from between 3.68 V and 5.50 V, as noted in the legend) to evaluate development of a solid electrolyte interphase (SEI) on the surface of the cathode and/or anode. SEI is a protective layer on the electrode surface capable of suppressing growth of dendrites on electrodes. FIGS. 24B and C are Bode plots of the imaginary and real components, respectively and show that impedance rises sharply at end of charge. FIG. 25 indicates that as cell voltage relaxes, from 5.10 V to 4.66 V, cell impedance falls. These ac impedance spectra reveal that resistance changes with increasing operating voltage, suggesting a protective layer is formed on the surface of the cathode for higher operating voltages. Such a protective layer can provide benefits to the batteries of the present invention by prolonging the useful life of the cathode and/or anode.

Figure 26:
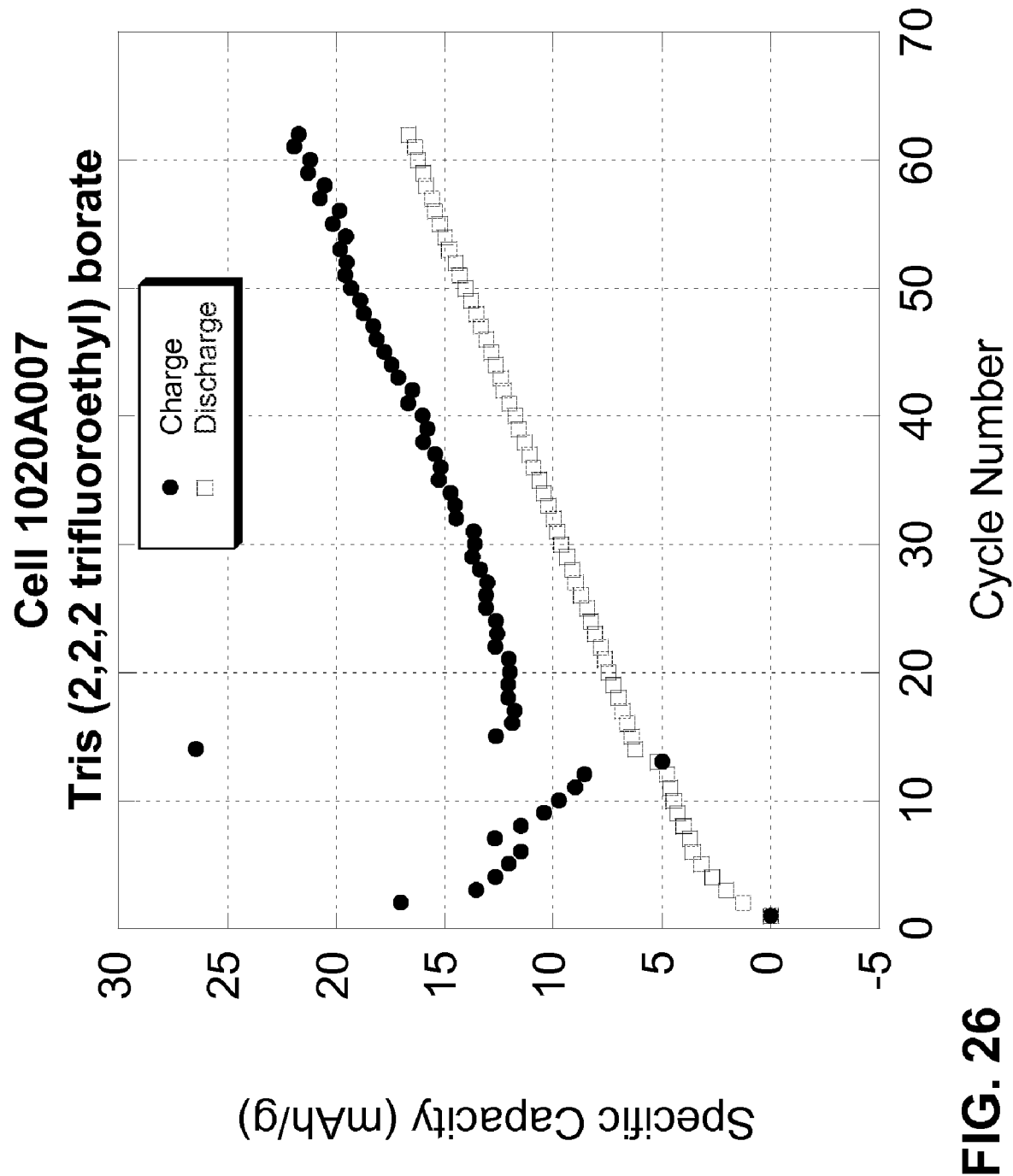
FIG. 26 is a plot of specific capacity as a function of cycle number for charge and discharge for a cell using Tris(2,2,2 trifluoroethyl)borate as the anion receptor.

FIG. 26 summarizes the results of the third anion receptor used in this example, Tris(2,2,2 trifluoroethyl)borate (TTFEB). Use of TTFEB in the cell results in improved capacity compared to TPFPB (FIG. 6).

Example 2

Effect of Anion Receptor on Battery Characteristics

This example is associated with the development of a new battery chemistry that operates at higher voltages with larger specific capacities than other battery systems. Quantitatively, the improvement in specific energy (a function of cell voltage and specific capacity) for the batteries of the present invention is theoretically more than a factor of three greater than state-of-art lithium-ion (Li-ion) batteries. This increase in battery specific energy represents the single largest improvement in battery performance compared to previous developments in battery technologies over the past 40 years. The practical specific energy (taken as 30% of theoretical specific energy) of the proposed battery chemistry is 410 Whr/kg compared with state-of-art Li-ion batteries at 120 Whr/kg.

The batteries of the present invention are particularly useful in spacecraft, where batteries constitute up to 33% of spacecraft power system mass. Development of significantly higher specific energy batteries directly translates into dramatic weight savings for spacecraft. Therefore, to address the needs of future missions requiring higher energy batteries with lower mass, we develop novel high voltage, high specific capacity anion intercalating cathode based batteries. These cells have approximately four times greater specific energy compared with state-of-art Li-ion cells, based on: higher cell voltage: >5 V (vs. 4.1 V for state-of-art Li-ion cells); and higher cathode specific capacity: 890 mAh/g cathode (vs. 180 mAh/g for state-of-art Li-ion cells).

State-of-the-art Li-ion cells operate on the principle that during charge, $Li^+$ ions intercalate into graphite at the anode and de-intercalate out from the $LiCo(Ni)O_2$ cathode, with the reactions reversing during discharge. For these cells, the electrolyte consists of a Li salt, typically $LiPF_6$, dissolved in an organic solvent. However, another galvanic cell design is possible, consisting of the same anode ($Li^+$ intercalating graphite) and an anion-intercalating cathode, such as graphite, where the anion is provided by the salt in the electrolyte.

This example focuses on demonstrating the feasibility of the anion intercalating battery concept. The approach includes building dual intercalating cells using graphite anodes and cathodes, but employing LiF dissolved in non-aqueous, high voltage stability organic solvents, through the aid of anion complexing additives. The choice of LiF as the salt is attractive for many reasons. First, the Li—F redox couple represents the highest theoretical electrochemical potential difference of any known redox couple, since F is the most electronegative element and Li is the most electropositive element. Furthermore, the $F^-$ ion possesses the smallest ionic radius of all halogens, and thus is a potentially facile insertion anion. As a means of comparison, the graphene plane spacing is about 0.355 nm, and the Pauli ionic radius of the $F^-$ ion is 0.136 nm (see FIG. 1). The monoatomic $F^-$ anion is of course electrochemically stable to 6 V versus $Li^+/Li$, and LiF is very inexpensive. However, LiF is insoluble in virtually all organic solvents, which seemingly would negate its use for the dual intercalating cell design.

Recently, synthesis of fluorinated boron-based anion receptors for nonaqueous solutions has been reported. These materials have been observed to enhance the ionic disassociation of a variety of lithium salts in low dielectric solvents, by incorporating non-hydrogen bonded electrophilic groups that are stable over a wide electrochemical stability window of at least 5V. These compounds such as tris(pentafluorophenyl)borane when dissolved in conventional Li-ion battery electrolyte solvents such as ethers and aliphatic carbonates enhance the dissolution of lithium salts, including lithium halides, resulting in increases in solubilities by upwards of six orders of magnitude. The conductivity of these electrolyte solutions are nearly on par with conventional Li-ion electrolyte solutions, e.g., $3.58 \times 10^{-3}$ S/cm for 1 M LiF in 1:2 EC-DMC for 1 M borate additives at 25° C.

Summarizing, this example explores the feasibility of new battery chemistry: the halide anion intercalating cathode cell. This cell uses graphite as an anion host for a battery cathode, and LiF salt complexed by a high stability anion receptor as the anion source. For practical purposes, a lithium metal anode is employed, though in more advanced cell designs, a graphitic anode is used, as in conventional Li-ion cells.

A large number of battery test half cells with varying electrode and electrolyte composition are fabricated and tested. Generally, the cell design consists of: 1. Lithium metal anode; 2. Graphite, petroleum coke, or amorphous carbon cathode with 10 wt % polymeric binder; 3. Polyolefin separator; 4. Electrolyte comprising: a. High anodic stability solvent such as ethyl isopropyl sulfone or propylene carbonate; b. Anion receptor such as tris (pentafluorophenyl) borane or tris (hexafluoroisopropyl)borane (concentration of between about 1M and about 5M); c. LiF, (concentration of between about 1M and about 5M).

Initial test cells have been successfully fabricated and tested, and found to have the expected high operating voltage of about 5V. However, the specific capacity of 20 mAh/g for cathodes of these cells is less than expected. By tailoring or "tuning" the anion receptor, though, both the operating voltage and cathode specific capacity is sharply increased, as shown in FIG. 18, for two different anion receptors. Cathode specific capacity of 50 mAh/g is achieved, thus demonstrating the batteries of the present invention are feasible.

An important question of whether the cell can cycle without appreciable long-term capacity fade is addressed. Graphite intercalation often is poorly reversible, due to exfoliation of the graphite. Scanning electron micrographs of cells cycled more than 100 cycles displayed no evidence of exfoliation (FIG. 13). More importantly, capacity fade is not evident in cells cycled slowly at least over the first ten cycles, as shown in FIG. 19. As a comparison, Li-propylene carbonate co-intercalation in graphite results in almost complete capacity loss over one or two cycles due to exfoliation of the graphite.

Another important feature of the new cell design is that the electrolyte must be designed to tolerate both high anodic oxidative conditions (as shown in FIG. 18), and also must be chemically and electrochemically stable against the lithium anode. First generation electrolytes examined in this example are found to have very poor stability against lithium. Later generations are formulated with greatly improved stability. The efficacy of the later generation solvent-anion receptor-salt system compared to first generation system is shown in FIG. 20. This cyclic voltammetry experiment demonstrates that lithium can be plated and reversibly stripped at the anode against a copper working electrode.

Figure 27:
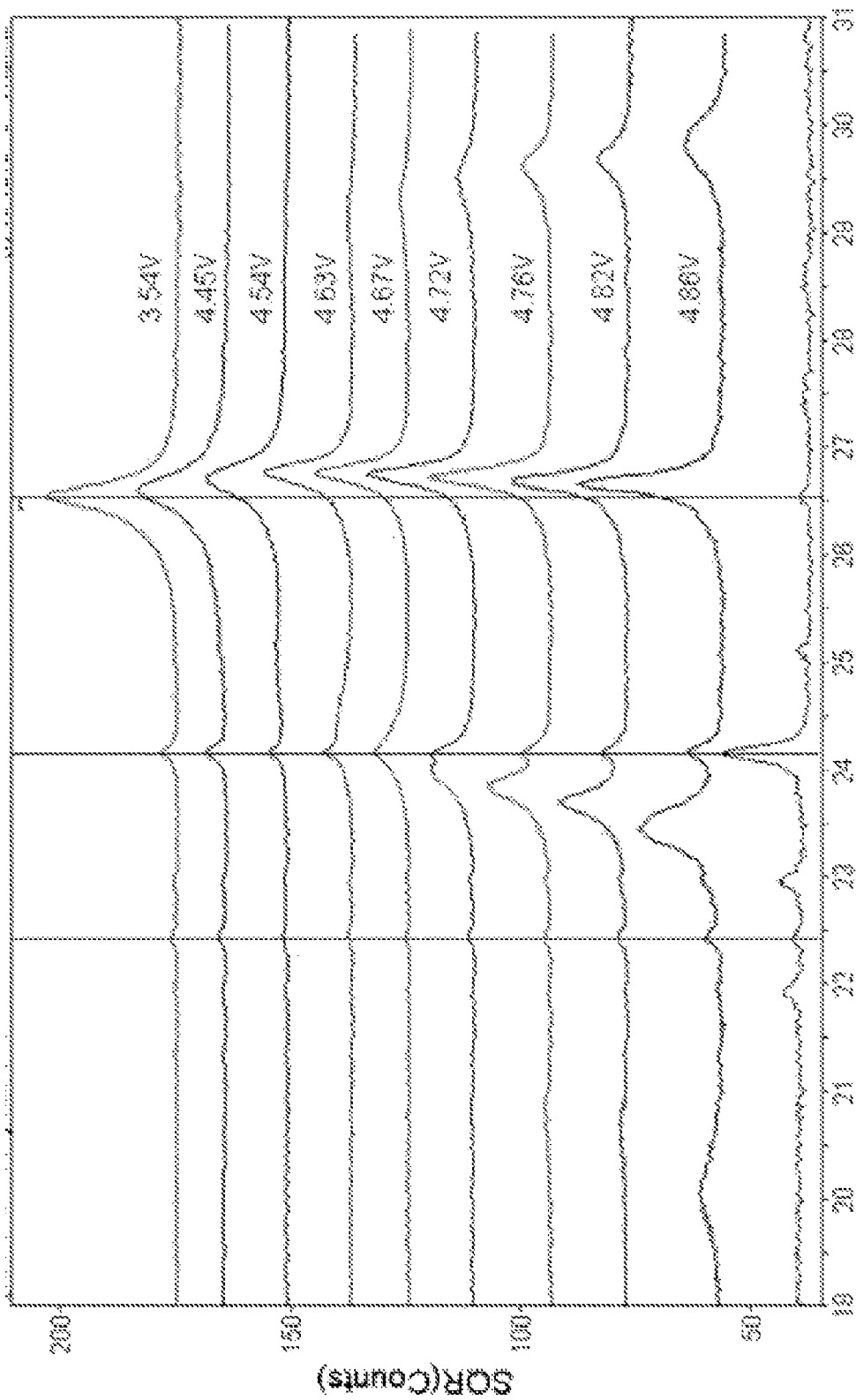
FIG. 27 is a series of x-ray diffraction plots for voltages ranging between uncharged graphite (lowest plot) to graphite with a potential of 3.54 V (top plot) and 4.86 V.

In addition to cell-level studies, extensive materials characterization is performed to elucidate the mechanisms of operation for this cell chemistry. These studies included SEM studies, cyclic voltammetry, $^{19}F$ nuclear magnetic resonance ($^{19}F$ NMR) spectroscopy, synchrotron x-ray diffraction (XRD) (FIG. 27), and electrochemical impedance spectroscopy (EIS). These studies demonstrate that the graphite is indeed intercalating and deintercalating the anion in a reversible manner.

This task has demonstrated proof of concept of a new battery cell chemistry with operating cell voltages in excess of 5V, compared with about 4V for state-of-art lithium ion cells. In addition to demonstrating the viability and promise of this new battery chemistry, extensive characterization of the cell and components has validated the proposed cell mechanisms.

By tailoring the electrolyte and the anion receptor type, a cathode specific capacity of 50 mAh/g has been achieved, though this value is lower than state-of-art lithium ion cathodes (180 mAh/g). Much higher specific capacity can be obtained by identifying alternative anion receptors with improved anion release characteristics.

In addition to demonstrating proof of concept of a new and promising battery chemistry, this example has resulted in other developments currently under study. These new technologies include: 1. Use of anion receptors to improve primary battery discharge performance by coordinating precipitated LiF in Li—$CF_x$ batteries; 2. Use of high anodic stability electrolytes for improved battery cycling performance with high voltage transition metal oxide cathodes.

Sample Calculations:

Cathode specific capacity: For 1 g graphite (12 g/mol)= 0.0833 mol. Assume $CF_x$ with x=0.4 (note that some $CF_x$ compounds are synthesized to x=1). For 0.0833 mol graphite, yields (0.0833 mol/2.5)=0.0333 mol F. Thus 0.0333 mol e-Faradic charge during (dis)charge:

$$(0.0333\ e-)\ (6.02\times10^{23}\ e-/mol)\ (1.602\times10-19\ C/e-)/ (3600\ sec/hr)=0.892\ Ahr/g\ (graphite\ basis).$$

Cell energy density: For a cell designed to be 1000 Whr, assume V=5V giving 200 Ahr capacity. Cathode mass: for (200 Ahr)/(0.892 Ahr/g)=224 g cathode.

Anode mass: for (200 Ahr)/(0.372 Ahr/g)=538 g anode

Salt mass: for (200 Ahr) (3600 sec/hr)=18000 C $$(18000\ C)/(1.602\times10^{-19}\ C/e-)(25.94\ g/mol)/(6.02\times 10^{23}\ e-/mol)=4.84\ g\ LiF$$

So, total theoretical energy density is 1000 Whr/(224 g+538 g+4.84 g)=1304 Whr/kg. From Linden, theoretical energy density of Li-ion cell is 410 Wh/kg. Thus, theoretical energy density of proposed cell is 3.2 times greater than theoretical state-of-the-art Li-ion cells.

Example 3

Dual Intercalating Carbonaceous Electrodes

Almost all of the cells of the previous examples for the anion intercalating battery use a lithium metal counter electrode. The lithium metal acts as an effective getter for most undesirable contaminants in the cell, including water. These contaminants can reduce the performance of the anion intercalating cathode.

However, a preferred embodiment of a practical anion intercalating battery uses a carbonaceous (e.g., graphite or coke) anode in place of the lithium metal since a carbonaceous anode has better long term cycle life than lithium metal when the level of contaminants in the cell is very low. The anion intercalating cell functions sufficiently well when a coke anode is used in place of the lithium metal anode.

Figure 28:
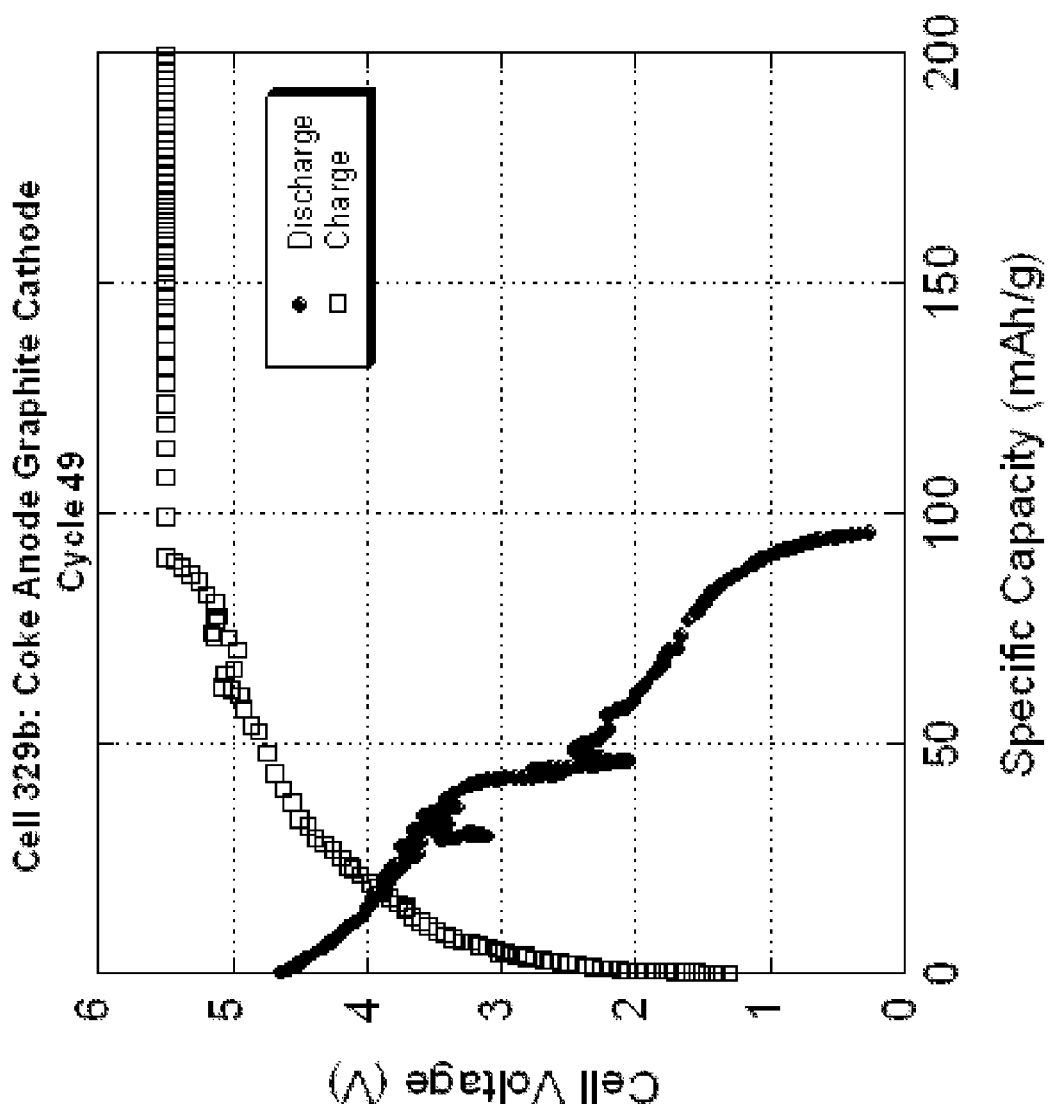
FIG. 28 is a charge/discharge cycle of a cell having a coke anode and a graphite cathode after 49 cycles.

FIG. 28 shows the 49th charge/discharge cycle of an anion intercalating cathode cell incorporating a coke anode. This performance (in terms of cell voltage as a function of specific capacity) is on par with other anion interacting cathode cells built using a lithium anode. Note that the cathode specific capacity is nearly 100 mAh/g in this configuration when discharged to about 0.25V vs. Li/Li$^+$.

Solvent Effects: The typical embodiment of the anion intercalating cell incorporates a high anodic stability and high dielectric constant solvent such as propylene carbonate (PC). A serious drawback of using this solvent is that PC is well known to co-intercalate into graphite anodes below about 1.5V vs. Li/Li$^+$, leading to exfoliation and rapid degradation of the cell performance within a few charge/discharge cycles. Two important concerns related to this issue are addressed.

The first concern is whether the PC exfoliates the graphite cathode as it does a graphite anode. To that end, no evidence is seen of exfoliation in the graphite cathode when using PC as a solvent as evidenced by SEM micrographs of cycled cathodes (FIG. 13) and by the lack of the characteristic electrochemical signature of exfoliation, viz., massive irreversible capacity followed by sudden loss in cell capacity in one or two charge/discharge cycles. Rather, the cells tend to increase in capacity with cycling, reaching a maximum cathode specific capacity of about 50 mAh/g discharged to 3V, then followed by a gradual capacity loss with cycling over the subsequent tens or hundreds of cycles. This gradual capacity fade with cycling is attributed to the very high (and entirely unoptimized) charging voltage. Improvements in cycle life is possible through identification of more appropriate cycling parameters, e.g. charge and discharge cutoff voltages, current tapers and through optimization of the cell chemistry, e.g. binder, solvent, receptors.

The second issue is related to the embodiment that uses PC as a solvent, where the concern is that PC will limit deep discharge using a graphite anode. This concern is mitigated by using a non-graphitic anode such as coke or lithium titanate anode, though at the cost of lower anode specific capacity. However, alternative solvents can be used in the anion intercalating cathode cell design, which allow for very deep discharge. Interestingly, these solvents can possess relatively poor dielectric constants, and instead rely on the solvating effects of the anion receptor to draw the electrolyte salt into solution.

Figure 29:
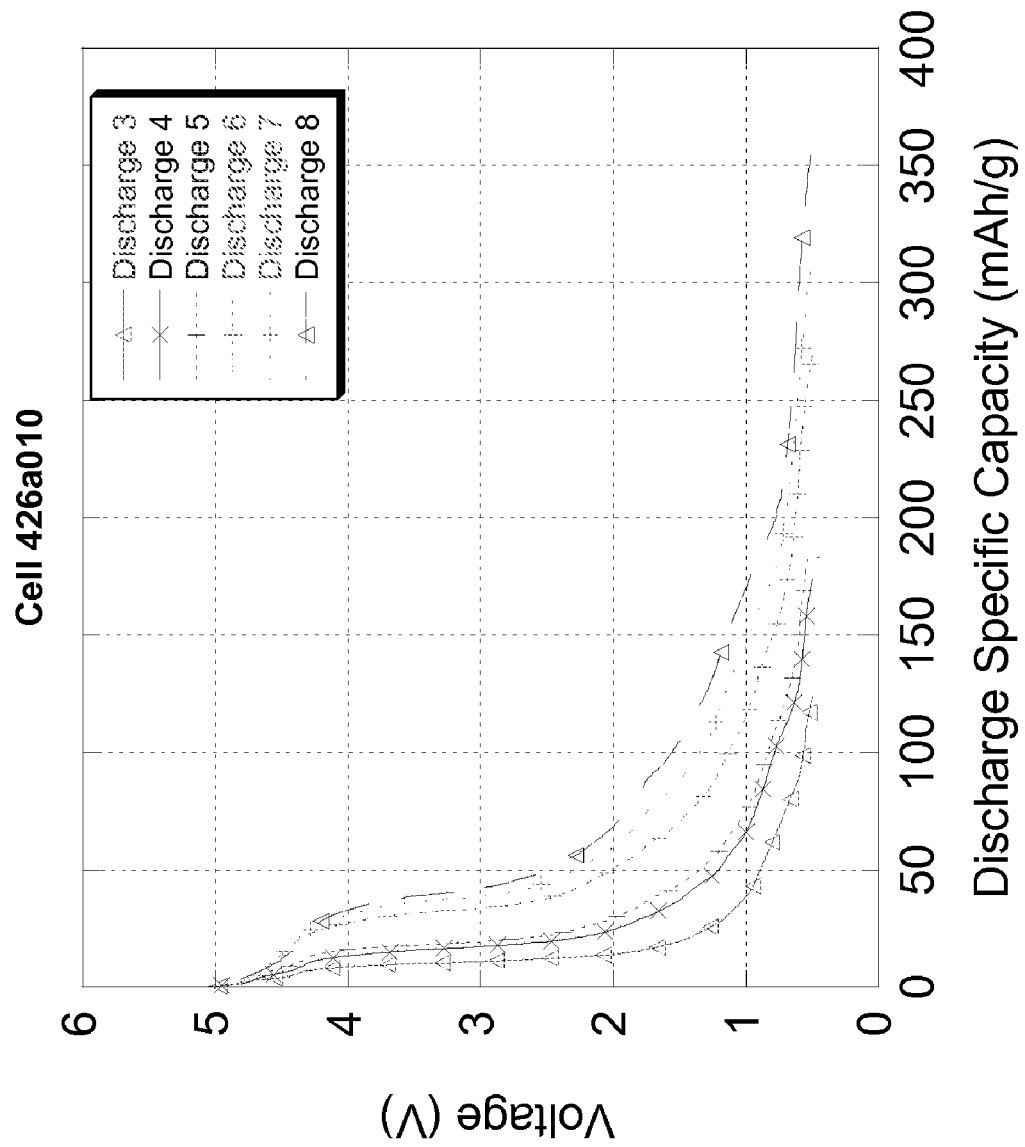
FIG. 29 is a deep discharge cycle, for discharges 3-6, for a graphite on Al foil cathode and Li counter electrode.

FIG. 29 represents deep discharge cycle data of an anion intercalating cell (graphite cathode on Al foil, Li counter electrode), but using dimethyl carbonate (DMC) as the solvent, with tris-(hexafluoroisopropyl)borate anion receptor and LiF salt. Cell capacity improves with cycling even with a deep discharge cutoff voltage of 0.5V vs. Li/Li$^+$. Most of the capacity improvement lies below about 2V, though the cycling at deep discharge cutoff voltage also raises the capacity above 2V as well.

Figure 30:
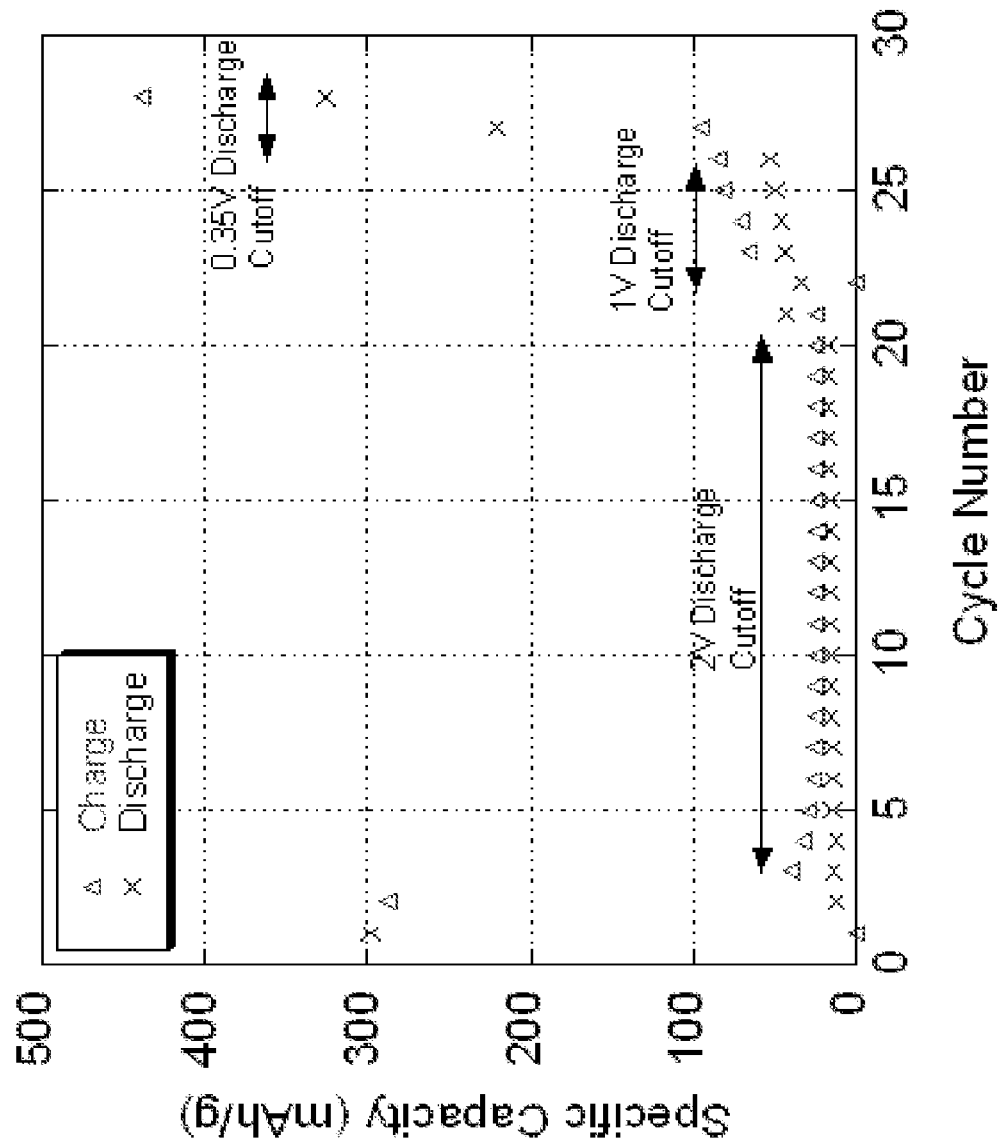
FIG. 30 plots specific capacity versus cycle number for different discharge cutoffs, as indicated.

Additionally, it appears that the depth of discharge plays an important role in the capacity improvement with cycling. FIG. 30 represents deep discharge cycle data of an anion intercalating cell (graphite cathode on Al foil, Li counter electrode), using dimethyl carbonate (DMC) as the solvent, with tris-(hexafluoroisopropyl)borate anion receptor and LiF salt, with different discharge cutoff voltages. For the first discharge, the cutoff voltage is set very low, approximately 0.25V and the cell is held at this voltage for about 300 mAh/g capacity. For cycles 2-21, the discharge cutoff voltage is maintained at 2V. No appreciable increase in capacity with cycling is observed at this cutoff voltage. However, at cycle 23-26, the discharge cutoff voltage is lowered to 1V, and an increase in capacity with increasing cycle number is observed. At cycle 27-28, the discharge cutoff voltage is further lowered to 0.35V, which results in a much steeper increase in the capacity improvement with cycling.

Figure 31:
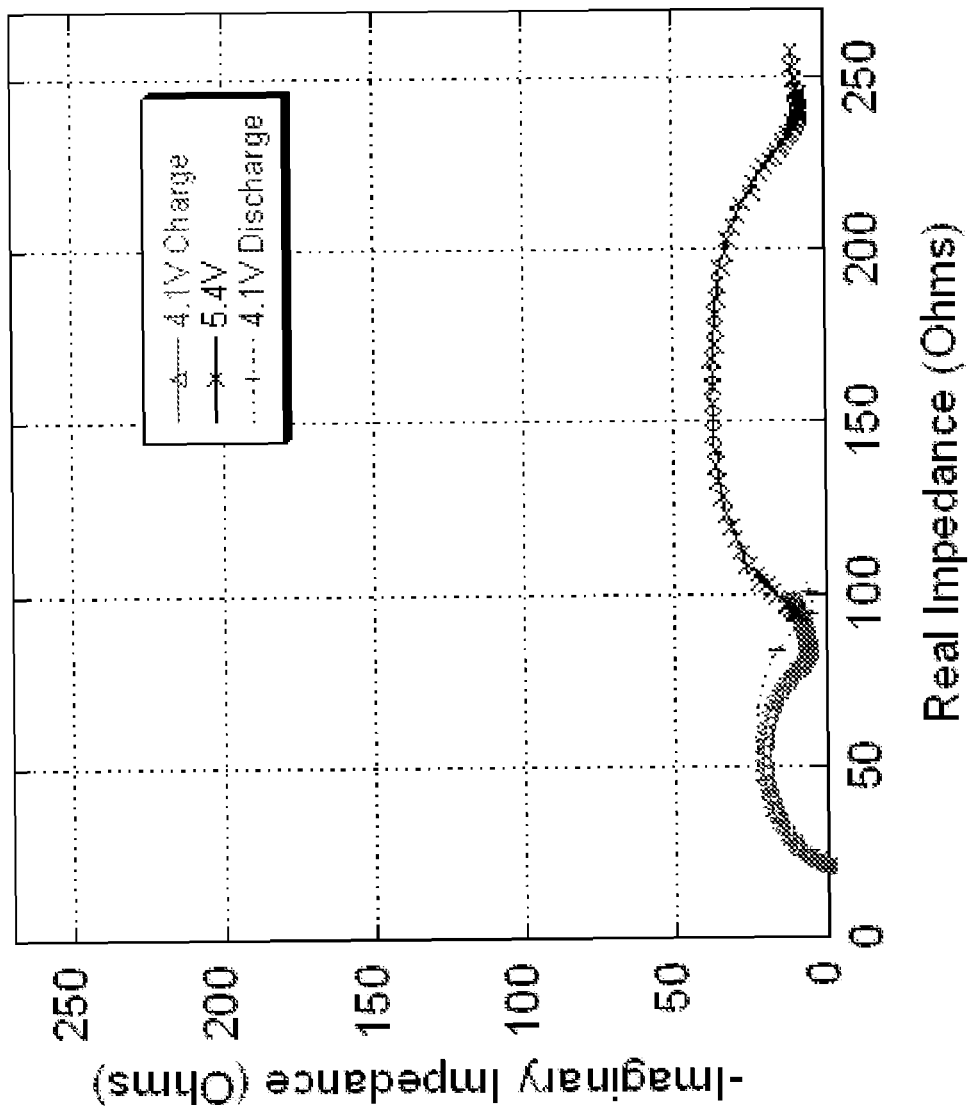
FIG. 31 is an impedance plot for 4.1V charge (triangle), 5.4 V charge (x), and at 4.1 V during the discharge cycle.
Figure 32:
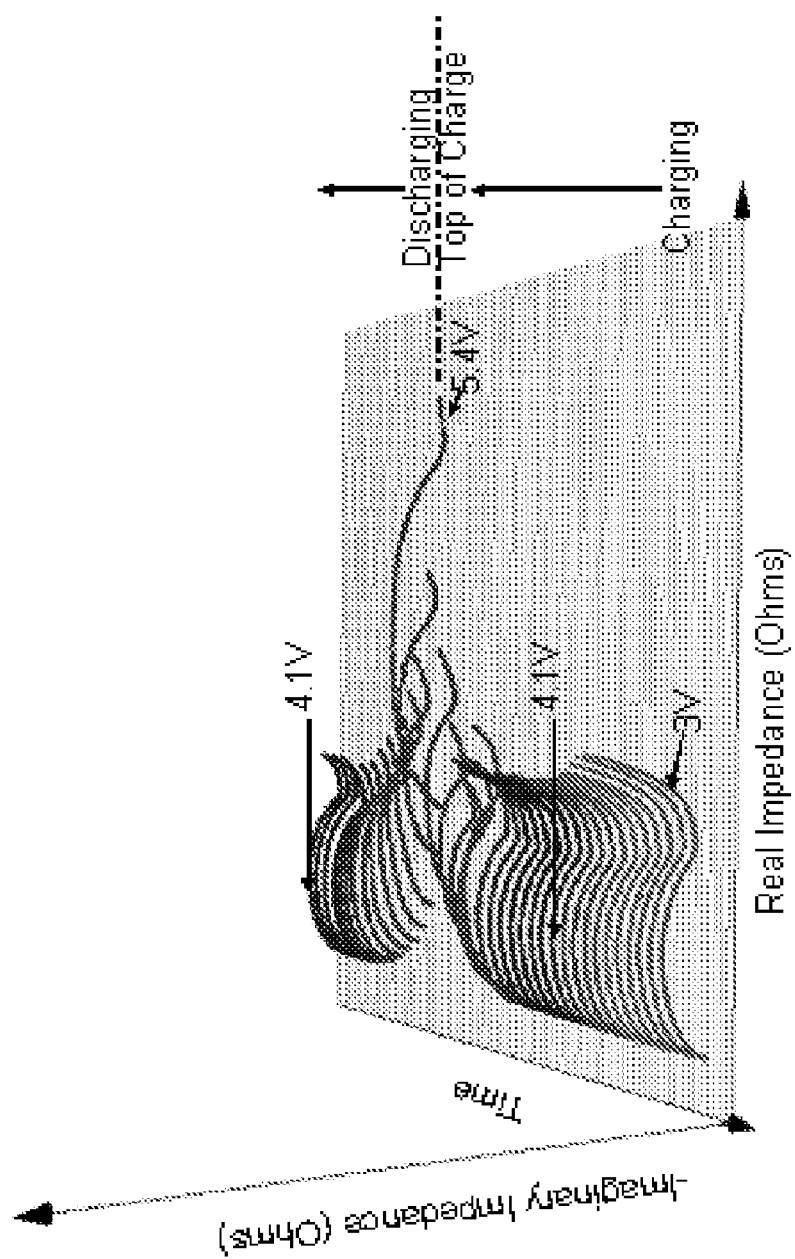
FIG. 32 summarizes the data of FIG. 31 in 3-D, with time plotted on the z-axis.

Reversibility of Cell Impedance: As the anion intercalating cell charges, it draws LiF out of the electrolyte. If this occurs at a faster rate than the dissolution of the additional LiF present in the cell, the electrolyte impedance should increase. Similarly, as the cell discharges, a commensurate decrease in electrolyte impedance should be observed. These effects are confirmed using electrochemical impedance spectroscopy (EIS). The impedance of a test cell is measured from 100 kHz to 0.7 Hz with an excitation voltage of 20 mV at various states of charge. In FIG. 31, it is clear that on 4.1V on the charging cycle, the high frequency×axis intercept (which is generally accepted to correspond to solution resistance in the cell) falls at approximately 20 ohms, while at 5.4V on the charging cycle, the high frequency×axis intercept is much higher, near 90 ohms. The high frequency×axis intercept then falls to about 20 ohms 4.1V on the discharge cycle, as predicted. These data are shown in greater detail in FIG. 32, which is shown in 3-D perspective. This reversible rise and fall of the solution resistance with charging and discharging, respectively supports the proposed cell mechanisms.

Example 4

Figure 33:
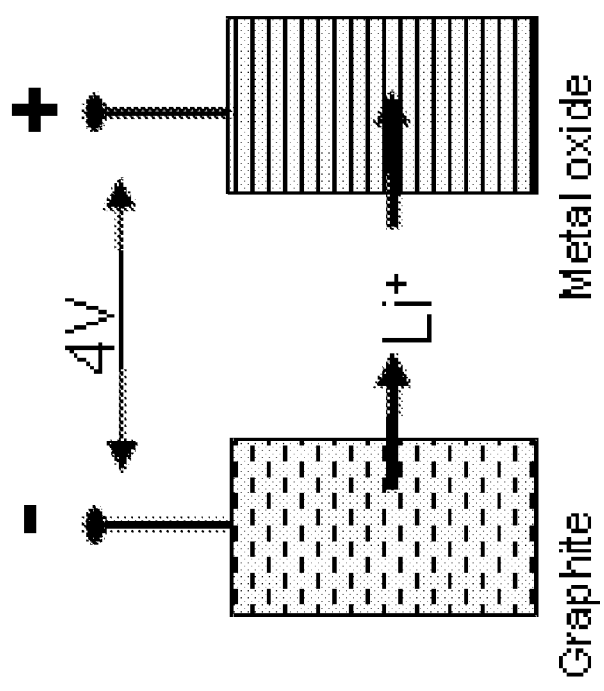
FIG. 33 schematically summarizes operation of: A. a Li-ion cell; and B. the dual ion intercalating cell of the present invention. During charge of Li-ion cell, the cation deintercalates from the graphite anode and interacts at the metal oxide cathode. In the present invention, during charging, the cation deintercalates from the graphite anode and the anion deintercalates from the graphite cathode. (De)-intercalation of anions at the cathode yields higher cell voltages and higher capacities
Figure 33:
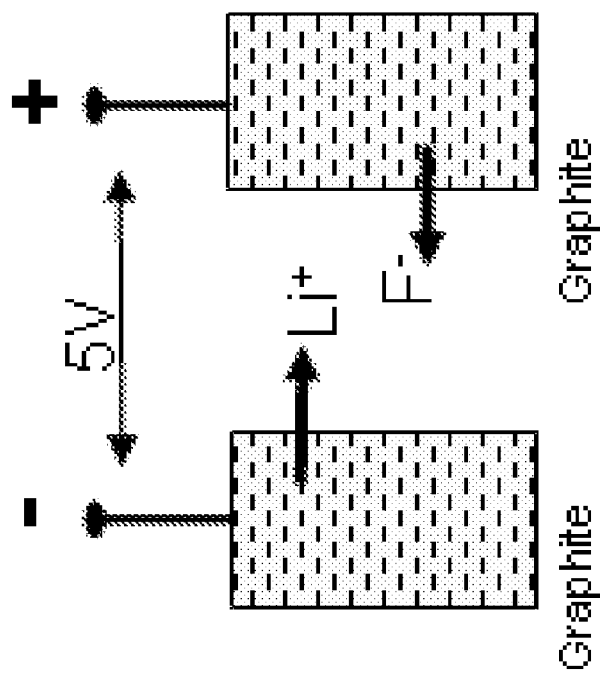

First-Principles Hierarchical Selection and Synthesis of Anion Receptors for Enabling Halide Intercalating Cathode (HIC) Batteries Exceeding State-of-Art Li-Ion Battery Performance To meet the needs for military and other commercial missions, batteries must be developed with higher specific energy. We introduce an exceptionally high specific energy dual ion intercalating battery. The principle of this concept is to reversibly intercalate cations at a carbon anode and anions at a carbon cathode, with the choice of salt dictating the cell operating voltage. In this study, the LiF salt is chosen, given that the Li—F redox couple represents the highest theoretical electrochemical potential difference of any known redox couple (FIG. 33). The normally insoluble LiF is dissolved in nonaqueous, high anodic voltage stability organic solvents, through the aid of anion complexing additives ("anion receptor").

The advantage of the proposed system is significantly increased cell voltage (from <4V for state-of-art Li-ion cells to >5V for the cells of the present invention) and very high theoretical cathode specific capacity, of between about 900-2200 mAh/g compared with state-of-art cathode specific capacity of ca. 180 mAh/g. This increase in battery specific energy (a product of the cell voltage and specific capacity) represents the single largest improvement in battery performance compared to previous developments in battery technologies over the past 40 years.

Initial experiments demonstrate proof of concept with promising high voltage charge/discharge plateaus, with specific capacity and operating voltage dependent on the salt-solvent chemistry (FIG. 18). Synchrotron x-ray diffraction measurements of these test cells indicate reversible graphite staging with cell charging, and $^{19}$F NMR studies show a distinct Knight shift in the charged cathodes, consistent with acceptor intercalated graphite. These characterization data strongly support the putative cell mechanisms.

Although the high voltage cell operation is demonstrated, the practical specific capacity of the cathode are lower than estimated. In optimizing the system to achieve much higher performance, it is apparent that determining the influence of a number of cell design variables (e.g. solvent donicity, co-solvent dielectric constant, relative Lewis acidity of the anion receptors, etc.) is intractable by strictly experimental means. To that end, we propose a hierarchical theoretical (Quantum Mechanics) study coupled with experimental verification to solve these problems, thereby optimizing battery chemistry as well as creating the fundamental methodology for continuous performance improvements.

Figure 34:
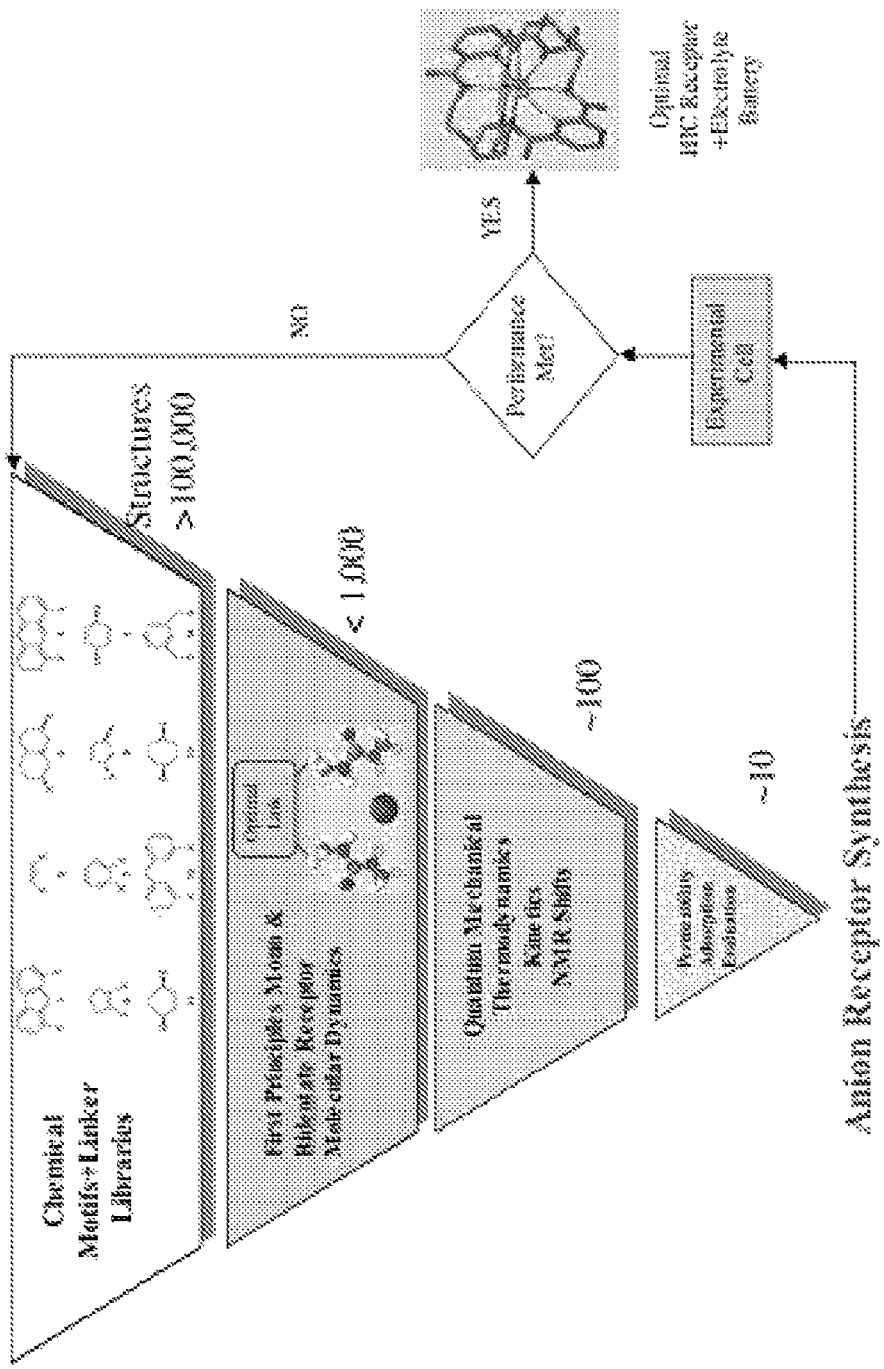
FIG. 34 is a flow diagram of the process used to screen or develop anion receptors. Entire libraries of potential anion receptors are provided having on the order of greater than 100,000 unique chemical structures. From such a library, first principles mono and bidentate receptor molecular dynamics identifies about less than 1000 promising structures. These structures are further analyzed using quantum mechanical thermodynamics, kinetics, and simulated NMR shifts to identify 100 "more promising" structures. These 100 are further analyzed using adsorption and permeability calculated characteristics to obtain about 10 candidates that are synthesized or purchased and then used in an electrochemical cell. The candidate is identified as an "optimal" anion receptor if performance characteristics, as discussed herein, are met.

We employ first-principles based hierarchical selection methodology for synthesis of new anion receptors, as summarized in FIG. 34, that provides a quantifiable assessment without undergoing a priori rigorous empirical studies. Briefly, the method employs the following steps:

1) Thermodynamics: A first principles based computer model (Quantum Mechanics B3LYP/X3LYP Density Functional Theory) of capture/release thermodynamics (free energies) for a series of molecular motifs and F$^-$ anion.
2) Chemistry: Employ a database of "linker" structures to create mono as well as bi-dentate receptors that include two binding motifs. Include motifs from prior experimental work (perfluorinated moieties) and others found in step (1) by computer calculations
3) Adsorption: Investigate the intercalation energies of mono and bidentate receptor bound F$^-$ anions into the cathode by first principles quantum mechanics. Include graphite as well as CF$_x$ cathodes.
4) Kinetics: Estimate energy barriers for binding and release of F$^-$ anion by receptor, binding in solution and release on and inside the cathode surface.
5) Permeability: Using first principles (ab initio determined Force Fields), estimate the solubility and diffusion constant of receptor bound fluoride ions in electrolyte media (e.g., propylene carbonate). Solubilities are determined from Henry's constant Grand Canonical Monte Carlo Simulations and diffusion coefficients with Molecular Dynamics. Study these properties as a function of temperature.
6) NMR Shifts: Predict Boron and Fluoride NMR $^{19}$F, $^{11}$B chemical shifts from first principles quantum mechanics in various environments in support of experimental characterization of charged and discharged cathodes.
7) Screening: Use first-principle properties calculated from molecular models (1-6), screen hundreds to thousands of anion receptors/linker combinations and select the most promising candidates for synthesis based on the predicted capture/release thermodynamics, kinetics, adsorption and permeability characteristics.
8) Complete two search cycles (1-7) and generate an analytical model that summarizes the experimental and theoretical findings linking first-principles properties (binding energies, kinetic barriers, solubilities, diffusion coefficients, adsorption) with experimentally determined measured of performance such as energy densities.
9) Use the model to evaluate a second round of chemical motifs/linker combinations that can yield high performance, economical, and synthesizable, F$^-$ anion receptors. Optionally, we perform a second cycle of experimental validation to further validate the model.

Figure 35:
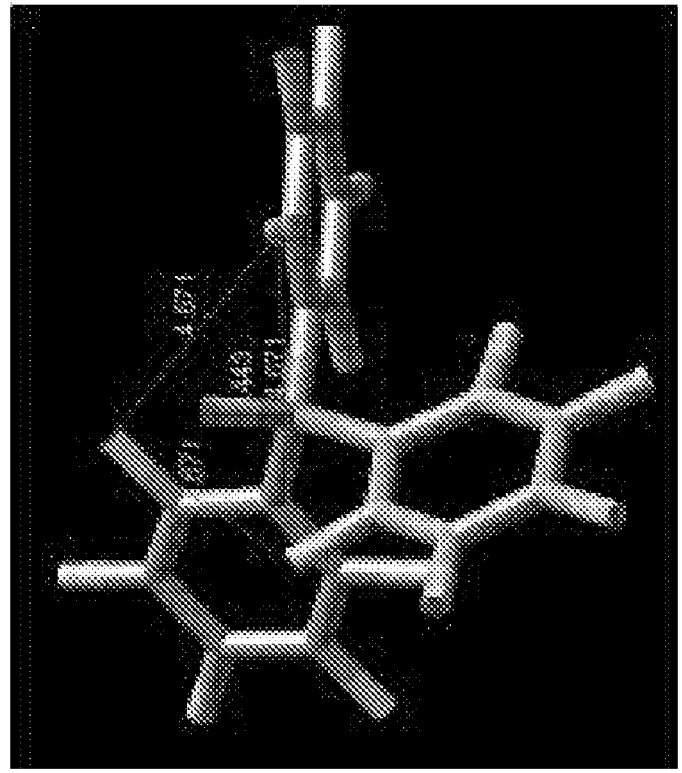
FIG. 35 is a spatial representation of two anion receptors modeled by the method summarized in FIG. 34.
Figure 35:
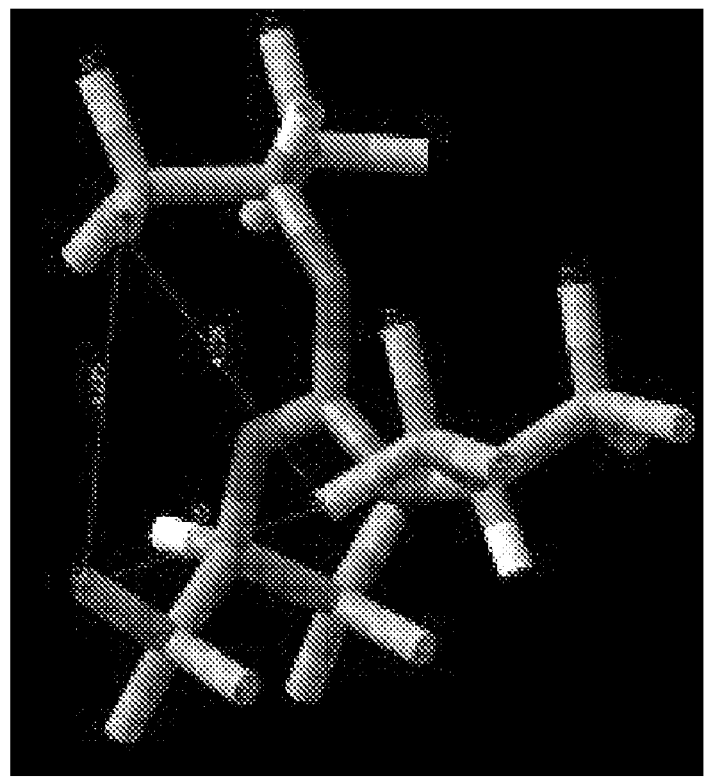

We have conducted experiments to validate the above method for generating, screening, and/or evaluating anion receptors. For example, the binding energetics of two anion receptors is estimated using a high level quantum method (see FIG. 35). The results correlate well with the performance of these HIC batteries, a higher binding energy results in higher energy density (FIG. 18). A representative cell using triphenylfluoroborane has a maximum energy density of 25 mAh/g, while a cell using trihydroisopropylfluoroborane as the receptor has a maximum energy density of 50 mAh/g. Their quantum mechanically predicted anion binding energies in solution are 1.45 eV and 1.77 eV respectively. Furthermore, we have found other receptor motifs with fluoride binding energies exceeding 2.0 eV.

Anion receptors identified by this method are either procured or synthesized, and then incorporated in a series of electrolyte formulations using the anion receptors and preferred solvents (e.g. propylene carbonate) and LiF salt. The electrolyte blends are tested by measuring conductivity as a function of temperature, and voltage stability window versus Li, graphite and/or Pt electrodes. Next, test cells using these electrolyte blends are constructed in a coin cell format, consisting of graphite electrodes spray-coated onto Al current collectors, with Li foil reference and counter electrodes. We perform cyclic voltammetry, Tafel polarization, and electrochemical impedance spectroscopy measurements on the test cells. These tests permit determination of whether $F^-$ (de)intercalation occurs, and the kinetics of the electrode reaction, as well as a measure of the practical electrode energy density.

When a suitable electrolyte formulation is identified that affords efficient $F^-$ (de)intercalation at the cathode, full cells consisting of graphite anodes, electrolyte blends, and graphite cathodes are fabricated. Standard cell testing is performed to determine metrics such as cell cycle life, specific capacity, voltage profile, and rate capability.

Batteries typically constitute up to 33% or more of power system mass. Development of significantly higher specific energy batteries directly translates into dramatic weight savings for spacecraft, communications equipments and computer electronics. Accordingly, batteries must be developed with higher specific energy. Our system offers as much as a factor of four improvement in specific energy over current SOA Li-ion batteries, resulting in significantly lower power system mass and volume. Demonstration of a high voltage, high specific capacity halide intercalating cathode (HIC) battery benefits a number of applications including in-situ instrumentation, active and passive remote sensing, and enables lower mass vehicles and communication systems for various missions.

REFERENCES

W. C. West and J. F. Whitacre, "Enhancement of Discharge Capacity for Lithium Polycarbon Monofluoride Primary Batteries", New Technology Report #42346, (2005).

W. C. West, "Anion Intercalating Cathodes for High Specific Energy Batteries: Method of Cell Synthesis", New Technology Report #42316, (2005).

H. S. Lee, X. Q. Yang, C. L. Xiang, and J. McBreen, "The Synthesis of a New Family of Boron-Based Anion Receptors and the Study of Their Effect on Ion Pair Dissociation and Conductivity of Lithium Salts in Nonaqueous Solutions", J. Electrochem. Soc., 145, (1998): pp. 2813-8.

J. McBreen, H. S. Lee, X. Q. Yang, and X. Sun, "New approaches to the design of polymer and liquid electrolytes for lithium batteries", J. Power Sources, 89, (2000): pp. 163-7.

X. Sun, H. S. Lee, X. Q. Yang, and J. McBreen, "A New Additive for Lithium Battery Electrolytes Based on an Alkyl Borate Compound", J. Electrochem. Soc., 149, (2002): pp. A355-9.

M. J Root, R. Dumas, R. Yazami, and A. Hamwi, "The Effect of Carbon Starting Material on Carbon Fluoride Synthesized at Room Temperature", J. Electrochem. Soc., 148, (2001): pp. A339-45.

D. Linden, in Handbook of Batteries, 3rd ed., D. Linden, editor, p. 1.15 McGraw-Hill, New York (2002): p. 1.13.

L. Piraux, V. Bayot, J. P. Issi, M. S. Dresselhaus, M. Endo, T. Nakajima, Phys. Rev. B 41 (1990) 4961.

S. L. di Vittorio, M. S. Dresselhaus, M. Endo, T. Nakajima, Phys. Rev. B 43 (1991) 1313.

S. L. di Vittorio, M. S. Dresselhaus, M. Endo0 T. Nakajima, Phys. Rev. B 43 (1991) 12304.

A. M. Rao, A. W. P. Fung, S. L. di Vittorio, M. S. Dresselhaus, G. Dresselhaus, M. Endo, K. Oshida, T. Nakajima, Phys. Rev. B 45 (1992) 6883.

K. Oshida, M. Endo, T. Nakajima, S. L. di Vittorio, M. S. Dresselhaus, G. Dresselhaus, J. Mater. Res. 8 (1993) 512.

S. L. di Vittorio, M. S. Dresselhaus, U. Dresselhaus, J. Mater. Res. 8 (1993) 1578.

M. S. Dresselhaus, M. Endo and J.-P. Issi, in: Fluorine-Carbon and Fluoride-Carbon Materials, T. Nakajima (Ed.), Marcel Dekker, New York, 1995, p. 95.

A. M. Panich, T. Nakajima, S. D. Goren, Chem. Phys. Letters 271 (1997) 381.

TABLE 1

SUMMARY OF ELECTROCHEMICAL CELLS

| Identifier | Salt | Solvent | AR | Cathode | Anode |
|---|---|---|---|---|---|
| 126A (FIG. 5) | LiF added to excess | Neat EIS | TPFPB 0.25M | Graphite on Al | Li |
| 126C (FIG. 11) | LiF added to excess | Neat EIS | TPFPB 0.25M | Graphite on Al | Li |
| 126d010 (FIG. 7) | LiF added to excess | Neat EIS | TPFPB 0.25M | Bare Al | Li |
| 1117A (FIG. 12) | LiF added to excess | Neat EIS | TPFPB 0.21M | Graphite on Al | Li |
| 217A (FIG. 14) | LiF added to excess | Neat EIS | TPFPB 0.27M | Graphite on Al | Li |
| 217B (FIG. 14) | LiF added to excess | Neat EIS | TPFPB 0.27M | Graphite on Al | Li |
| 111c007 (FIG. 16) | LiF added to excess | Neat EIS | TPFPB 0.22M | Graphite on Al | Li |
| 217C (FIG. 17) | LiF added to excess | Neat EIS | TPFPB 0.27M | Graphite on Al | Li |
| 513b001 (FIG. 19) | LiF added to excess | Neat PC | THFIPB 1.35M | Graphite on Al | Li |
| 1005d (FIG. 25) | LiF added to excess | PC:DMC 0.46:0.54 v/v % | THFIPB 1 M | Graphite on Al | Li |
| 1020A007 (FIG. 26) | LiF added to excess | Neat PC | TFEB 0.92M | Graphite on Al | Li |
| 524A (FIG. 27) | LiF added to excess | Neat PC | THFIPB 1.22M | Graphite on Al | Li |
| 329b (FIG. 28) | LiF added to excess | PC:DMC 1:1 v/v % | THFIPB 1.1 M | Graphite on Al | Coke |
| 426(FIG. 29) | LiF added to excess | Neat DMC | THFIPB 1.22M | Graphite on Al | Li |

Key:
EIS = ethyl isopropyl sulfone
PC = propylene carbonate
DMC = dimethyl carbonate
TPFPB = tris (pentafluorophenyl) borane
THFIPB = tris (hexafluoroisopropyl) borate
TFEB = 2,2,2 trifluoroethyl borate

We claim:

1. An electrochemical cell comprising:
   a. opposed anode and cathode electrodes, wherein said cathode electrode comprises a carbonaceous material and said opposed electrodes are dual ion-intercalating electrodes; and
   b. a nonaqueous electrolyte solution in ionic contact with said cathode and said anode, wherein said electrolyte solution comprises LiF and an anion receptor;
   c. wherein said anion receptor in contact with said electrolyte such that said anion receptor increases the conductivity of the nonaqueous electrolyte solution by binding a fluoride anion of said LiF to provide intercalation of Li⁺ ions at the anode and F⁻ ions at the cathode during charge.

2. The electrochemical cell of claim 1 wherein said carbonaceous material comprises a carbonaceous layer on a metal foil.

3. The electrochemical cell of claim 2 wherein said carbonaceous material is graphite, coke or carbon polymonofluoride.

4. The electrochemical cell of claim 1 wherein said anode comprises lithium metal or lithium metal alloy.

5. The electrochemical cell of claim 1 wherein said anode comprises a carbonaceous material.

6. The electrochemical cell of claim 1 wherein said non-aqueous electrolyte further comprises a propylene carbonate solvent.

7. The electrochemical cell of claim 1 wherein said anion receptor has the formula

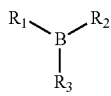

wherein $R_1$, $R_2$ and $R_3$ are independently selected from the group consisting of alkyl, aromatic, ether, thioether, heterocyclic, aryl or heteroaryl groups which are optionally substituted with one or more halogens, including F, alkyl, alkoxide, thiol, thioalkoxide, aromatic, ether or thioether.

8. The electrochemical cell of claim 7, wherein said anion receptor has the formula:

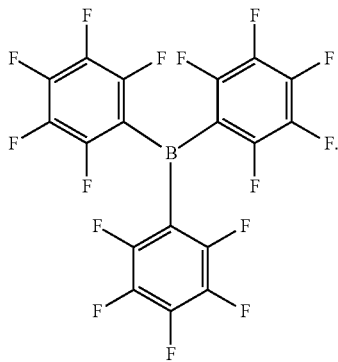

9. The electrochemical cell of claim 7, wherein said anion receptor has the formula:

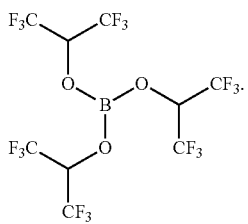

10. The electrochemical cell of claim 7, wherein said anion receptor has the formula:

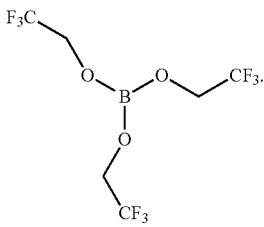

11. The electrochemical cell of claim 1 wherein said anion receptor is selected from the group consisting of aza-ether based compounds, fluorinated boron-based compounds, and phenyl boron-based compounds.

12. The electrochemical cell of claim 1 wherein said electrochemical cell has an operating cell voltage greater than or equal to 5 V.

13. The electrochemical cell of claim 1 wherein said electrochemical cell has a cathode specific capacity greater than or equal to 400 Whr/kg.

14. A dual intercalating electrode Li-ion battery comprising:
a. opposed anode and cathode electrodes, wherein each of said anode and cathode electrode comprise a carbonaceous material capable of reversibly intercalating an ion;
b. a nonaqueous electrolyte in ionic contact with each of said electrodes, wherein said electrolyte comprises LiF; and
c. an anion receptor in contact with said electrolyte such that said anion increases the conductivity of the non-aqueous electrolyte solution by binding fluoride anion;
wherein said anode reversibly intercalates Li⁺ ions and said cathode reversibly intercalates F⁻ ions during charge.

15. The battery of claim 14 wherein the carbonaceous material comprises a carbonaceous layer on a metal foil.

16. The battery of claim 14 wherein at least one of the carbonaceous anode material and carbonaceous cathode material is graphite, coke or carbon polymonofluoride.

17. The battery of claim 14 wherein the electrolyte further comprises a propylene carbonate solvent.

18. The battery of claim 14 wherein the LiF has a molarity range between about 1M and 5M.

19. The battery of claim 14 wherein said anion receptor has the formula

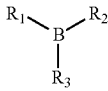

wherein $R_1$, $R_2$ and $R_3$ are independently selected from the group consisting of alkyl, aromatic, ether, thioether, heterocyclic, aryl or heteroaryl groups which are optionally substituted with one or more halogens, including F, alkyl, alkoxide, thiol, thioalkoxide, aromatic, ether or thioether.

20. The battery of claim 14, wherein said anion receptor has the formula:

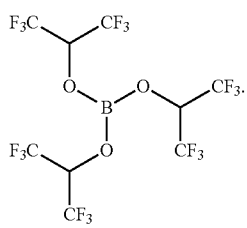

21. The battery of claim 19, wherein said anion receptor has the formula:

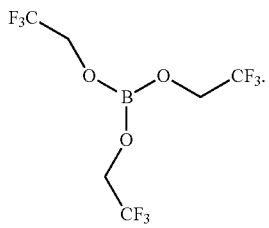

22. The battery of claim 14, wherein said anion receptor is selected from the group consisting of aza-ether based compounds, fluorinated boron-based compounds, and phenyl boron-based compounds.

23. The battery of claim 14 wherein said electrochemical cell has an operating cell voltage greater than or equal to 5 V.

24. The battery of claim 14 wherein said electrochemical cell has a cathode specific capacity greater than or equal to 400 Whr/kg.

25. A method of making a dual intercalating ion electrode lithium-ion battery comprising:
   a. providing a cathode and an anode in an opposed configuration, wherein the cathode and the anion reversibly intercalate ions;
   b. providing a nonaqueous electrolyte solution in ionic contact with each of the cathode and the anode, wherein the electrolyte solution comprises LiF and an anion receptor to increase the conductivity of the nonaqueous electrolyte solution by binding a fluoride ion of said LiF; and
   c. supplying an electrical potential difference between the cathode and the anode such that the fluoride ion intercalates with the cathode and a lithium ion of said LiF intercalates with the anode,
   thereby making a dual intercalating ion electrode lithium-ion battery.

26. The method of claim 25 further comprising discharging the battery by reversing the electrical potential such that fluoride ions deintercalate from the cathode and lithium ions deintercalate from the anode.

27. The battery of claim 14, wherein said cathode carbonaceous material is graphite, petroleum coke or amorphous carbon.

28. The electrochemical cell of claim 1 wherein said cathode carbonaceous material is graphite, petroleum coke or amorphous carbon.

* * * * *